(12) United States Patent
Bergamo et al.

(10) Patent No.: US 11,030,442 B1
(45) Date of Patent: Jun. 8, 2021

(54) ASSOCIATING EVENTS WITH ACTORS BASED ON DIGITAL IMAGERY

(71) Applicant: Amazon Technologies, Inc., Seattle, WA (US)

(72) Inventors: Alessandro Bergamo, Seattle, WA (US); Pahal Kamlesh Dalal, Seattle, WA (US); Nishitkumar Ashokkumar Desai, Redmond, WA (US); Jayakrishnan Kumar Eledath, Kenmore, WA (US); Marian Nasr Amin George, Seattle, WA (US); Jean Laurent Guigues, Seattle, WA (US); Gerard Guy Medioni, Seattle, WA (US); Kartik Muktinutalapati, Redmond, WA (US); Robert Matthias Steele, Seattle, WA (US); Lu Xia, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/841,237

(22) Filed: Dec. 13, 2017

(51) Int. Cl.
G06K 9/00 (2006.01)
G06K 9/78 (2006.01)
(Continued)

(52) U.S. Cl.
CPC ..... *G06K 9/00355* (2013.01); *G06K 9/00375* (2013.01); *G06K 9/00771* (2013.01);
(Continued)

(58) Field of Classification Search
CPC ... G06T 7/20; G06T 2207/30221; G06T 7/60; G06T 7/74; G06T 2207/30241;
(Continued)

(56) References Cited

U.S. PATENT DOCUMENTS 6,154,559 A 11/2000 Beardsley
7,050,624 B2 5/2006 Dialameh et al.
(Continued)

FOREIGN PATENT DOCUMENTS

CN 104778690 B 6/2017
EP 1574986 B1 7/2008
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Jingge Wu
(74) *Attorney, Agent, or Firm* — Athorus, PLLC

(57) ABSTRACT

In a materials handling facility, events may be associated with users based on imaging data captured from multiple fields of view. When an event is detected at a location within the fields of view of multiple cameras, two or more of the cameras may be identified as having captured images of the location at a time of the event. Users within the materials handling facility may be identified from images captured prior to, during or after the event, and visual representations of the respective actors may be generated from the images. The event may be associated with one of the users based on distances between the users' hands and the location of the event, as determined from the visual representations, or based on imaging data captured from the users' hands, which may be processed to determine which, if any, of such hands includes an item associated with the event.

23 Claims, 45 Drawing Sheets

(51) Int. Cl.
   *G06K 9/46* (2006.01)
   *G06T 7/73* (2017.01)
   *G06K 9/62* (2006.01)
   *G06T 7/60* (2017.01)
   *G06K 9/20* (2006.01)

(52) U.S. Cl.
   CPC ........... *G06K 9/209* (2013.01); *G06K 9/4604* (2013.01); *G06K 9/6256* (2013.01); *G06K 9/6269* (2013.01); *G06K 9/78* (2013.01); *G06T 7/60* (2013.01); *G06T 7/74* (2017.01); *G06T 2207/10028* (2013.01); *G06T 2207/20076* (2013.01); *G06T 2207/30196* (2013.01); *G06T 2207/30232* (2013.01); *G06T 2207/30241* (2013.01); *G06T 2210/12* (2013.01)

(58) Field of Classification Search
   CPC ........... G06K 9/00355; G06K 9/00375; G06K 9/00771; G06K 9/209; G06K 9/4604; G06K 9/6256; G06K 9/6269; G06K 9/78; G06K 9/00342; G06K 9/00724; G06K 9/00711; G06K 9/00335; G06K 9/00348
   See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,285,060 B2* | 10/2012 | Cobb | G06K 9/00335 352/52 |
| 8,369,622 B1 | 2/2013 | Hsu et al. | |
| 8,423,431 B1 | 4/2013 | Rouaix et al. | |
| RE44,225 E* | 5/2013 | Aviv | G06K 9/00771 348/152 |
| 8,630,924 B2 | 1/2014 | Groenevelt et al. | |
| 8,688,598 B1 | 4/2014 | Shakes et al. | |
| 9,158,974 B1* | 10/2015 | Laska | G06T 7/246 |
| 9,208,675 B2* | 12/2015 | Xu | H04N 7/002 |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1* | 12/2017 | Lin | G06F 16/5854 |
| 9,881,221 B2 | 1/2018 | Bala et al. | |
| 9,898,677 B1* | 2/2018 | Anjelkovi | G06K 9/3241 |
| 9,911,290 B1 | 3/2018 | Zalewski et al. | |
| 10,055,853 B1 | 8/2018 | Fisher et al. | |
| 10,133,933 B1 | 11/2018 | Fisher et al. | |
| 10,192,415 B2* | 1/2019 | Heitz, III | G08B 13/19656 |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2006/0222206 A1* | 10/2006 | Garoutte | G06K 9/00771 382/103 |
| 2007/0182818 A1* | 8/2007 | Buehler | G08B 13/19602 348/143 |
| 2007/0242066 A1 | 10/2007 | Rosenthal | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0159634 A1 | 7/2008 | Sharma et al. | |
| 2008/0193010 A1* | 8/2008 | Eaton | G06K 9/00771 382/159 |
| 2009/0060352 A1* | 3/2009 | Distante | A63B 24/0021 382/224 |
| 2009/0121017 A1 | 5/2009 | Cato et al. | |
| 2009/0210367 A1* | 8/2009 | Armstrong | G06K 9/00335 706/13 |
| 2009/0245573 A1 | 10/2009 | Saptharishi et al. | |
| 2009/0276705 A1* | 11/2009 | Ozdemir | G06K 9/00335 715/708 |
| 2010/0002082 A1* | 1/2010 | Buehler | G08B 13/19645 348/159 |
| 2010/0033574 A1* | 2/2010 | Ran | G06K 9/00348 348/159 |
| 2011/0011936 A1 | 1/2011 | Morandi et al. | |
| 2011/0205022 A1* | 8/2011 | Cavallaro | A63B 24/0021 340/8.1 |
| 2012/0148103 A1 | 6/2012 | Hampel et al. | |
| 2012/0159290 A1 | 6/2012 | Pulsipher et al. | |
| 2012/0257789 A1* | 10/2012 | Lee | G06F 3/0425 382/103 |
| 2012/0284132 A1 | 11/2012 | Kim et al. | |
| 2013/0076898 A1 | 3/2013 | Philippe et al. | |
| 2013/0156260 A1 | 6/2013 | Craig | |
| 2013/0253700 A1 | 9/2013 | Carson et al. | |
| 2014/0139633 A1 | 5/2014 | Wang et al. | |
| 2014/0279294 A1 | 9/2014 | Field-Darragh et al. | |
| 2014/0282162 A1 | 9/2014 | Fein et al. | |
| 2014/0362195 A1 | 12/2014 | Ng-Thow-Hing et al. | |
| 2014/0362223 A1 | 12/2014 | LaCroix et al. | |
| 2014/0379296 A1* | 12/2014 | Nathan | G06Q 10/08 702/150 |
| 2015/0019391 A1 | 1/2015 | Kumar et al. | |
| 2015/0039458 A1 | 2/2015 | Reid | |
| 2015/0073907 A1 | 3/2015 | Purves et al. | |
| 2015/0131851 A1 | 5/2015 | Bernal et al. | |
| 2015/0269143 A1* | 9/2015 | Park | G06F 16/54 382/305 |
| 2015/0294483 A1* | 10/2015 | Wells | H04N 7/181 382/103 |
| 2016/0003636 A1 | 1/2016 | Ng-Thow-Hing et al. | |
| 2016/0127641 A1 | 5/2016 | Gove | |
| 2016/0292881 A1* | 10/2016 | Bose | G06K 9/00342 |
| 2016/0307335 A1* | 10/2016 | Perry | G06T 7/292 |
| 2017/0116473 A1 | 4/2017 | Sashida et al. | |
| 2017/0262994 A1 | 9/2017 | Kudriashov et al. | |
| 2017/0278255 A1 | 9/2017 | Shingu et al. | |
| 2017/0309136 A1 | 10/2017 | Schoner | |
| 2017/0323376 A1 | 11/2017 | Glaser et al. | |
| 2017/0345165 A1 | 11/2017 | Stanhill et al. | |
| 2018/0084242 A1* | 3/2018 | Rublee | G06K 9/00671 |
| 2018/0164103 A1 | 6/2018 | Hill | |
| 2018/0218515 A1* | 8/2018 | Terekhov | G06K 9/00369 |
| 2018/0315329 A1 | 11/2018 | D'Amato et al. | |
| 2018/0343442 A1* | 11/2018 | Yoshikawa | G08B 13/19608 |
| 2019/0156277 A1 | 5/2019 | Fisher et al. | |
| 2020/0043086 A1 | 2/2020 | Sorensen | |

FOREIGN PATENT DOCUMENTS

| | | |
|---|---|---|
| JP | 2013196199 A | 9/2013 |
| JP | 201489626 A | 5/2014 |
| WO | 0021021 A1 | 4/2000 |
| WO | 02059836 A2 | 8/2002 |
| WO | 2017151241 A2 | 9/2017 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Phalke K, Hegadi R., "Pixel Based Object Tracking," 2015 2nd International Conference on Signal Processing and Integrated Networks (SPIN), Feb. 19, 2015 (pp. 575-578). IEEE.

Sikdar A, Zheng YF, Xuan D., "Robust Object Tracking in the X-Z Domain," 2016 IEEE International Conference on Multisensor

(56) References Cited

OTHER PUBLICATIONS

Fusion and Integration for Intelligent Systems (MFI), Sep. 19, 2016 (pp. 499-504). IEEE.

Fuentes et al., "People tracking in surveillance applications," Proceedings 2nd IEEE Int. Workshop on PETS, Kauai, Hawaii, USA, Dec. 9, 2001, 6 pages.

Manocha et al., "Object Tracking Techniques for Video Tracking: A Survey," The International Journal of Engineering and Science (IJES), vol. 3, Issue 6, pp. 25-29, 2014.

Black, J. et al., "Multi View Image Surveillance and Tracking," IEEE Proceedings of the Workshop on Motion and video Computing, 2002, https://www.researchgate.net/publication/4004539_Multi_view_image_surveillance_and_tracking/link/0c96051ac521f09b5b000000/download, pp. 1-6.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-riew_templates_of_height_and_occupancy_statistics/link/5e294888a6fdca0a1437262/download, pp. 127-142.

Huang, K. S. et al. "Driver's View and Vehicle Surround Estimation Using Omnidirectional Video Stream," IEEE V2003 Intelligent Vehicles Symposium. Proceedings (Cal. No. 03TH8683), Jun. 9-11, 2003, http://cvrr,ucsd..edu/VOW2/papers/IV03DrView_Final_Header.pdf, pp. 444-449.

Longuet-Higgens, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Rossi, M. And Bozzoli, E A., "Tracking and Counting Moving People," IEEE Int'l Conf. on Image Processing, ICIP-94, Nov. 13-16, 1994, http://citeseerx.ist.psu.edu/viewdoc/download;sessionid=463D09F419FA5595DBF9DEF30D7EC663?doi=10.1.1.331.6672&rep=rep1&type=pdf, 5 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSG-TR-98-71, Microsoft Research, Microsoft Corporation, microsoft.com/en-us/research/wp-content/uploads/2016/02/tr98-71.pdf, 22 pages.

\* cited by examiner

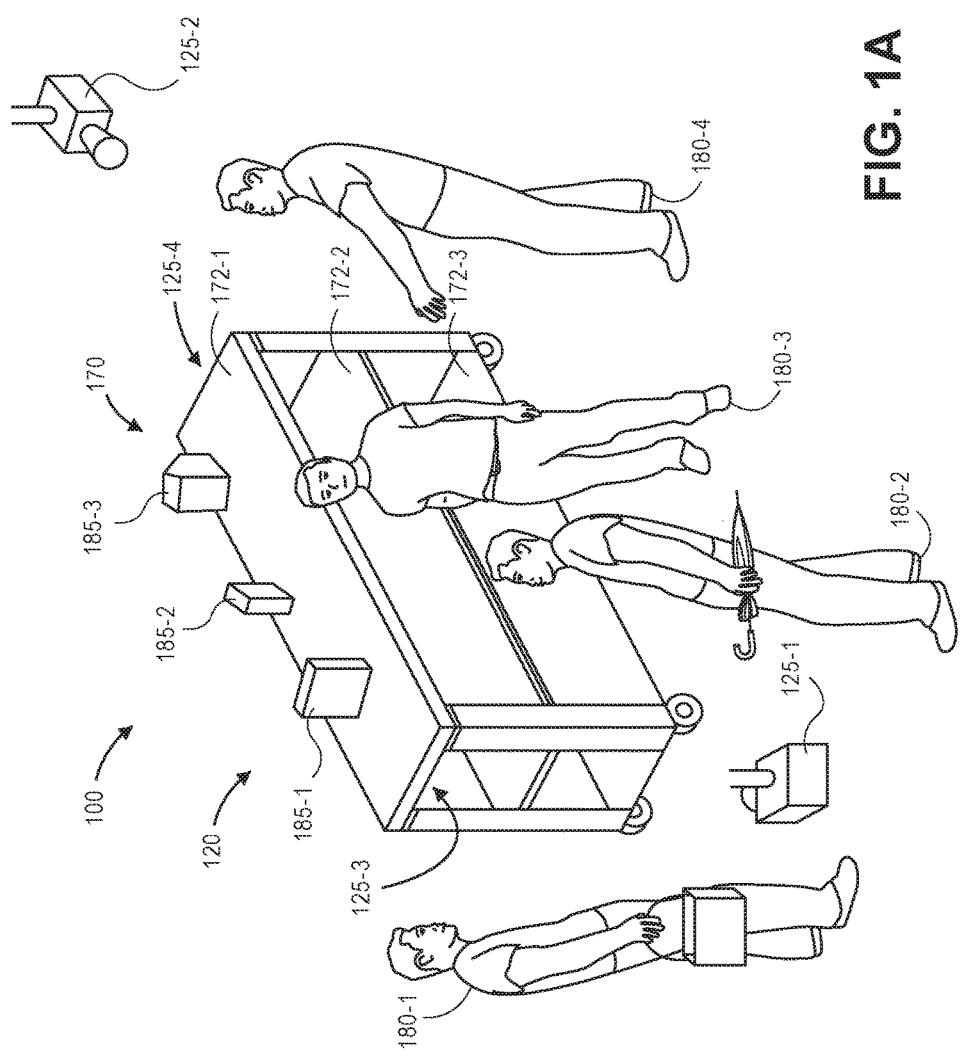

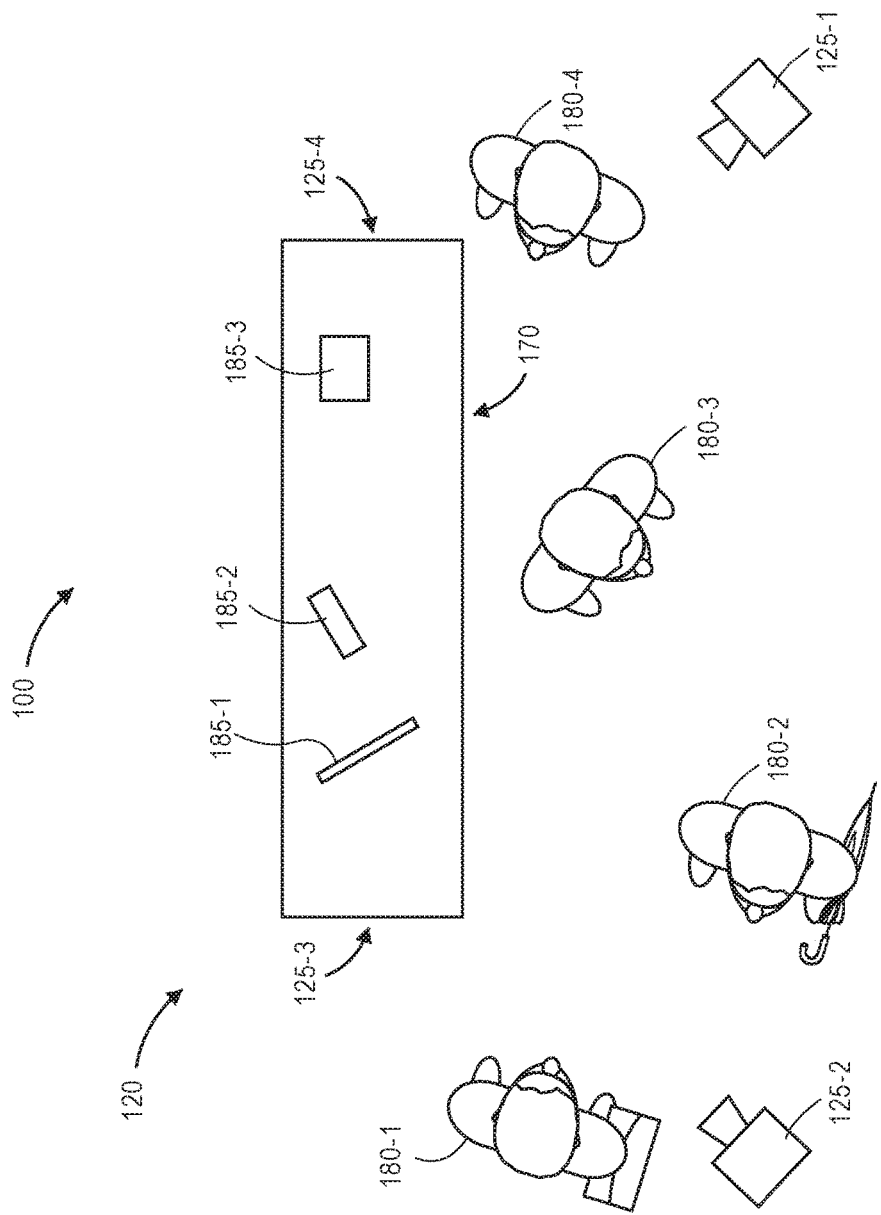

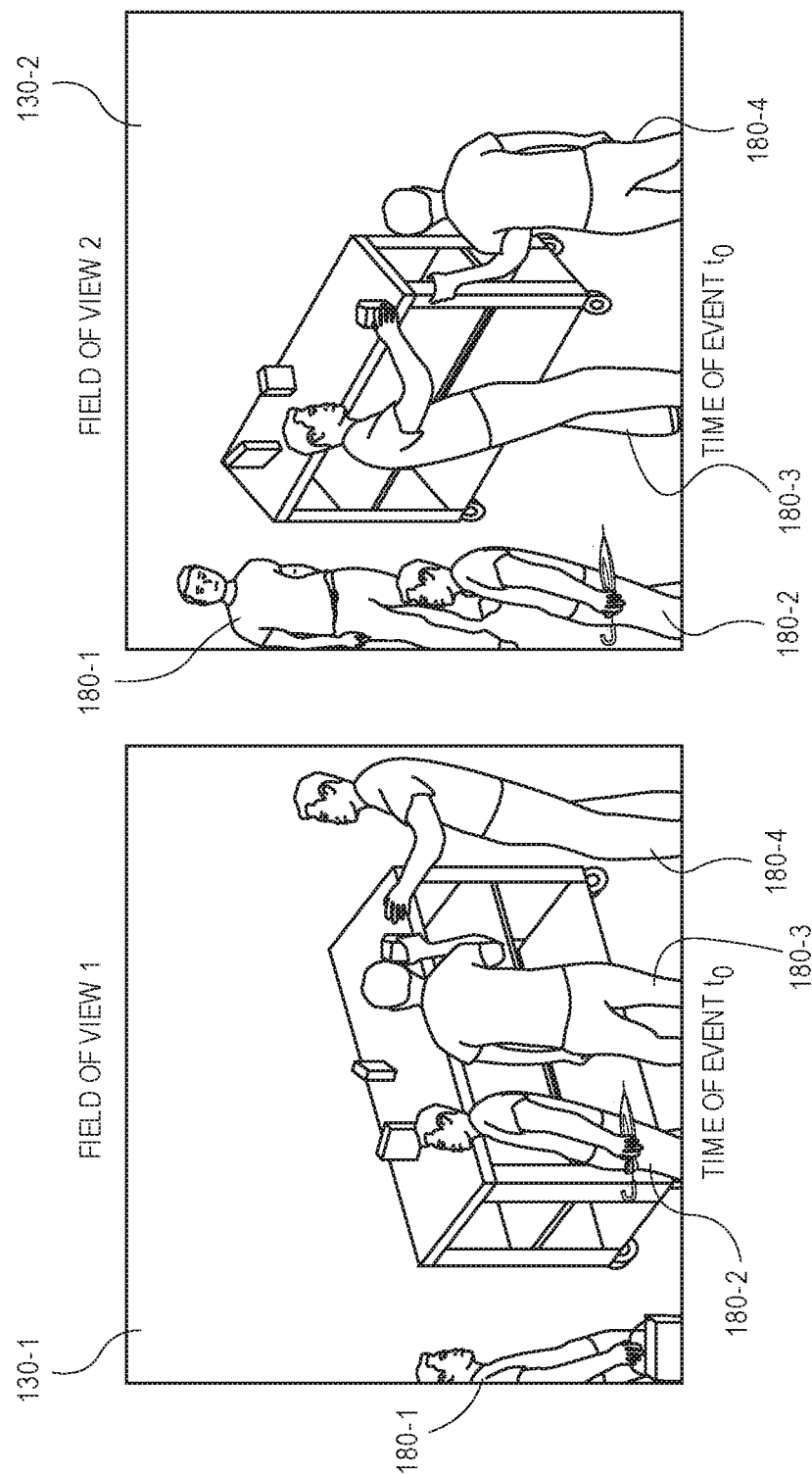

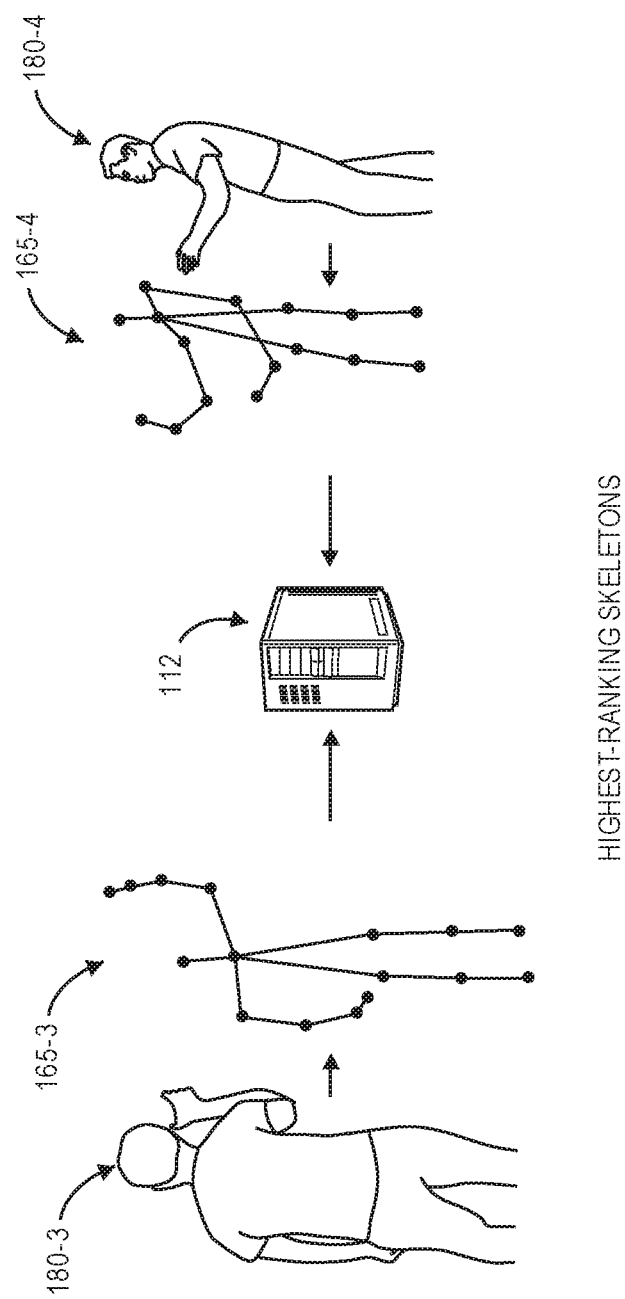

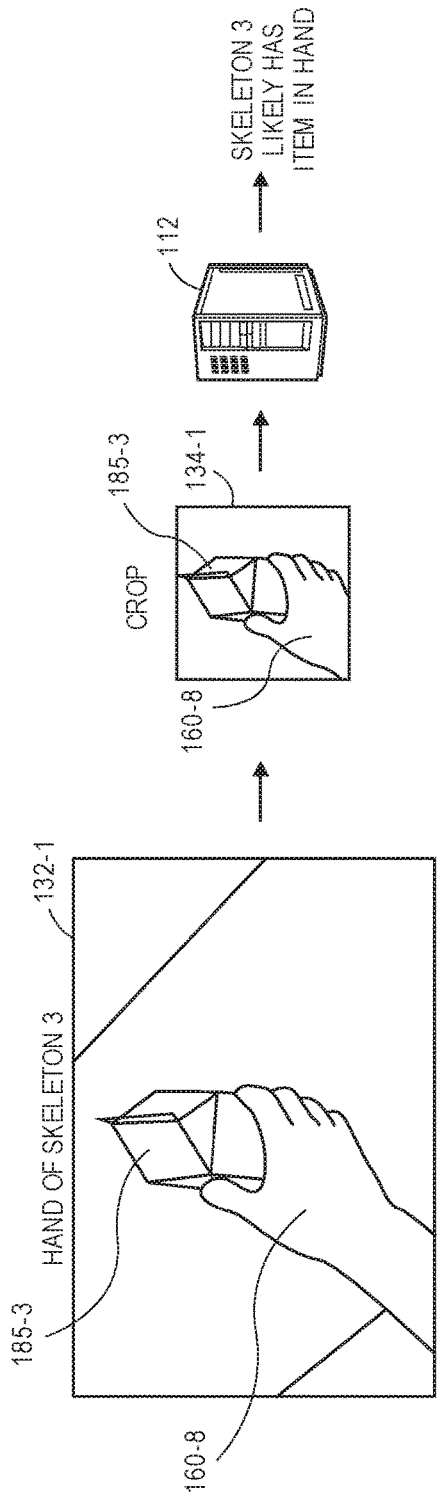
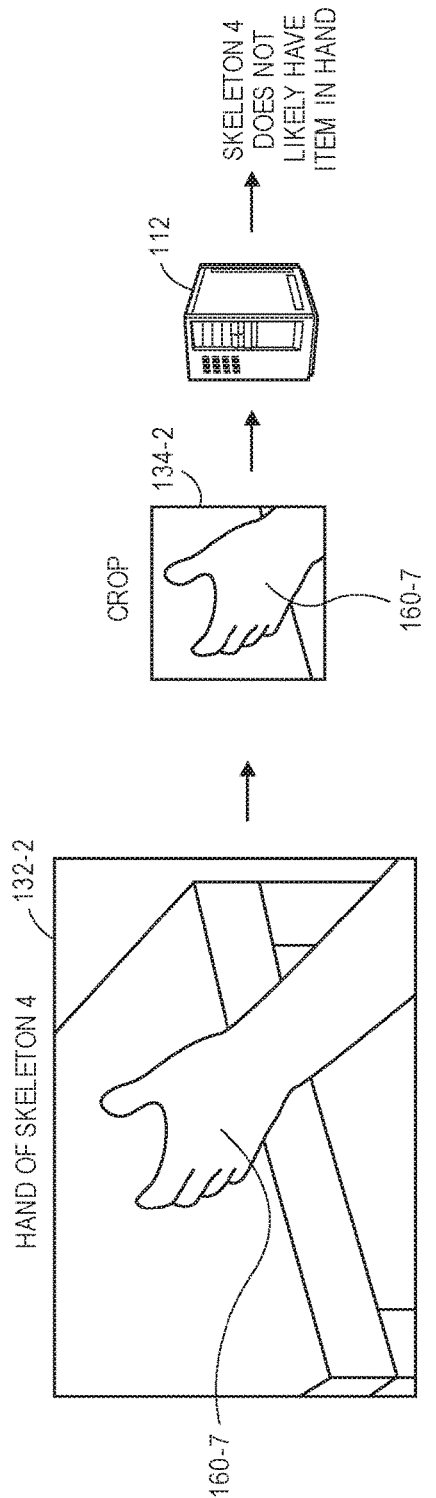

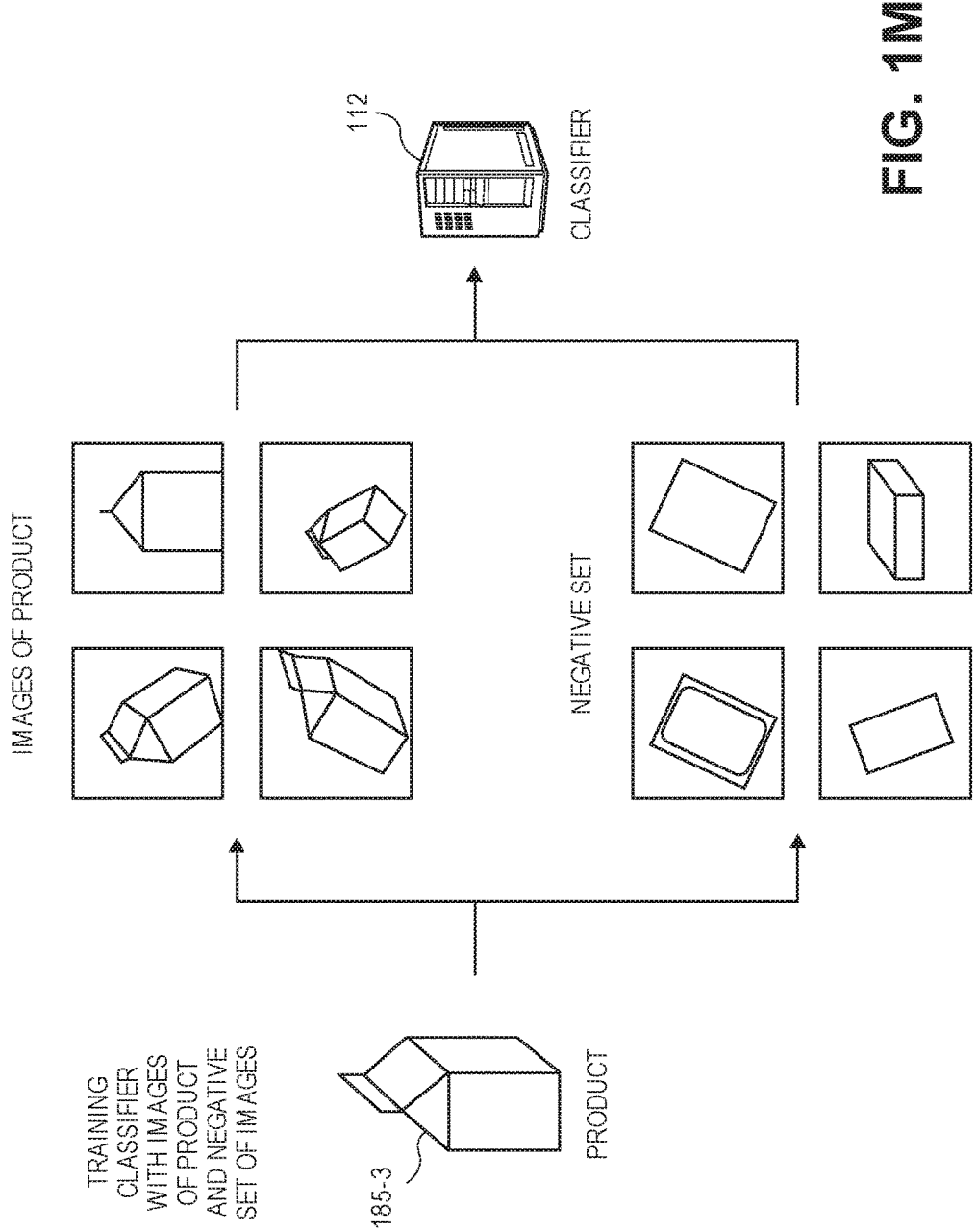

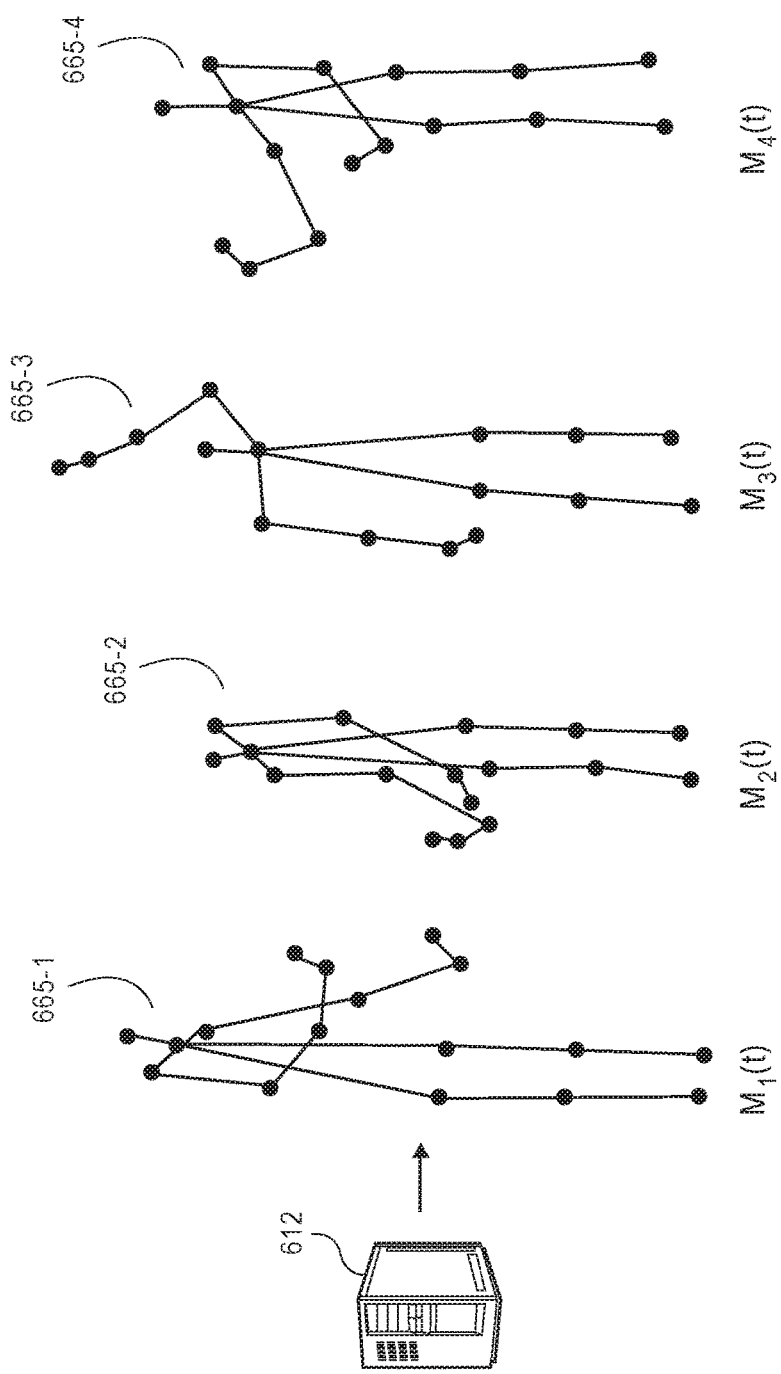

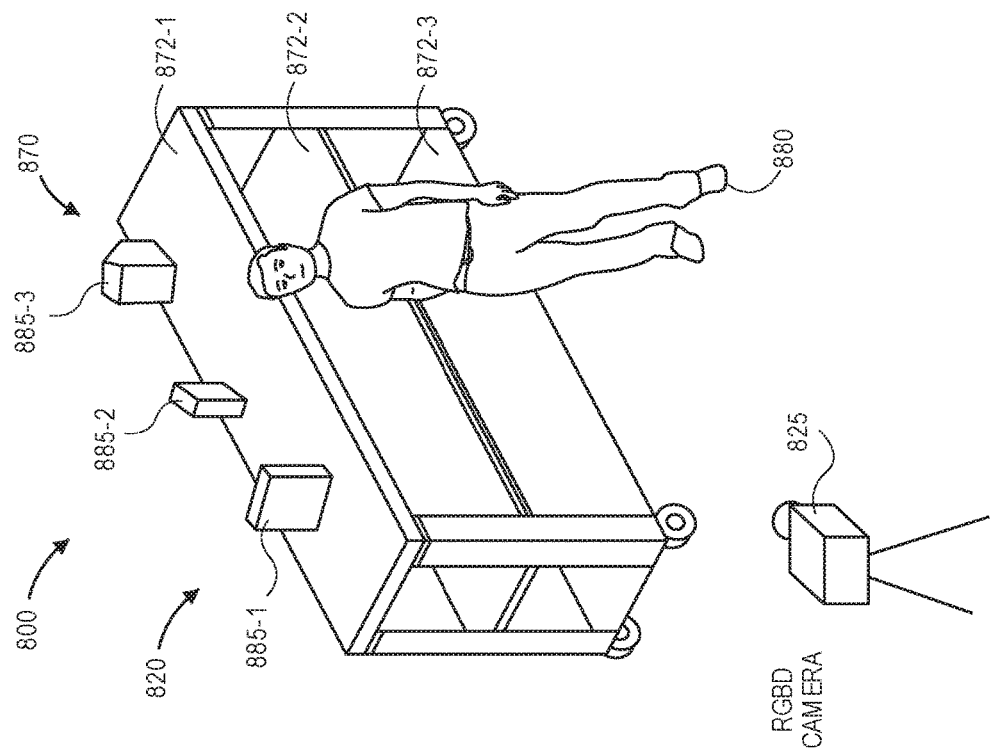

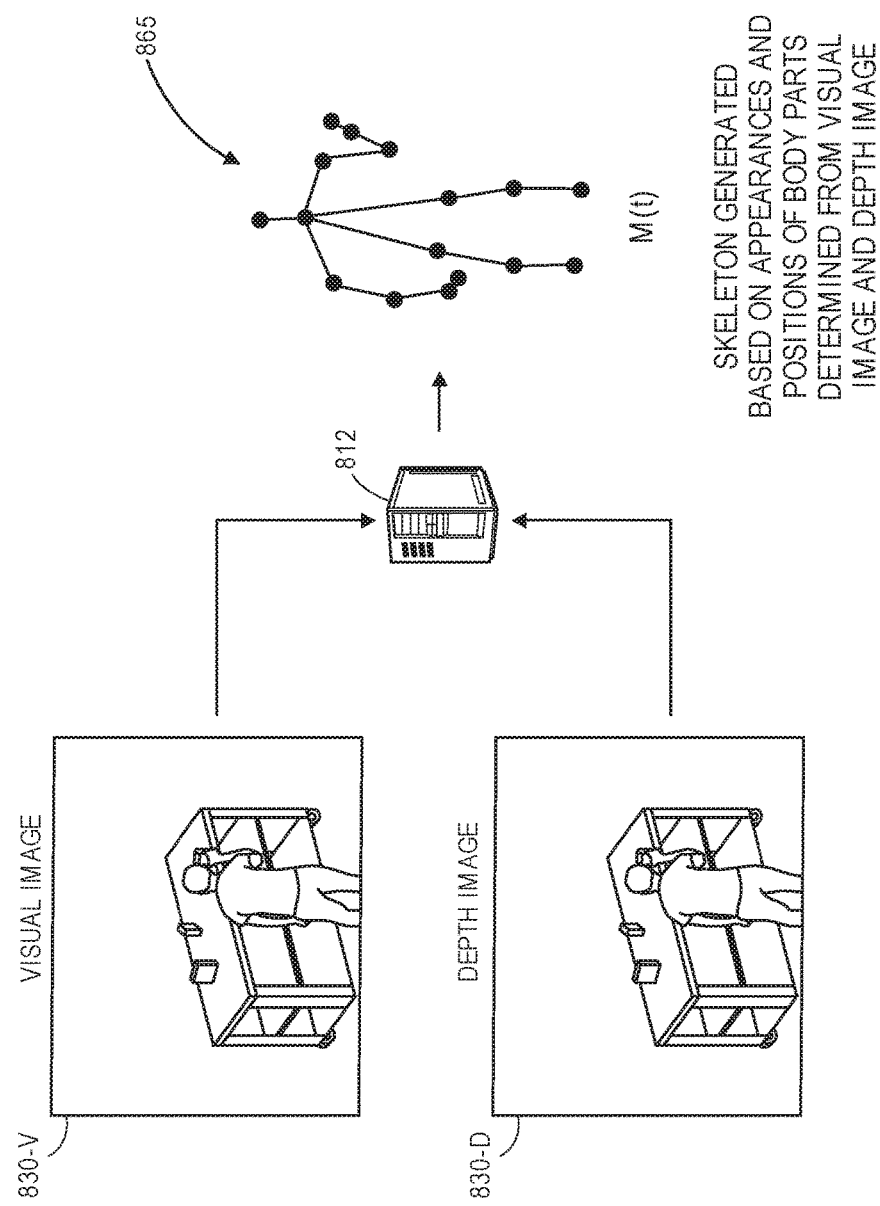

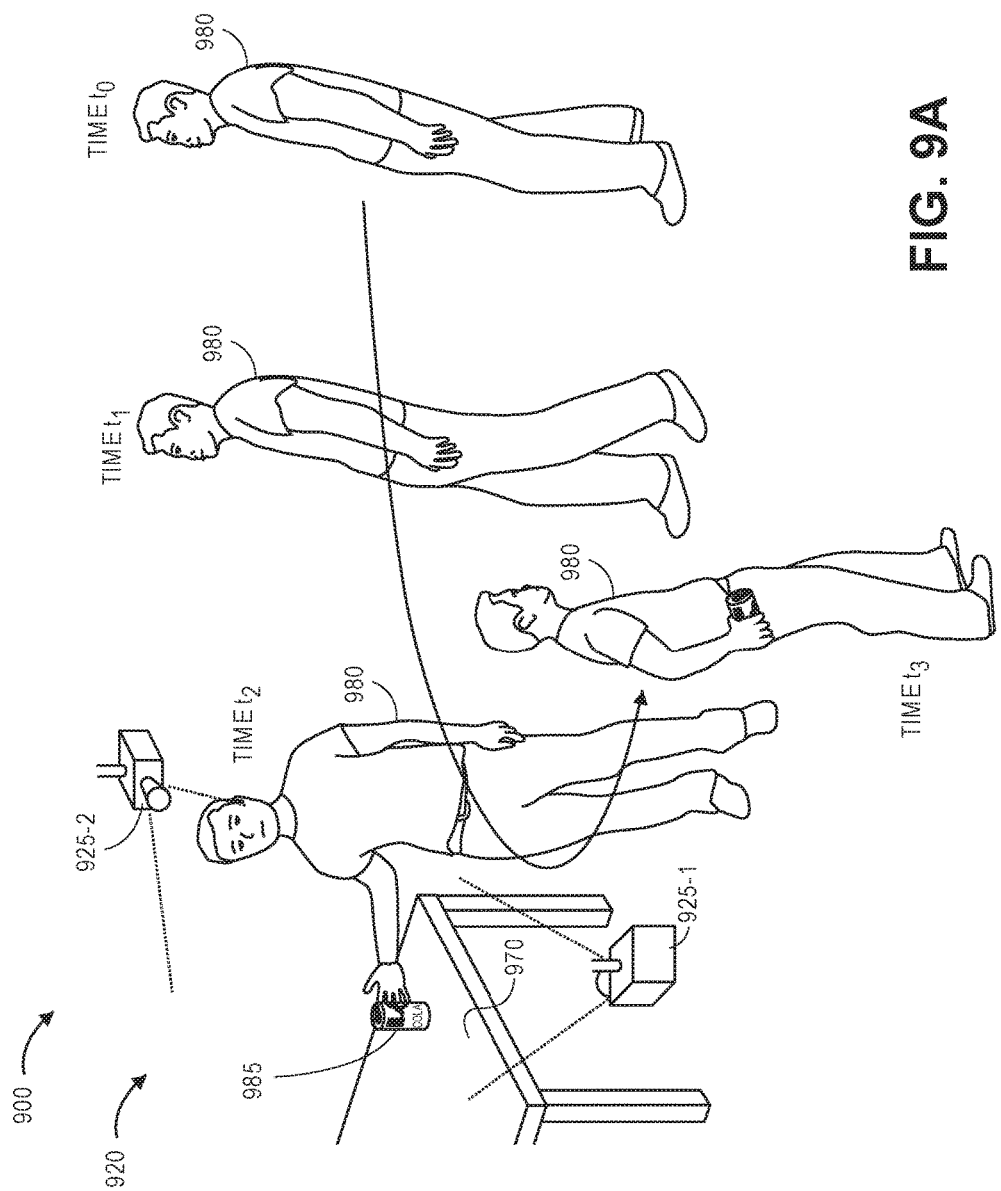

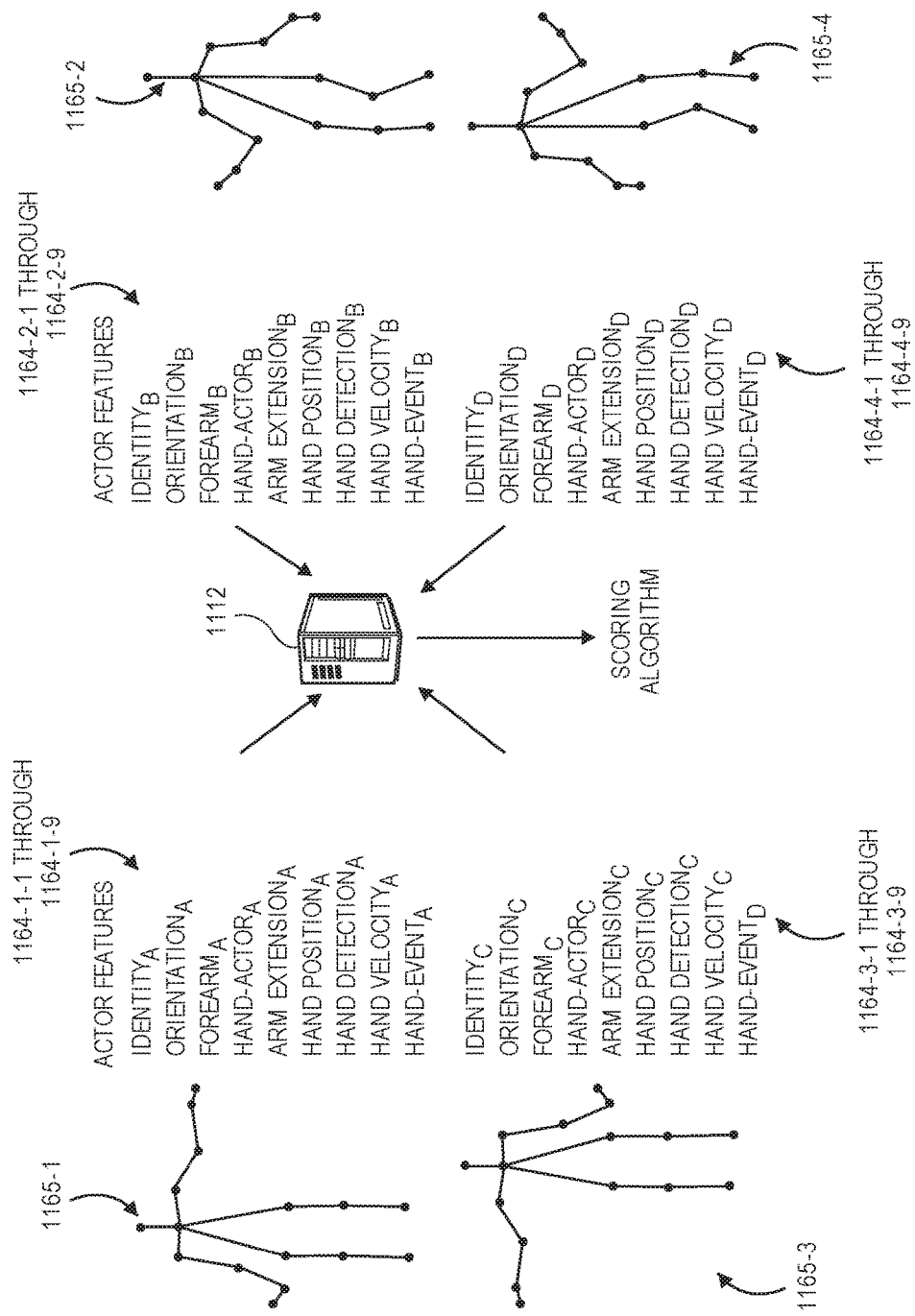

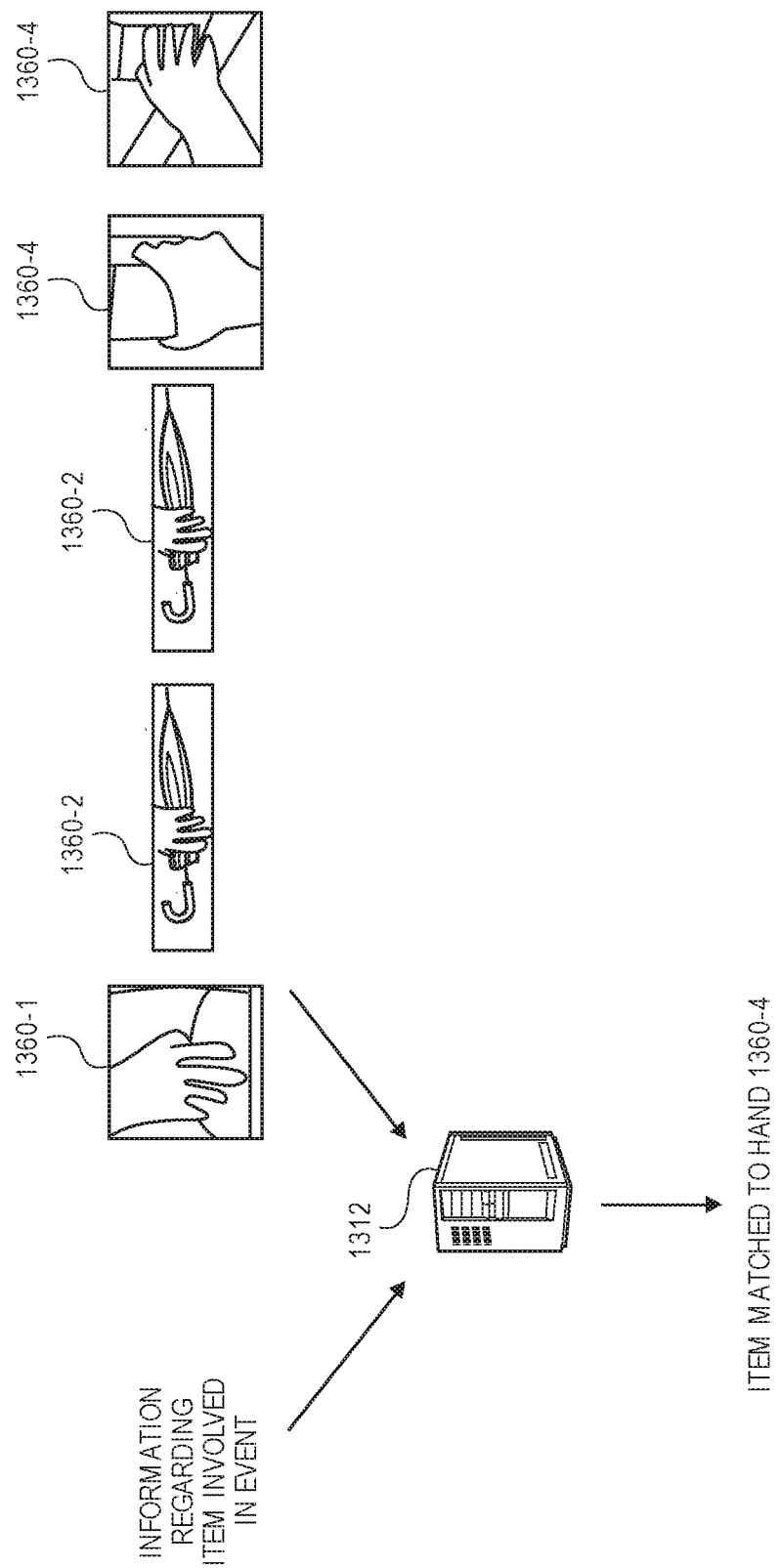

US 11,030,442 B1

ASSOCIATING EVENTS WITH ACTORS BASED ON DIGITAL IMAGERY

BACKGROUND

Today, imaging devices such as digital cameras are frequently used for conducting surveillance or monitoring operations. For example, digital cameras are also often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, a plurality of digital cameras (or other imaging devices) may be provided in a network, and aligned and configured to capture imaging data such as still or moving images of actions or events occurring within their respective fields of view. The digital cameras may include one or more sensors, processors and/or memory components or other data stores. Information regarding the imaging data or the actions or events depicted therein may be subjected to further analysis by one or more of the processors operating on the digital cameras to identify aspects, elements or features of the content expressed therein.

In dynamic environments such as materials handling facilities, transportation centers, financial institutions or like structures in which diverse collections of people, objects or machines enter and exit from such environments at regular or irregular times or on predictable or unpredictable schedules, it is frequently difficult to determine which, if any, of the people, objects or machines is associated with a given event occurring within such environments based on imaging data alone. In particular, where the digital cameras of a network each have fixed orientations, or where fields of view of the digital cameras include large numbers of people, objects or machines that have varying sizes or shapes and travel at varying velocities, recognizing and distinguishing between poses of multiple actors may be exceptionally challenging.

BRIEF DESCRIPTION OF THE DRAWINGS

FIGS. 6A through 6C are views of aspects of one system for associating events with actors based on digital imagery in accordance with implementations of the present disclosure.

FIGS. 8A through 8C are views of aspects of one system for associating events with actors based on digital imagery in accordance with implementations of the present disclosure.

FIGS. 9A through 9C are views of aspects of one system for associating events with actors based on digital imagery in accordance with implementations of the present disclosure.

FIGS. 11A and 11B are views of aspects of one system for associating events with actors based on digital imagery in accordance with implementations of the present disclosure.

FIGS. 13A through 13C are views of aspects of one system for associating events with actors based on digital imagery in accordance with implementations of the present disclosure.

DETAILED DESCRIPTION

As is set forth in greater detail below, the present disclosure is directed to using digital imagery captured from one or more fields of view to associate events with actors (e.g., users, workers, customers or other personnel), such as one or more actors within a materials handling facility. More specifically, one or more implementations of the present disclosure are directed to detecting that an event involving an item has occurred within an environment, such as a materials handling facility, where one or more imaging devices (e.g., digital cameras) are provided and aligned to capture imaging data from various fields of view. After an event has been detected, all or a subset of the imaging devices that likely captured digital images of the event from a diverse set of views may be identified and selected. Digital images captured by each of such imaging devices for predetermined periods of time preceding and following the event may be accessed and processed, e.g., by one or more classifiers, to recognize body parts represented within such images, and to generate articulated models, e.g., virtual skeletons, of each of a plurality of actors that are depicted in one or more fields of view during the periods of time from one or more of such body parts. In some implementations, the various skeletons may be ranked based on features regarding the scene from which the imaging data was captured, or features regarding the positions and/or motion of the skeletons, e.g., tracklets or trajectories of nodes corresponding to body parts, to determine which of the skeletons corresponds to an actor that was responsible for the event. In some implementations, the skeletons may be used to determine positions of hands of the various actors at times preceding and following the event. Images captured at such times to determine which of such hands includes the item therein.

Figure 1C:
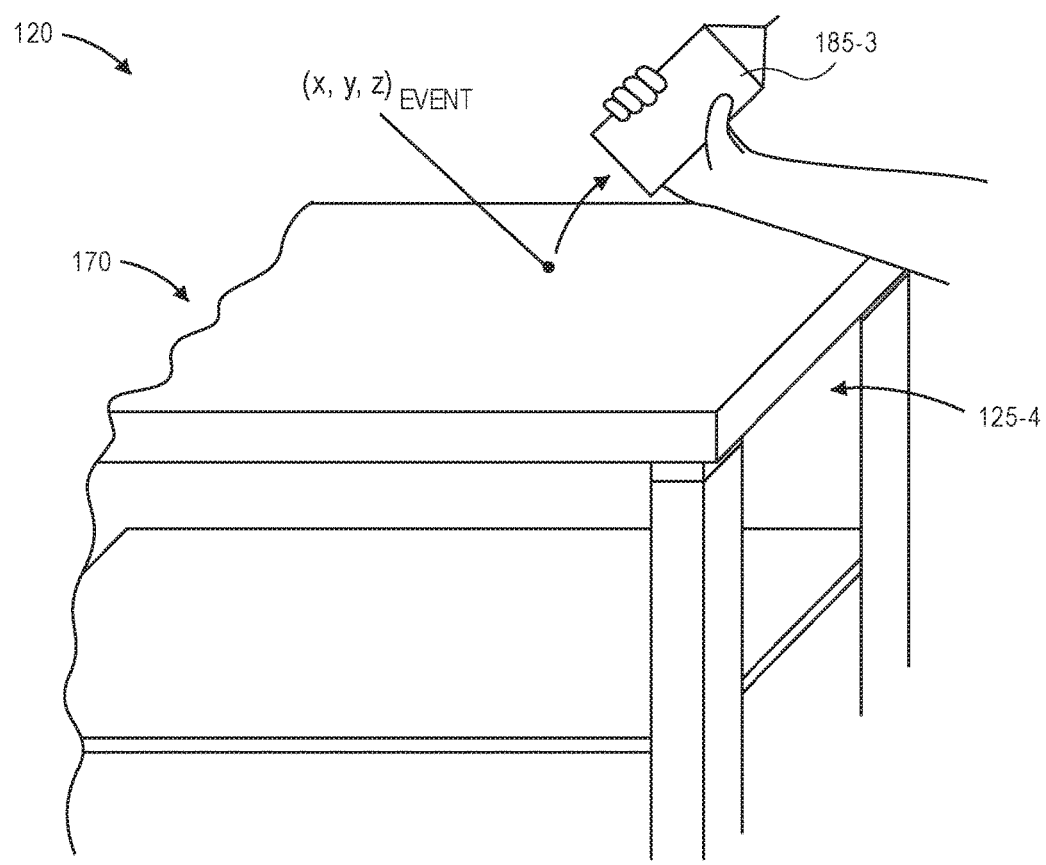
FIGS. 1A through 1N are views of aspects of one system for associating events with actors based on digital imagery in accordance with implementations of the present disclosure.
Figure 1E:
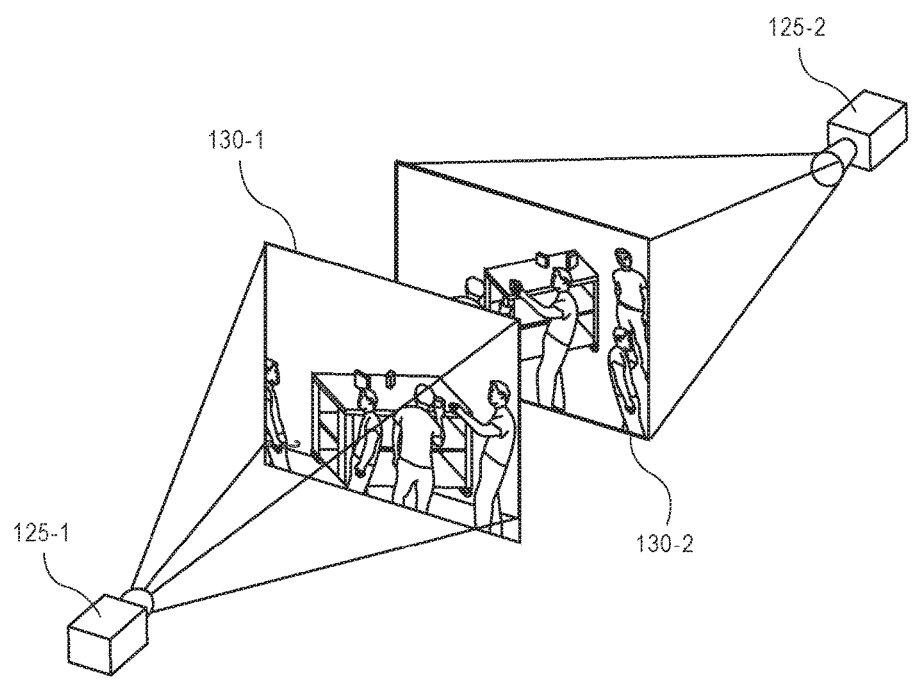
Figure 1F:
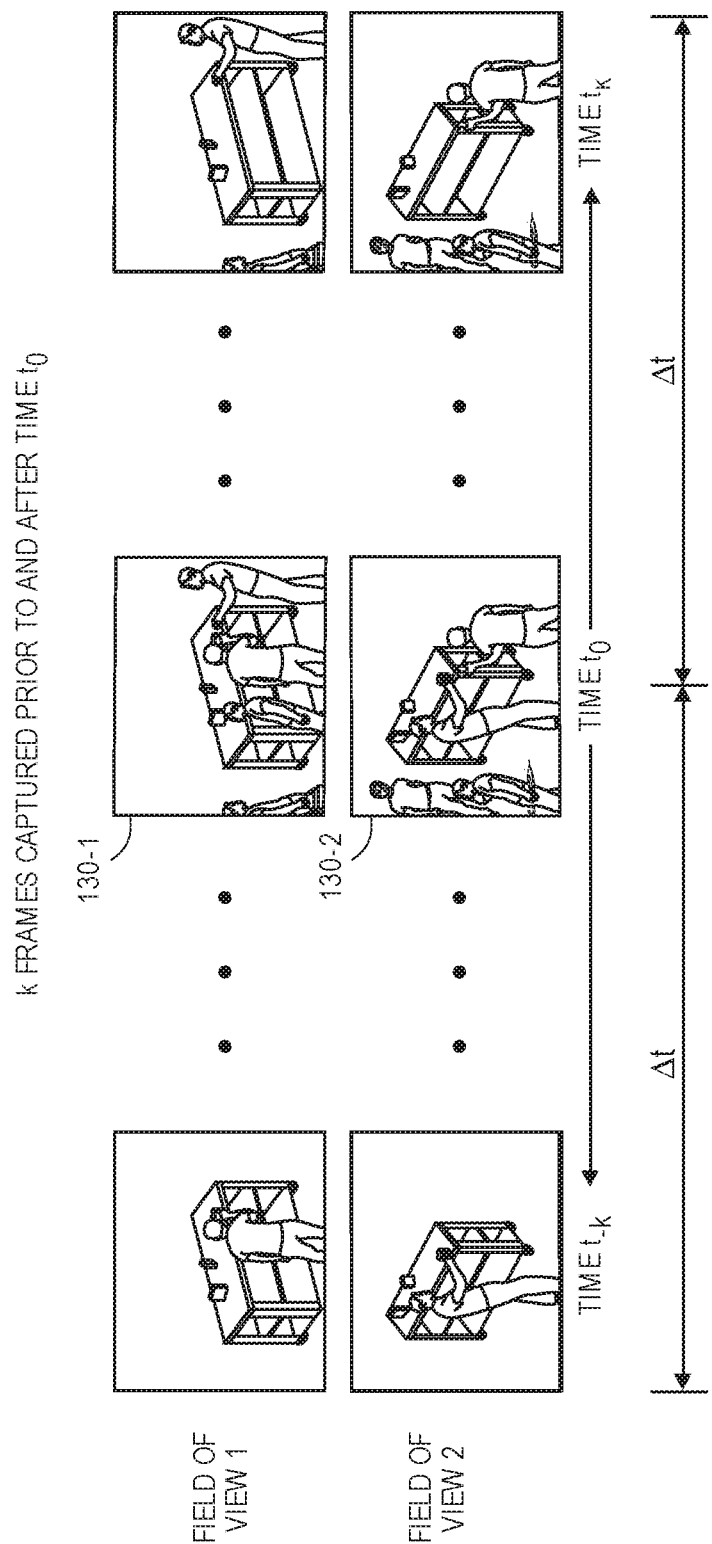
Figure 1G:
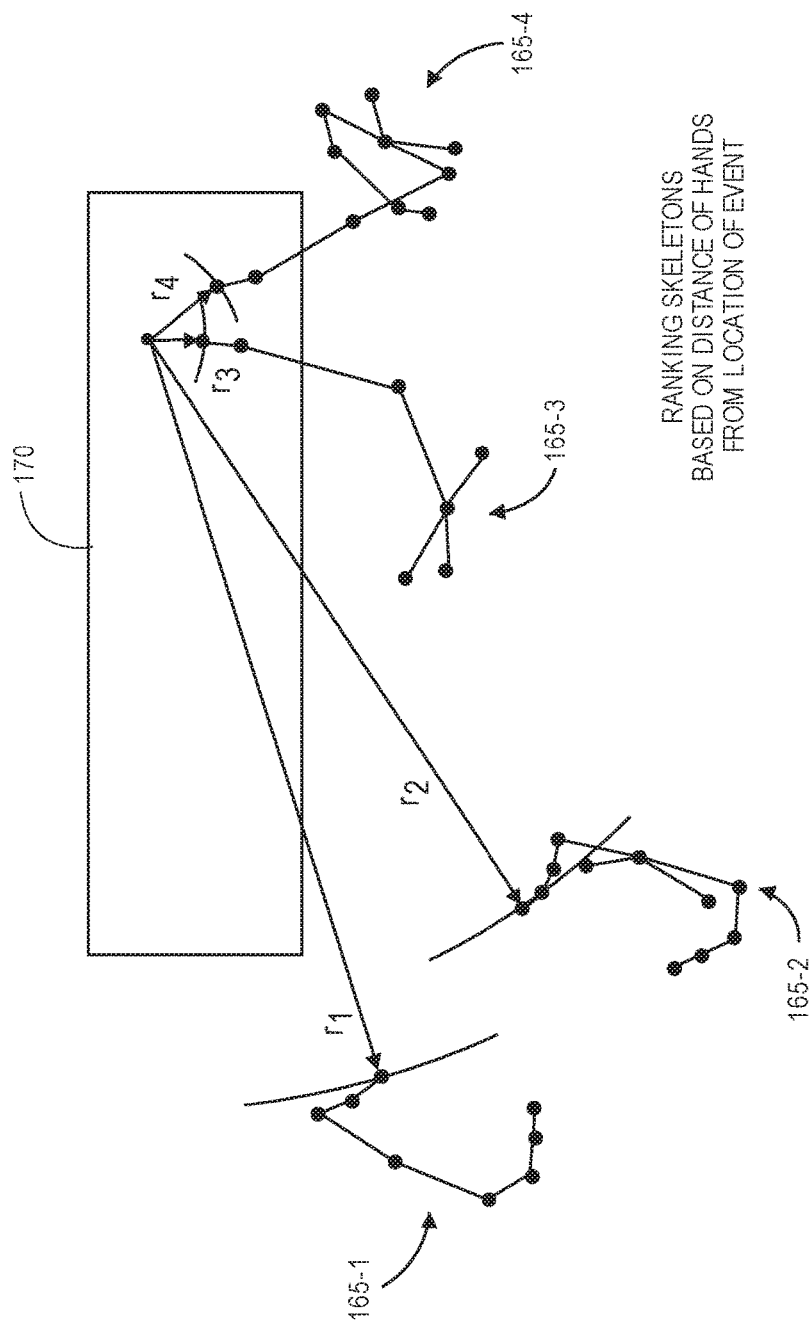
Figure 1H:
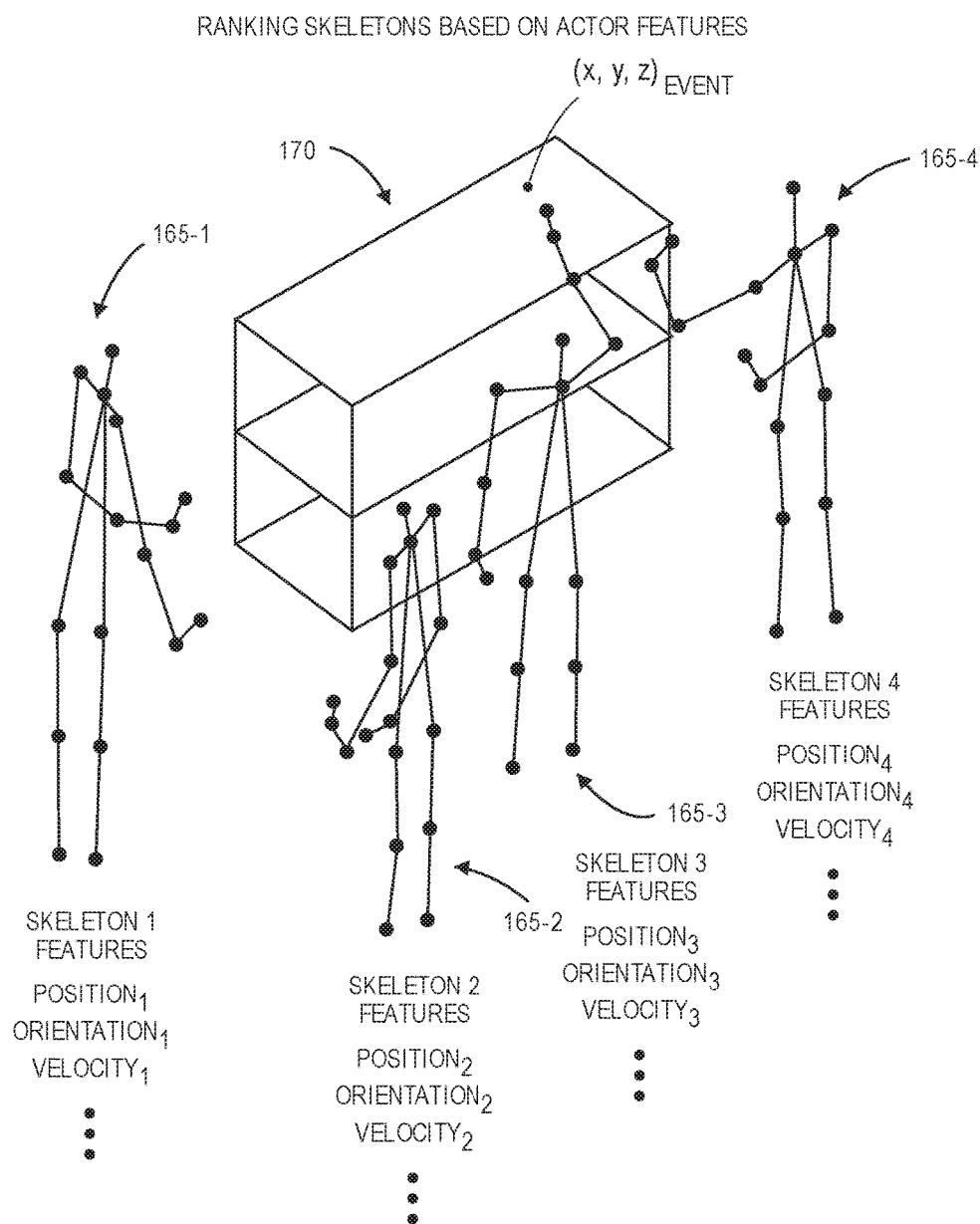
Figure 1J:
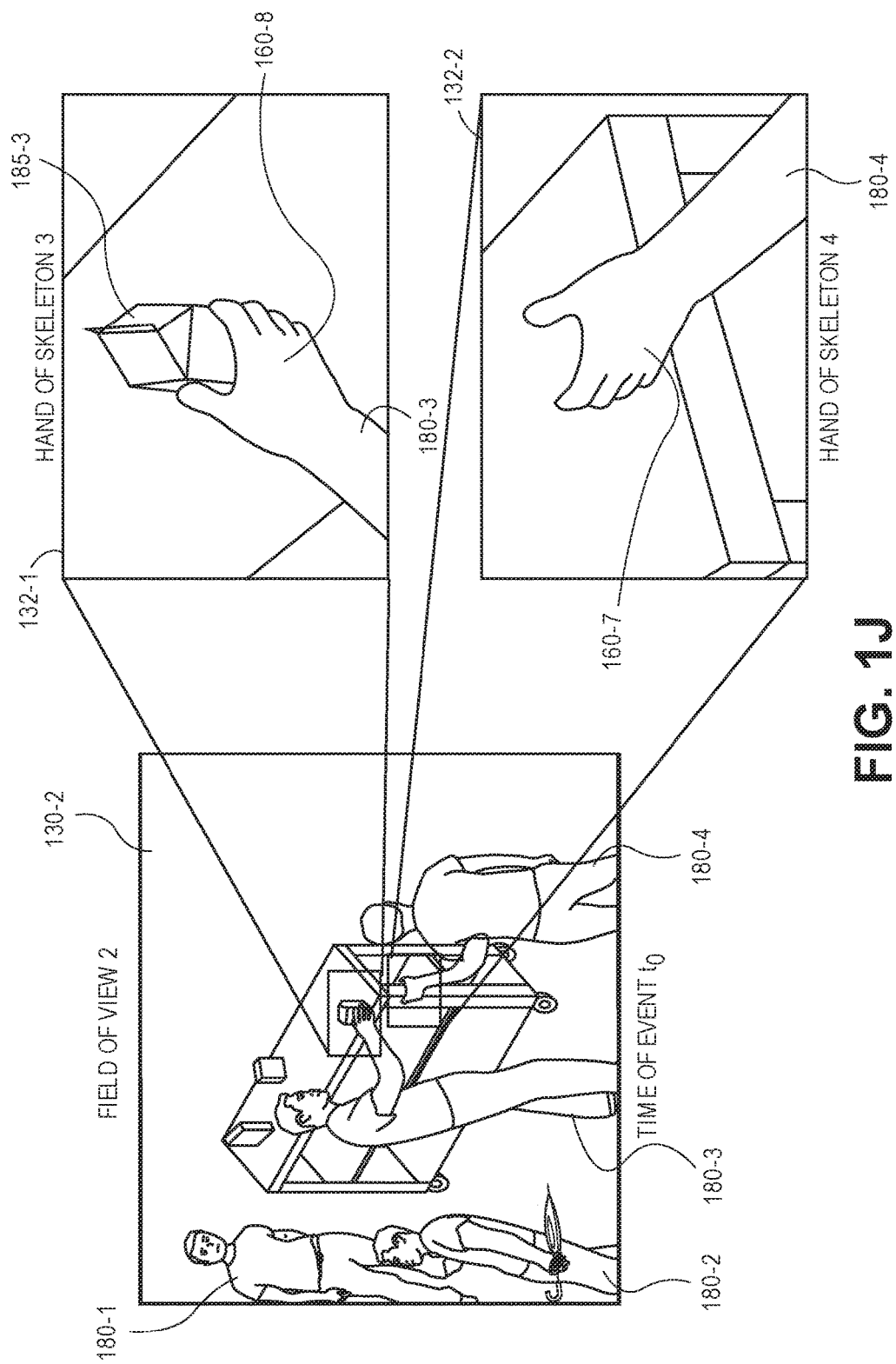
Figure 1N:
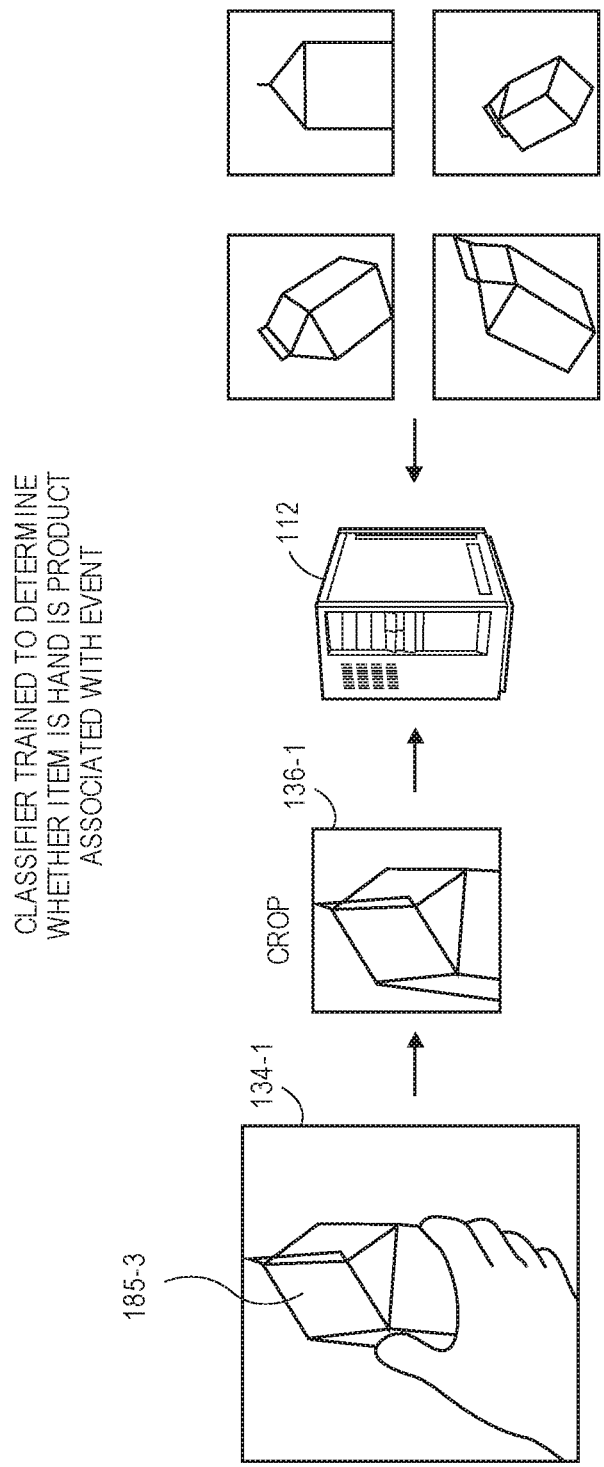

Referring to FIGS. 1A through 1N, views of aspects of one system 100 for associating events with actors based on digital imagery in accordance with implementations of the present disclosure are shown. As is shown in FIGS. 1A and 1B, the system 100 includes a scene 120 having a pair of calibrated imaging devices 125-1, 125-2 (e.g., digital cameras) and a storage unit 170 (e.g., a set of shelves 172-1, 172-2, 172-3) having a plurality of load sensors (or weight sensors) 125-3, 125-4 and a plurality of items 185-1, 185-2, 185-3 on the shelf 172-1. The imaging devices 125-1, 125-2 are installed or otherwise operated in an imaging device network (or camera network), and are in communication with one or more computer devices or systems (not shown). The load sensors 125-3, 125-4 may be disposed beneath or otherwise in association with one or more of the shelves 172-1, 172-2, 172-3 of the shelving unit 170, or one or more supports of such shelves, and may also be in communication with one or more computer devices or systems (not shown), which may further include one or more databases or other data stores having information regarding attributes that are, have been or might be stored on one or more of the shelves 172-1, 172-2, 172-3 of the shelving unit 170. Such attributes may include, but are not limited to, one or more dimensions and/or masses of such items, locations on the shelves 172-1, 172-2, 172-3 of the shelving unit 170 where such items are typically placed, or colors or textures of surface elements (e.g., packaging, wrapping, coverings or the like) of such items, or any other attributes. In some implementations, discussed below, the system 100 may operate without the use of the load sensors 125-3, 125-4, or any other sensors, and may rely instead on imaging data or other data captured by the imaging devices 125-1, 125-2.

The scene 120 may be any open or enclosed environment or space in which any number of actors (e.g., humans, other animals or machines) may execute one or more poses, gestures or other actions within the fields of view of the imaging devices 125-1, 125-2, including the actors 180-1, 180-2, 180-3, 180-4. In some implementations, the scene 120 may be or include at least a portion of a materials handling facility. The load sensors 125-3, 125-4 may be load cells or other systems that are configured to generate load signals consistent with levels of loading on one or more of the shelves 172-1, 172-2, 172-3 of the storage unit 170, and such signals may be processed to determine weights of items placed thereon, or changes in such weights. Any number of load sensors may be provided in association with the storage unit 170 or one or more of the shelves 172-1, 172-2, 172-3, in various layouts, configurations or positions. For example, in some implementations, load sensors may be provided symmetrically or asymmetrically, with one or more of such sensors provided at front or rear sides of the storage unit 170, or one or more of such sensors provided on left or right sides of the storage unit 170. Additionally, in some implementations, the storage unit 170 may be outfitted generally with one or more sets of such load sensors that may be configured to generate load signals consistent with levels of loading on the storage unit 170 as a whole. Alternatively, in some other implementations, one or more of the shelves 172-1, 172-2, 172-3 may be respectively outfitted with load sensors that may be configured to generate load signals consistent with levels of loading on each of the respective shelves 172-1, 172-2, 172-3.

As is shown in FIGS. 1A and 1B, the imaging devices 125-1, 125-2 are aligned with fields of view that overlap at least in part over a portion of the scene 120, and are configured to capture imaging data, such as still or moving images, from the scene 120. As is also shown in FIGS. 1A and 1B, the actors 180-1, 180-2, 180-3, 180-4 are executing one or more poses or gestures in the scene 120.

One or more of the implementations of the present disclosure may be configured to associate an event involving an item that occurs on a scene with one or more actors on the scene based on imaging data captured by imaging devices prior to, during and after the event. In accordance with the present disclosure, an event may be detected in any manner and by any number of devices or components. For example, as is shown in FIG. 1C, an event may be detected when an item 185-3 is lifted from the storage unit 170, at a location on one of the shelves 172-1, 172-2, 172-3 of the storage unit 170. In some implementations, the event may be detected based on changes in loading on one or more of the shelves 172-1, 172-2, 172-3 of the storage unit 170 (e.g., due to picking or stowing events, or other events in which one or more items are placed thereon or removed therefrom), as detected by one or more of the load sensors 125-3, 125-4. In still other implementations, the event may be detected by one or more radiofrequency identification (RFID) sensors (e.g., antennas and/or tags), light detection and ranging (LIDAR) sensors (e.g., laser light sources and/or receivers), or by any other type or form of sensors (not shown) that may be provided in association with the item 185-3 and/or the storage unit 170. A location of an event may be determined by any of such sensors or components, or according to any algorithm or technique, and represented in space by a set of Cartesian coordinates, e.g., the location $(x, y, z)_{EVENT}$, or coordinates according to any other system.

In some other implementations, an event may be detected (or a location of the event may be determined) based on imaging data captured by one or more imaging devices, e.g., imaging devices 125-1, 125-2, or others (not shown). For example, in any set of imaging data (e.g., video data captured by an imaging device), aspects of any number of events may be depicted therein, and the imaging data may be continuously or regularly monitored in order to determine whether an event has occurred.

An event may also be detected based on any analysis of imaging data captured by the imaging devices 125-1, 125-2. In some implementations, an event may be detected where contents of the scene 120 are determined to have changed in any pair of images (e.g., a before-and-after comparison of images depicting aspects of the scene 120, such as the storage unit 170, at different times). In some other implementations, an event may be determined to have occurred where one or more body parts (e.g., a hand of an actor) are detected within a predetermined range or distance of the storage unit 170 in one or more images. Therefore, the scene 120 need not require any sensors (e.g., the load sensors 125-3, 125-4), other than the imaging devices 125-1, 125-2, in order to determine that an event involving one or more items has occurred, particularly where imaging data being captured by the imaging devices 125-1, 125-2 is analyzed on a regular basis. Rather, events may be detected and locations of events may be determined based on information or data (e.g., the imaging data captured by the imaging devices 125-1, 125-2) that has already been captured. For example, in some implementations, imaging data may be continuously or regularly evaluated to determine whether an event has occurred. In such implementations, imaging data may be processed according to one or more of the systems or methods disclosed herein if an event is determined to have occurred, to a predetermined level of confidence or accuracy, or discarded when it is determined that no event has occurred.

Moreover, an event may be determined to have occurred based on information or data obtained by a combination of sensors. For example, information or data may be captured by an imaging device (e.g., one or more of the imaging devices 125-1, 125-2, or others), a load sensor (e.g., one or more of the load sensors 125-3, 125-4, or others), or any other sensors (e.g., any RFID sensors, LIDAR sensors, or any other type or form of sensors). The information or data captured by the variety of sensors may be independently or collectively evaluated in order to determine a measure of a probability or likelihood that an event has occurred at the scene 120, and processed according to one or more of the systems or methods disclosed herein if an event is determined to have occurred, to a predetermined level of confidence or accuracy, or discarded when it is determined that no event has occurred. Likewise, a location of an event may be determined based on information or data captured by any of such sensors, which may be independently or collectively evaluated in order to identify the location at which the event has most likely occurred.

Digital images captured by the respective imaging devices 125-1, 125-2 may be processed to identify actors that are present on the scene 120 prior to, during and after an event. As is shown in FIG. 1D, images 130-1, 130-2 captured by the respective imaging devices 125-1, 125-2 at a time $t_0$ at which the event is determined to have occurred are shown. The images 130-1, 130-2 depict the positions of the respective actors 180-1, 180-2, 180-3, 180-4 at the time $t_0$. As is shown in FIG. 1E, the imaging devices 125-1, 125-2 are each aligned to include the location $(x, y, z)_{EVENT}$ within their respective fields of view, and to capture imaging data, e.g., the images 130-1, 130-2, therefrom. Alternatively, the scene 120 may be configured with a plurality of imaging devices, including the imaging devices 125-1, 125-2 and others, and a subset of the plurality of imaging devices having the location $(x, y, z)_{EVENT}$ within their respective fields of view may be selected. The imaging devices may be selected to ensure that the location $(x, y, z)_{EVENT}$ is depicted within a diverse set of imaging data, but also to minimize processing time and/or avoid duplicate calculations. The item 185-3, or a type of the item 185-3, and/or the location $(x, y, z)_{EVENT}$ may be determined or identified based on load signals, or changes in load signals, generated by the load sensors 125-3, 125-4. For example, where the item 185-3, or items of a type of the item 185-3, is commonly picked from or stowed at the location $(x, y, z)_{EVENT}$, e.g., the shelf 172-1, a determination that an event has occurred at the location $(x, y, z)_{EVENT}$ based on information or data provided by any source or system may be used to identify the item 185-3 or the type of item 185-3 accordingly. In some implementations, the location $(x, y, z)_{EVENT}$ may be associated with a type of the item 185-3 such as a brand, a category, an identifier, or any other attribute associated with items such as the item 185-3. The items of the type of the item 185-3 may share common dimensions, contents or other attributes, or may be identical in form or function.

In some implementations, the systems and methods of the present disclosure may process not only images captured at a time at which an event is detected, e.g., the images 130-1, 130-2 shown in FIG. 1D that were captured at the time $t_0$, but also images captured immediately prior to or following the event. As is shown in FIG. 1F, a plurality of images captured by each of the imaging devices 125-1, 125-2 during predetermined periods of time $\Delta t$ preceding and following the time $t_0$ at which the event was detected are shown. For example, as is shown in FIG. 1F, a plurality of k frames captured during the periods of time $\Delta t$ preceding and following the time $t_0$ of the event by each of the imaging devices 125-1, 125-2 are identified.

Each of the images captured by the imaging devices 125-1, 125-2 during the predetermined periods of time $\Delta t$ preceding and following the time $t_0$ may be processed by one or more computer processors operating on the imaging devices 125-1, 125-2 or on an external computer server (or other device or system) in order to detect the presence and locations of one or more body parts (e.g., joints) represented within the respective frames. For example, in some implementations, a score map identifying which portions of the image frame, if any, include one of a predetermined number of body parts therein may be generated for each of a plurality of body parts. The images may be processed by a classifier, an algorithm or another technique for detecting one or more body parts within image frames. In some implementations, the images may be processed by a deep neural network, a convolutional neural network, a support vector machine, or any other type or form of classifier that is trained to recognize any number of discrete body parts within image frames captured from multiple perspectives. For example, in some implementations, the image frames captured by the imaging devices 125-1, 125-2 may be processed to generate one score map for each of any number of body parts, including but not limited to one or more of a head, a neck, a left shoulder, a right shoulder, a left elbow, a right elbow, a left wrist, a right wrist, a left hand, a right hand, a left hip, a right hip, a left knee, a right knee, a left ankle or a right ankle. The score maps generated thereby may be graphical representations of probabilities that any given pixel within a body frame depicts at least a portion of a given body part. Locations of local or absolute peak values within the respective score maps may be determined to correspond to specific body parts and identified as such.

In some other implementations, body parts may be identified within one or more image frames by any other means. For example, one or more of the imaging devices may be configured to generate and update detections of body parts and edges extending therebetween based on monocular cues detected within visual image frames. For example, an imaging device may be configured to operate a classifier, an algorithm or a technique that is trained to recognize one or more actors on a scene, as well as specific aspects of the scene such as structural elements including but not limited to walls, buildings and/or windows, ground-based elements such as streets, walkways, or the like, or natural elements such as plant life, represented within image frames captured thereby. Positions of the actors may be determined in two-dimensional space, e.g., within an image plane of the imaging device, or in three-dimensional space, e.g., based on distances or depths to the actors determined based on the one or more specific aspects of the scene. In some implementations, the classifiers, algorithms or techniques may take into account one or more known attributes of a scene, or prior activities that occurred on the scene, in determining positions of body parts of actors on the scene either in two-dimensional space within an image plane of the imaging device or in three-dimensional space on the scene. Such classifiers, algorithms or techniques may include, but are not limited to, a Markov Random Field, a Markov network or other like model. The imaging device may also detect one or more body parts of actors represented within image frames captured thereby and determine their respective positions or extend edges therebetween based on one or more actual and/or predicted physiological parameters or constraints (e.g., known or predicted bone lengths).

In still other implementations, body parts may be identified within visual image frames and depth image frames captured by an imaging device, e.g., an RGBD camera. Body parts may be identified based at least in part on their appearances within the visual image frames, as well as their shapes or dimensions as determined from the depth image frames. Attributes of the body parts represented within both the visual image frames and the depth image frames may be correlated with one another in order to determine positions of the body parts in three-dimensional space.

Any other systems or methods for recognizing the presence and locations of one or more body parts (e.g., joints) represented within imaging data may be utilized in accordance with the present disclosure.

Additionally, once a plurality of body parts has been identified within the respective images, the body parts may be assigned to a common actor and a virtual skeleton (or other articulated model) may be generated by establishing nodes corresponding to each of the detected body parts, and by extending edges between pairs of the nodes. The virtual skeleton may be a record or vector representative of positions of the nodes corresponding to one or more of the detected body parts over time, e.g., a complete set of body parts, or as few as one body part, as well as edges extending between such nodes, such that the virtual skeleton may model motion of the body parts of the actor (e.g., trajectories of such body parts) prior to, during and after a time of an event. For example, edges between pairs of body part detections may be assigned a probability that two body part detections of a pair each correspond to the same actor. In some implementations, nodes corresponding to body parts of an actor may be represented in space by a set of Cartesian coordinates, or coordinates according to any other system, and a virtual skeleton in the form of a record or vector may include one or more of such sets of coordinates. Meanwhile, edges extending between a pair of nodes may be established by reference to each of the nodes of the pair, as well as a linear formula, a linear equation or other representation of points extending between the respective nodes of the pair, and a virtual skeleton in the form of a record or a vector may identify edges by reference to their respective nodes, or include one or more of such formulas, equations or other representations for such edges.

The edges between such nodes may be contracted probabilistically based on pairwise information regarding each of the nodes in a pair. In some implementations, a server may form two-dimensional skeletons from body part detections and edges identified within images captured by an imaging device, and determine which of the two-dimensional skeletons appearing in two or more fields of view of imaging devices corresponds to a common actor, before correlating such models or body parts thereof to generate a three-dimensional skeleton (or articulated model) accordingly, in real time or near-real time. The server may also determine positions of body parts that are not visible within two or more synchronized frames by generating and extending a field of vectors from a detection of a specific body part to points where other body parts would likely be located based on the detection. The vectors for one body part may be represented with bearings and ranges to another body part, and may, alternatively or additionally, include tolerances for each of the bearings and ranges. The reliability and accuracy of the vectors may vary based on the degrees of separation between the body parts.

Skeletons may be tracked between consecutive frames captured by an imaging device, or between synchronized frames captured by two or more imaging devices, on any basis including but not limited to the positions of the respective body parts (e.g., by triangulation), the appearances of the respective body parts (e.g., by matching colors and/or textures), or on any other basis. Additionally, the skeletons may be full or partial in nature. For example, a skeleton may be generated based on detections of a complete set of body parts of an actor or, alternatively, detections of less than a complete set of body parts of the actor, e.g., as few as one body part. In some implementations, a skeleton may be generated where positions of accessory body parts (e.g., a hand and a head) by which the skeleton may be identified as associated with a given actor are determined, along with any number of optional body parts (e.g., body parts such as necks, shoulders, elbows, wrists, hips, knees or ankles).

In accordance with some implementations of the present disclosure, where a plurality of actors are detected based on imaging data captured from a scene, e.g., a materials handling facility, and skeletons representative of the actors are generated based the imaging data, the skeletons may be ranked based on a likelihood that a given one of the actors is associated with an event. For example, the skeletons may be ranked based on a distance between their respective hands and a location of the event, or on any other features regarding the respective skeletons with respect to the event, and according to any technique.

As is shown in FIG. 1G, a plurality of three-dimensional skeletons 165-1, 165-2, 165-3, 165-4 are shown with respect to the location $(x, y, z)_{EVENT}$ of at which the event was detected. The skeletons 165-1, 165-2, 165-3, 165-4 shown in FIG. 1G may be formed by tracking the positions of one or more body parts depicted within consecutive images captured by the respective imaging devices 125-1, 125-2, or depicted within synchronized images captured by each of the imaging devices 125-1, 125-2, during the predetermined periods of time $\Delta t$ preceding and following the time $t_0$ at which the event was detected. For example, body parts may be tracked by matching their respective appearances or positions in consecutive images, or in synchronized images.

The skeletons 165-1, 165-2, 165-3, 165-4 may be ranked in an absolute fashion, e.g., based on distances between aspects of the respective actors 180-1, 180-2, 180-3, 180-4 and the location $(x, y, z)_{EVENT}$ of the event, e.g., distances $r_1$, $r_2$, $r_3$, $r_4$ between a nearest hand or other prominent body parts of each of the respective skeletons 165-1, 165-2, 165-3, 165-4 and the location $(x, y, z)_{EVENT}$ at the time $t_0$ of the event, may be determined. One or more of the actors 180-1, 180-2, 180-3, 180-4 may be identified as candidates for having been associated with the event based on a ranking of the distances $r_1$, $r_2$, $r_3$, $r_4$ of the respective hands from the location $(x, y, z)_{EVENT}$ of the event.

For example, referring again to FIG. 1G, the actor 180-3 may be ranked as most likely to have been associated with the event, because the distance $r_3$ is the shortest of the distances $r_1$, $r_2$, $r_3$, $r_4$ between the location $(x, y, z)_{EVENT}$ and the respective skeletons 165-1, 165-2, 165-3, 165-4. Likewise, the actors 180-4, 180-2, 180-1, respectively, may be ranked as the second-most, third-most and least likely, respectively, to have been associated with the event based on the distances $r_4$, $r_2$, $r_1$. Alternatively, in some implementations, the skeletons 165-1, 165-2, 165-3, 165-4 may be compared to an objective standard, e.g., a predetermined range or distance from the location $(x, y, z)_{EVENT}$ beyond which the actors 180-1, 180-2, 180-3, 180-4 associated with such skeletons 165-1, 165-2, 165-3, 165-4 were not likely associated with the event, and any of the actors 180-1, 180-2, 180-3, 180-4 that were not within the predetermined range or distance may be excluded from consideration. For example, in such implementations, if only a single one of the actors 180-1, 180-2, 180-3, 180-4 is determined to have been located on the scene 120, or within the predetermined range or distance of the location $(x, y, z)_{EVENT}$ at the time $t_0$ of the event, the event may be associated with that specific actor without further consideration.

In some implementations, information or data regarding the skeletons and features of their motion, their locations and/or their orientations (or "actor features") may be provided to a classifier that is trained to recognize whether one of the actors is associated with the event based on such skeletons and actor features, and to generate a score indicative of a probability that a given actor was associated with the event. In some implementations, the actor features may relate to any aspect of the motion, the location and/or the orientation of the respective skeletons prior to, during or after the time $t_0$ of the event. For example, one or more of the actor features may include a measure of an extension of an arm during the event, as well as a level of confidence in a detection of a position of a hand. Because actors use their hands, predominantly, to interact with items/and or to cause events, a virtual measure of uncertainty, e.g., an uncertainty surface (or an uncertainty shape or an uncertainty volume) of any form or size, may be constructed or generated to include a set of points provided about a determined position of a hand in three dimensions, such that the hand may be presumed to be located somewhere within a volume encompassed by the uncertainty surface, with a sufficiently high degree of confidence. In addition to hands, uncertainty surfaces may be virtually constructed or generated about any number of other body parts, such as heads or feet.

One or more of the actor features may further include a score associated with connectivity between a given hand and another given body part of an actor, such as a head, i.e., a measure of reliability that the given hand is associated with the given head. One or more of the actor features may also include a measure of a distance between a hand and an event location, a measure of a velocity of a hand, a position of a hand with respect to components of the environment in which the event was observed, a measure of a direction in which a forearm is oriented during the event, or a measure of an orientation of a neck with respect to a location of an event, e.g., whether an actor was looking in a direction of the event. The types of actor features that may be determined regarding the motion, the location and/or the orientation of an actor on a scene, or used to determine which, if any, of the actors is to be associated with an event are not limited.

As is shown in FIG. 1H, once the skeletons 165-1, 165-2, 165-3, 165-4 are generated based on the images captured by the respective imaging devices 125-1, 125-2, or within synchronized images captured by each of the imaging devices 125-1, 125-2, during the predetermined periods of time Δt preceding and following the time $t_0$, and the actor features regarding their respective positions, orientations, velocities or the like are calculated, the skeletons 165-1, 165-2, 165-3, 165-4 and such features may be provided to a ranking classifier as inputs. The skeletons 165-1, 165-2, 165-3, 165-4 may be ranked based on outputs from the classifier, e.g., scores representative of probabilities or likelihoods that each of the skeletons 165-1, 165-2, 165-3, 165-4 was involved in the event, as determined on any basis. In some implementations, the classifier may be a support vector machine (or SVM). In some implementations, the classifier may be a linear classifier, e.g., a linear support vector machine.

As is shown in FIG. 1I, after the skeletons 165-1, 165-2, 165-3, 165-4 are ranked, e.g., based either on distances between a nearest hand and a location of an event, such as is shown in FIG. 1G, on outputs from a ranking classifier that considered actor features as inputs, such as is shown in FIG. 1H, or on any other basis, a set of two or more of the highest-ranking skeletons (e.g., the skeletons 165-3, 165-4) may be identified. In some implementations, actor features for each of the highest-ranking skeletons (e.g., the two highest-ranking skeletons 165-3, 165-4) and global features regarding a status of the scene 120 at the time of the event may be provided as inputs to another classifier (e.g., another support vector machine). A confidence score indicative of a measure of confidence that the highest-ranking skeleton 165-3 was, or was not, associated with the event may be determined based on an output from the classifier. For example, in addition to the actor features for each of the skeletons 165-3, 165-4, inputs to the classifier may include, but are not limited to, global features such as measures of a level of confidence in a determination of the location $(x, y, z)_{EVENT}$, which may be calculated based on levels of accuracy or precision of the components (e.g., load sensors, imaging devices, RFID sensors, LIDAR sensors) or methods by which the location $(x, y, z)_{EVENT}$ was determined. One or more of the global features may also include measures of a density of tracklets or trajectories of one or more of the skeletons on the scene 120, or confidence or accuracy in a match between a skeleton and a given tracklet. The types of actor features, or global features, that may be calculated and used to determine which, if any, of the actors is to be associated with an event are not limited.

In some implementations, an actor may be associated with an event that occurs on a scene and involves an item by identifying hands of each of the actors within images captured prior to, during and after the event, processing (e.g., cropping) the images to isolate or exclude all but portions of the actors' hands and the contents thereof, and determining based on the processed images which of the hands includes the item. For example, each of the images captured by one or more imaging devices preceding or following an event may be provided to a classifier (e.g., a support vector machine) that is trained or otherwise configured to recognize hands, and the portions of such images that include one or more hands may be identified accordingly. In some implementations, the portions of the images that include one or more hands may be identified based at least in part on position data determined from three-dimensional skeletons on the scene. In some implementations, an analysis may consider contents of each of the hands detected within an image captured from a scene. In other implementations, an analysis may consider contents of a subset of the hands, e.g., hands of one or more actors identified based on a ranking, such as is shown in FIG. 1I.

As is shown in FIG. 1J, the image 130-2 that was captured at time $t_0$ using the imaging device 125-2 has been processed to identify the locations of hands of the actors 180-3, 180-4. For example, as is shown in FIG. 1J, based on the image 130-2, a right hand 160-8 of the actor 180-3 and a left hand 160-7 of the actor 180-4 have been identified. The image 130-2 may be cropped (or cut, trimmed or otherwise partitioned) into two portions, viz., a portion 132-1 depicting the right hand 160-8 of the actor 180-3 and a portion 132-2 depicting the left hand 160-7 of the actor 180-4. In some implementations, hands of actors who have been ruled out as candidates for having been associated with the event, or have not been identified as candidates for having been associated with the event, e.g., the actors 180-1, 180-2, may but need not be considered.

Additionally, in some implementations, the processing of images captured by the imaging devices prior to, during or after an event to determine which of such hands is carrying one or more items associated with the event may occur independent of the generation of skeletons for such purposes. In some implementations, however, the processing of such images may occur simultaneously with the generation of the skeletons, or after one of a plurality of actors is not conclusively identified based on such skeletons. For example, skeletons may be generated based on images captured prior to, during or after an event, and features of the motion, the location and/or the orientation of such models may be provided to a classifier to determine which, if any, of such models is associated with the event in series or in parallel with the processing of such images to determine the contents of hands prior to, during or after the event.

As is shown in FIGS. 1K and 1L, the portions 132-1, 132-2 of the image 130-2 may be further processed (e.g., cropped, cut, trimmed or otherwise partitioned) into portions 134-1, 134-2 (e.g., portions of the portions 132-1, 132-2, or sub-portions of the image 130-2) that depict the respective hands 160-8, 160-7 of the respective actors 180-3, 180-4 and the contents thereof. In some implementations, the portions 134-1, 134-2 may be provided to a server 112 as inputs to a classifier operating thereon, such as an artificial neural network, e.g., a convolutional neural network. The classifier may be configured to process the portions 134-1, 134-2 to determine which of the hands 160-8, 160-7 represented therein does not likely contain or is not likely holding any items, and which of the hands 160-8, 160-7 possibly contains or is possibly holding one or more items, i.e., which of the hands 160-8, 160-7 is or was holding an item at or around the time $t_0$, and which of the hands 160-8, 160-7 is not holding any items at or around the time $t_0$. As is shown in FIG. 1K, based on an output from the classifier operating on the server 112, the hand 160-8 is identified as likely having an item therein. As is shown in FIG. 1L, based on an output from the classifier operating on the server 112, the hand 160-7 is identified as not likely having any items therein.

In some implementations, where a single actor is identified as having a hand that did not likely contain any items prior to a time of an event but likely contained one or more items immediately following the time of the event, or where other actors are identified as having hands that do not likely contain any items immediately following the time of the event, images captured from a scene at which the event occurred need not be further analyzed in order to identify the contents of the hands. Instead, the actor having the hand that likely contained one or more items immediately following the event may be determined to have been associated with the event. In other implementations, however, images depicting portions of hands that are identified as holding one or more items therein may be processed to determine whether such items include an item of a type that is associated with the event, e.g., one of a type of the item 185-3 that was removed from the storage unit 170 at time $t_0$, as is shown in FIG. 1C. For example, where an identity of the item 185-3 or a type of the item 185-3 is known, e.g., based on information or data captured by one or more of the sensors that detected the event as shown in FIG. 1C, the portion 134-1 may be processed to determine whether the portion 134-1 depicts the item 185-3 within the hand 160-8 of the actor 180-3.

In some implementations, images of each of a plurality of items that might be associated with an event at a scene (e.g., each of the items available at a materials handling facility) may be captured from various perspectives and subject to a variety of lighting or other environmental conditions. Such images may be used, along with any other information or data, to train a classifier (e.g., a recognition model) to recognize items depicted within images. For example, as is shown in FIG. 1M, a plurality of images of the item 185-3 or items of a type of the item 185-3 (e.g., a positive set of images), as well as a negative set of images that do not correspond to the item 185-3 may be provided to a classifier operating on the server 112, along with an identifier of the item 185-3 or a type of the item 185-3. In some implementations, the images of the item may have been captured by a variety of imaging devices from different perspectives and in different lighting conditions, and subsequently processed with random croppings or image adjustments, as well as variations in brightness or scale, in order to mimic as many conditions in which the item may be present at the scene, e.g., obscured in whole or in part by one or more hands, structural features, other actors, or the like. For example, where a scene such as a materials handling facility is known to operate under certain lighting conditions (e.g., natural light via one or more windows or ceilings, or artificial light by way of fluorescent bulbs, incandescent bulbs, light emitting diode bulbs, or the like), images of items may be captured in the same or similar lighting conditions, or, alternatively, processed to simulate their respective appearances in such lighting conditions. Furthermore, where an item is expected to be stored at expected ranges from one or more imaging devices, the images may be processed to mimic the anticipated appearance of such items (e.g., their sizes) within the fields of view of one or more of the imaging devices.

In some implementations, the images of the negative set may include images of items that cannot be associated with any event at the scene (e.g., items that are not available at the materials handling facility), or images of background features or any other elements that are to be differentiated from items that might be associated with events at the scene. Training a classifier to recognize an item in this regard, e.g., using images of the item in various conditions and also images of things that are not the item, may enable the classifier to remain robust against textures and patterns of clothing of actors, as well as body parts of the actors (e.g., arms and/or hands), structural or background features at the scene, as well as other items. The trained classifier may also be resistant against exposure variations and/or color variations in the images captured from the scene, or any other factors.

As is shown in FIG. 1N, when the event is detected at time $t_0$, the item associated with the event may be identified by any technique, e.g., based on a location $(x, y, z)_{EVENT}$ at which the event was detected, or any other information or data. The portion 134-1 may be further cropped (or cut, trimmed or otherwise partitioned) into a portion 136-1 of the image 130-1, and provided as an input to a trained classifier operating on the server 112. The portion 136-1 of the image 130-1 may include a minimum number or set of pixels of the image 130-1 corresponding to contents of the hand 160-8. The trained classifier may determine whether the portion 136-1 of the image 130-1 depicts the item 185-3 or a type of the item 185-3. If the portion 136-1 of the image 130-1 is determined to depict the item 185-3 or a type of the item 185-3 at or after the time $t_0$, then the right hand 160-8 of the actor 180-3 may be deemed to include the item 185-3, and the actor 180-3 may be associated with the event, e.g., the removal of the item 185-3 from the storage unit 170 shown in FIG. 1C.

Alternatively, if none of the hands of the actors 180-3, 180-4 is determined to have one or more items contained therein in FIG. 1K or 1L, or if one of a type of the item 185-3 is determined to be within two or more hands, then the images captured prior to, during or after the time $t_0$ at which the event was detected may be subject to further processing and analysis, e.g., by one or more other computer devices or machines, or by human operators. For example, if both of the right hand 160-8 of the actor 180-3 and the left hand 160-7 of the actor 180-4 are determined to be either likely not holding any items, or likely holding an item of the type of the item 185-3, based on the contents of such images, the specific event by which the one of the type of the item 185-3 was removed from the storage unit 170 as shown in FIG. 1C may not, in some instances, be conclusively associated with the actor 180-3 or the actor 180-4 based on such images.

Accordingly, implementations of the systems and methods of the present disclosure may determine that an event has occurred at a scene, e.g., within a material handling facility, with a plurality of imaging devices aligned with overlapping fields of view, on any basis. Upon detecting the event, the systems and methods of the present disclosure may select one or more of the imaging devices, and identify images captured by such imaging devices for periods of time prior to and after a time of the event, e.g., two-dimensional images captured by two or more calibrated imaging devices that include all or portions of a scene within a common field of view. The images may be processed to recognize and track one or more actors within a scene using one or more trained classifiers, e.g., deep neural networks, convolutional neural networks, support vector machines, or the like, to recognize body part candidates within the images.

The compatibility of body part candidates that are detected within image frames, e.g., whether such body part candidates may possibly correspond to body parts of a common actor (e.g., a person), may be determined according to at least three content-based relationships between and among the respective image frames. First, for a selected image frame and a selected imaging device, whether two detections of body part candidates identified in the selected image frame may possibly correspond to two different body parts of a single actor may be determined. Second, for a selected body part type and a selected imaging device, whether two detections of body part candidates of a selected body part type that are identified in a pair of successive image frames may possibly correspond to a single body part in motion over a period of time between the capture of each of the successive image frames by the imaging device may be determined. Third, for a selected pair of synchronized image frames captured by different imaging devices and a selected body part type, whether two detections of body part candidates may possibly correspond to a single body part of the given body part type located in a common position in three-dimensional space may be determined. This tripartite analysis of body part candidates that are detected in two-dimensional imaging data, i.e., based on image frames captured by different imaging devices, simplifies processes for recognizing body parts or poses or gestures thereof by logically determining which of a plurality of body parts belongs to the same person, or to different people.

Likewise, a number of content-based relationships may determine whether body part candidates do not correspond to the same person, e.g., whether such body part candidates are incompatible with one another. For example, it is axiomatic that each person has only one head, only one neck, only one left shoulder, and so on and so forth. Therefore, where it is determined that an image frame is determined to likely depict two or more heads, necks or left shoulders, such body parts must necessarily belong to different people, and are incompatible with one another, or, alternatively, one or more of the detections may be false. Next, where one image frame is determined to likely depict a type of body part in a specific location in space, and a synchronized image frame depicts the same type of body part in a different, non-corresponding location in space, the two body parts cannot be the same body part, and are incompatible with one another.

Body parts that are identified as likely depicted within one or more image frames must also be subjected to a number of immutable, physiological parameters or constraints. Where two distinct body parts are likely depicted in an image frame, the two body parts must be within a typical physiological range of one another, e.g., a distance ordinarily observed in humans, if the two body parts may be determined to belong to the same person. For example, in nearly every adult human, shoulders are typically located no closer than ten centimeters from a head, and no farther than fifty centimeters from the head. Therefore, where a shoulder and a head are likely depicted in an image frame at a range of less than ten centimeters or greater than fifty centimeters from one another, the two body parts cannot likely belong to the same person, and are incompatible with one another. Similarly, separations between a hip and a knee, a knee and an ankle, must remain consistent with traditional lengths of a femur and a tibia or fibula, respectively, if such body parts are to be determined to belong to the same person. Furthermore, humans are typically ground-based animals that move at predictable speeds and in predictable directions or angular extents.

Each detection of a body part may include not only a position of the body part within an image frame but also a set of vectors extending from the position of the body part to possible positions of other body parts within the image frame, subject to known physiological parameters or constraints for a human body, including but not limited to lengths or configurations of such body parts with respect to one another. For example, a femur extends between a hip and a knee has a length of approximately 50.5 centimeters in an average adult male. Similarly, a tibia and a fibula extend between a knee and an ankle, and have lengths of approximately 43.0 centimeters and 40.5 centimeters, respectively, in an average adult male. A humerus, which extends between a shoulder and an elbow, has a length of approximately 36.5 centimeters in an average adult male, while ulna and radii, which extend between elbows and hands, have lengths of approximately 28.2 centimeters and 26.4 centimeters, respectively, in average adult males. Likewise, it is axiomatic that knees are connected to hips and ankles, but not to shoulders, and that heads are connected to necks, but not to wrists. Such parameters or constraints, which may include not only bone lengths or configurations but also distance constraints, articulation constraints or deformation constraints, should be both feasible and proportional for humans, and must remain constant over time, given that actors may not typically change the lengths of their limbs or their respective configurations or orientations over time. In some implementations, standard body proportions such as those defined by the Vitruvian Man of Leonardo da Vinci, or similar ratios or proportions, may be used to determine relations of dimensions of two or more body parts to one another.

After a plurality of body part candidates have been identified, compatible body part candidates may be associated with one or more other body part candidates, e.g., within common image frames, or with each other, e.g., across multiple image frames, or incompatible body part candidates may be removed from consideration. Compatible body party candidates may be grouped together subject to a number of logical operations. First, edges between detections of a body part may be tracked over time, e.g., within image frames captured from a single imaging device, and temporally merged. A trajectory, or "tracklet," representative of motion of a body part within image frames may be generated based on the presence of the body part within image frames captured by a single imaging device, e.g., from a common field of view. The trajectories may be generated over a predetermined number or series of frames (e.g., tens of frames or more), subject to any compatibility or incompatibility parameters or constraints.

Finally, detected body parts may be merged together into an articulated model of a common actor, e.g., a virtual skeleton. To merge detected body parts, strong reciprocal affinities between body parts may be identified, such as by evaluating imaging data captured by a calibrated imaging device for consecutive frames and identifying pairs of body parts that are observed to consistently move with respect to one another, or to regress to one another, without any other options for compatible body parts. For example, for each detected body part, and for each of the other body parts, a nearest detection of another body part is identified and a level of affinity between the body parts is determined. In some implementations, edges between pairs of nodes corresponding to detections of body parts may be assigned probabilities that the detections each correspond to body parts of the same actor, or weights that favor a given pair of nodes over a different pair of nodes. A pair of body parts are deemed to have strong reciprocal affinity if each of the body parts has mutual one-directional affinity with one another, i.e., if a head is determined to have sufficiently strong affinity with only one neck, and if the neck is determined to have sufficiently strong affinity with only the head. Each of the affinities between pairs of body parts may be weighted and sorted in decreasing weight order, and such affinities must satisfy any known incompatibility constraints. A skeleton having nodes corresponding to each of the detections, and edges extending between such nodes, may be generated by an imaging device for each of the image frames captured thereby. Next, body parts identified in skeletons may be matched across multiple views and converted to three-dimensional rays that begin at optical elements of the respective imaging devices and terminate at surfaces of objects at a given pixel, based on the intrinsic properties of the calibrated imaging devices and extrinsic properties of a scene, and merged into one, e.g., by triangulating the rays corresponding such detections, thereby enabling a body part to be detected and re-detected in the multiple views even if the body part is temporarily occluded in one of the views.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which the recognition and tracking of actors is desired, including but not limited to the motion of one or more human operators within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between actors (e.g., customers) and recognize their respective interactions within a materials handling facility, including but not limited to interactions with one or more items (e.g., consumer goods) within the materials handling facility. Such systems and methods may also be utilized to identify and track actors and their interactions within transportation centers, financial institutions or like structures in which diverse collections of people, objects or machines enter and exit from such environments at regular or irregular times or on predictable or unpredictable schedules.

Figure 2A:
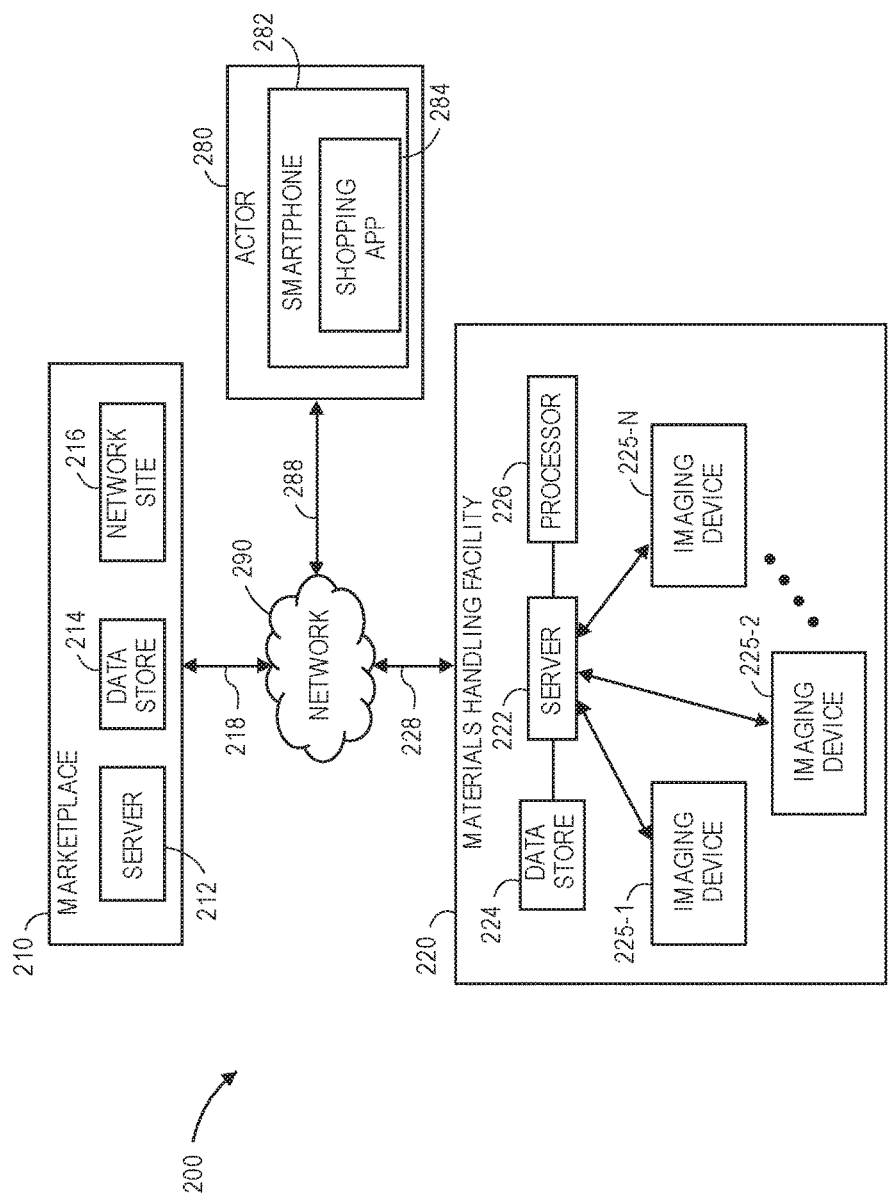
FIGS. 2A and 2B are block diagrams of components of one system for associating events with actors based on digital imagery in accordance with implementations of the present disclosure.
Figure 2B:
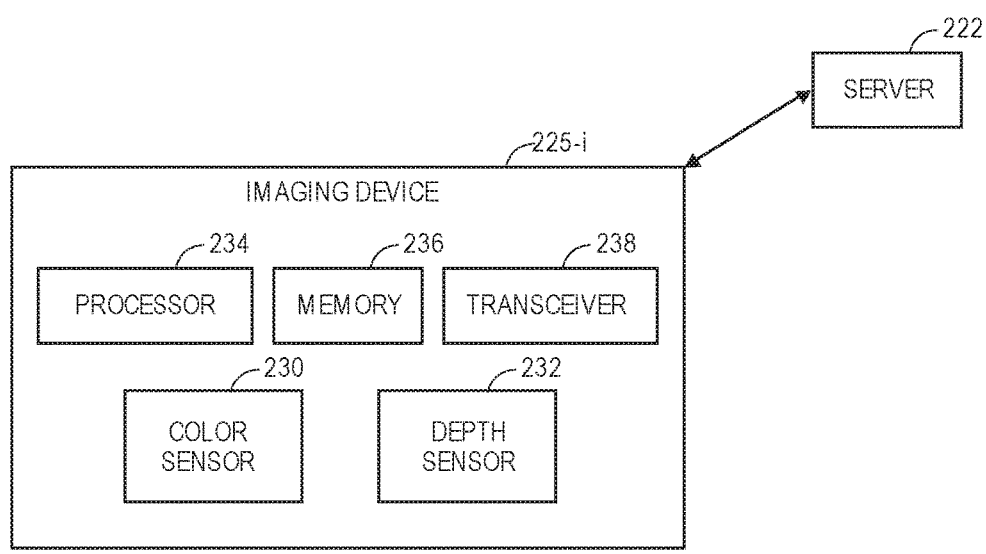

Referring to FIGS. 2A and 2B, a block diagram of components of one system 200 for associating events with actors based on digital imagery in accordance with implementations of the present disclosure is shown. The system 200 includes a marketplace 210, a materials handling facility 220 and an actor (or customer, or worker, or user, or another human operator) 280 that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1N.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more materials handling facilities, including but not limited to the materials handling facility 220, as well as any number of other materials handling facilities (not shown). The network site 216 may be implemented using the one or more servers 212, which connect or otherwise communicate with the one or more data stores 214 as well as the network 290, as indicated by line 218, through the sending and receiving of digital data. The servers 212 may cause the display of information associated with the network site 216 in any manner, e.g., by transmitting code such as Hypertext Markup Language (HTML), over the network 290 to another computing device or resource that may be configured to generate and render the information into one or more pages or to cause a display of such pages on a computer display of any kind. Moreover, the data stores 214 may include any type of information regarding items that have been made available for sale through the marketplace 210, or ordered by customers (e.g., the actor 280) from the marketplace 210. The servers 212 may further execute any type of computer-based function or compute any type or form of calculation, including but not limited to any formulas, equations, algorithms or techniques for determining one or more probabilities or performing any number of statistical tests.

The materials handling facility 220 may be any facility that is adapted to receive, store, process and/or distribute items on behalf of the marketplace 210. The materials handling facility 220 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 220. Upon their arrival at the materials handling facility 220, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 220, inventory items that are listed in the request or order, or are desired by the user, may be selected or "picked" from an inventory area at the materials handling facility 220. For example, in one implementation, a customer or other user may travel through the materials handling facility 220 with a list (e.g., a paper list, or a handheld mobile device displaying or including such a list) and may pick one or more of the inventory items from an inventory area at the materials handling facility 220. In other implementations, an employee of the materials handling facility 220 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 220 includes a networked computer infrastructure for performing various computer-related functions associated with the receipt, storage, processing and distribution of such items, including one or more physical computer servers 222, data stores (e.g., databases) 224 and processors 226, that may be provided in the same physical location as the materials handling facility 220, or in one or more alternate or virtual locations, e.g., in a "cloud"-based environment. In some implementations, the servers 222, the data stores 224 and/or the processors 226 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 220 may include one or more inventories having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 220 may further include one or more receiving stations featuring any apparatuses that may be required in order to receive shipments of items at the materials handling facility 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 220 may further include one or more distribution stations where items that have been retrieved from a designated inventory area may be evaluated, prepared and packed for delivery from the materials handling facility 220 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 220 may be transferred directly to a distribution station for further processing, or "cross-docked," without first being placed into storage in an intermediate inventory area. The materials handling facility 220 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 220 may operate one or more order processing and/or communication systems using computer devices or resources in communication with one or more of the servers 222, the data stores 224 and/or the processors 226, or through one or more other computing devices or resources that may be connected to the network 290, as is indicated by line 228, in order to transmit or receive information in the form of digital or analog data, or for any other purpose.

The materials handling facility 220 further includes a plurality of imaging devices 225-1, 225-2 . . . 225-n (or other sensors), which may be any form of optical recording device that may be used to photograph or otherwise record imaging data of structures, facilities or any other elements within the materials handling facility 220, as well as any items within the materials handling facility 220, or for any other purpose. The imaging devices 225-1, 225-2 . . . 225-n may be mounted in any specific location or orientation within the materials handling facility 220, e.g., above, below or alongside one or more inventory areas or stations for receiving or distributing items.

Each of the imaging devices 225-1, 225-2 . . . 225-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 225-i includes one or more color sensors (or grayscale sensors or black-and-white sensors) 230 and one or more depth sensors 232 configured to capture visual imaging data (e.g., textures) or depth imaging data (e.g., ranges) to objects within one or more fields of view of the imaging device 225-i. The imaging device 225-i further includes one or more processors 234, one or more memory components 236 and one or more transceivers 238, and any other components (not shown) that may be required in order to capture, analyze and/or store imaging data from within the materials handling facility 220 environment in which the imaging device 225-i is provided. For example, the imaging device 225-i may capture one or more still or moving images (e.g., streams of visual and/or depth image frames), along with any relevant audio signals or other information (e.g., position data), and may also connect to or otherwise communicate with the server 222, or any other computer devices within the materials handling facility 220 (not shown), or with one or more external computer devices over the network 290, through the sending and receiving of digital data. In some implementations, the transceiver 238 may be configured to enable the imaging device 225-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the server 222 or over the network 290 directly.

The imaging devices 225-1, 225-2 . . . 225-n may be homogenous or heterogeneous in nature, in accordance with the present disclosure. For example, one or more of the imaging devices 225-1, 225-2 . . . 225-n may have both the color sensor 230 and the depth sensor 232. Alternatively, one or more of the imaging devices 225-1, 225-2 . . . 225-n may have just a color sensor 230 (or grayscale sensor or black-and-white sensor) or just a depth sensor 232. For example, in some implementations, one or more of the imaging devices 225-1, 225-2 . . . 225-n may be configured to capture depth imaging data, e.g., distances or ranges to objects within their respective fields of view. In some implementations, one or more of the imaging devices 225-1, 225-2 . . . 225-n may be configured to capture visual imaging data, e.g., visual images or image frames in color, grayscale or black-and-white.

For example, one or more of the imaging devices 225-1, 225-2 . . . 225-n may be an RGB color camera, a still camera, a motion capture/video camera or any other type or form of camera. In other implementations, one or more of the imaging devices 225-1, 225-2 . . . 225-n may be depth-sensing cameras, such as a RGBD (or RGBz) camera. In still other implementations, one or more of the imaging devices 225-1, 225-2 . . . 225-n may be a thermographic or infrared (IR) camera. Additionally, in some implementations, the imaging devices 225-1, 225-2 . . . 225-n may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 225-1, 225-2 . . . 225-n may be paired to provide stereo imagery and depth information, and may include a pair of camera modules. Additionally, imaging data may be stored in any variety of formats including, but not limited to, YUYV, RGB, RAW, .bmp, .jpeg, .gif, or the like.

The imaging devices 225-1, 225-2 . . . 225-n may also include manual or automatic features for modifying their respective fields of view or orientations. For example, one or more of the imaging devices 225-1, 225-2 . . . 225-n may be configured in a fixed position, or with a fixed focal length (e.g., fixed-focus lenses) or angular orientation. Alternatively, one or more of the imaging devices 225-1, 225-2 . . . 225-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 225-1, 225-2 ... 225-*n*, or changes in one or more of the angles defining the angular orientation.

For example, one or more of the imaging devices 225-1, 225-2 ... 225-*n* may be hard-mounted to a support or mounting that maintains the device in a fixed configuration or angle with respect to one, two or three axes. Alternatively, however, one or more of the imaging devices 225-1, 225-2 ... 225-*n* may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 225-1, 225-2 ... 225-*n* may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 225-1, 225-2 ... 225-*n*, e.g., digital cameras, may be affected based on the lighting conditions and characteristics of the scenes in which the imaging devices 225-1, 225-2 ... 225-*n* are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the materials handling facility 220 of FIG. 2A includes boxes corresponding to three imaging devices 225-1, 225-2 ... 225-*n*, those of ordinary skill in the pertinent arts will recognize that any number or type of imaging devices may be provided within the materials handling facility 220 in accordance with the present disclosure, including but not limited to digital cameras, depth sensors or range cameras, infrared cameras, radiographic cameras or other optical sensors. In some implementations, the system 200 may include dozens or even hundreds of imaging devices of any type or form.

The materials handling facility 220 may also include any number of other sensors, components or other features for controlling or aiding in the operation of the materials handling facility 220, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The actor 280 may be any entity or individual that wishes to manually or automatically retrieve, evaluate and/or purchase one or more items maintained in an inventory area of the materials handling facility 220, or to download, purchase, rent, lease, borrow or otherwise obtain items (e.g., goods, products, services or information of any type or form) from the marketplace 210. The actor 280 may utilize one or more computing devices, such as a smartphone 282 or any other like machine that may operate or access one or more software applications, such as a web browser (not shown) or a shopping application 284, and may be connected to or otherwise communicate with the marketplace 210, or the materials handling facility 220 through the network 290, as indicated by line 288, by the transmission and receipt of digital data. For example, the actor 280 may use the smartphone 282 or another like client device to interact with one or more computer devices and/or input/output devices within the materials handling facility 220, and for any purpose. Moreover, the actor 280 may retrieve items from the materials handling facility 220, and also receive deliveries or shipments of one or more items from facilities maintained by or on behalf of the marketplace 210, such as the materials handling facility 220.

Alternatively, or in addition to the actor 280, the materials handling facility 220 may also include one or more human operators (not shown), such as one or more workers, who may be any designated personnel tasked with performing one or more tasks within the materials handling facility 220 in general, or within one or more inventory areas, receiving stations, distribution stations or other locations of the materials handling facility 220 in particular. Such workers may handle or transport items (e.g., any type or form of good, product, media or other tangible consumer article) within the materials handling facility 220, or operate one or more pieces of equipment therein (not shown). The workers may also operate one or more specific computing devices or resources for registering the receipt, retrieval, transportation or storage of items within the materials handling facility 220, or a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the server 222, with one or more of the imaging devices 225-1, 225-2 ... 225-*n*, or with one or more computer devices or resources, such as the server 212 or the smartphone 282, over the network 290, as well as a display (e.g., a touchscreen display) to facilitate the visible presentation to and interaction with a human operator. Such devices may be configured to store a unique identifier associated with a given human operator, and provide the unique identifier to the server 222 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 220.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "marketplace," a "materials handling facility," or a "customer" (or "actor," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "customer" (or "actor," or "user," or "worker," or "human operator") may be typically performed by a human, but could, alternatively, be performed by an automated agent.

The marketplace 210, the materials handling facility 220 and/or the actor 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the server 222 may be adapted to transmit information or data in the form of synchronous or asynchronous messages from the materials handling facility 220 to the server 212, the smartphone 282 or any other computer device (e.g., any device having any number of other servers, data stores, processors or the like) in real time or in near-real time, or in one or more offline processes, via the network 290. Those of ordinary skill in the pertinent art would recognize that the marketplace 210, the materials handling facility 220 or the actor 280 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 212, the server 222, the imaging devices 225-1, 225-2 . . . 225-n or the smartphone 282, or any other computers or control systems utilized by the marketplace 210, the materials handling facility 220 or the actor 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3A:
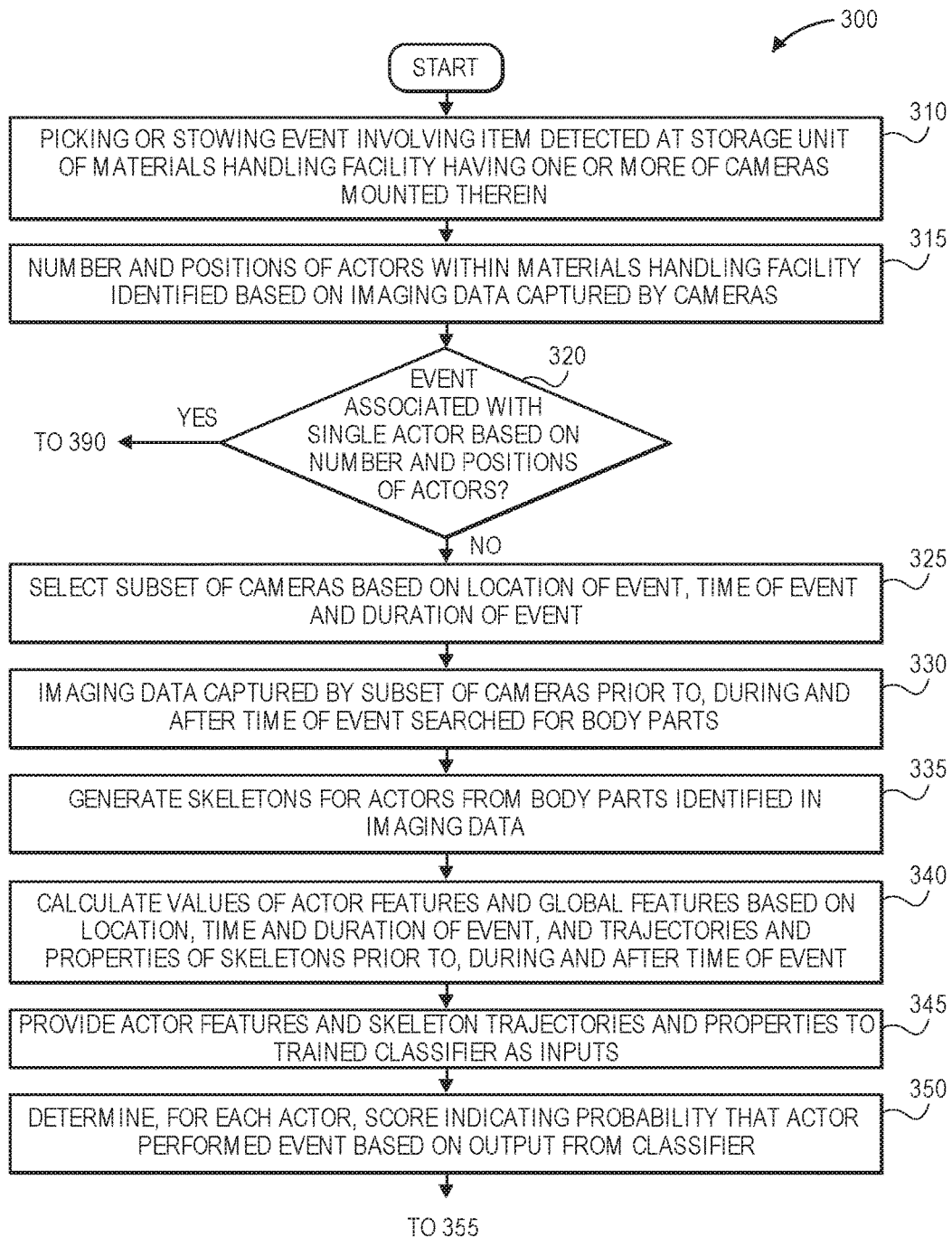
FIGS. 3A and 3B are a flow chart of one process for associating events with actors based on digital imagery in accordance with implementations of the present disclosure.
Figure 3B:
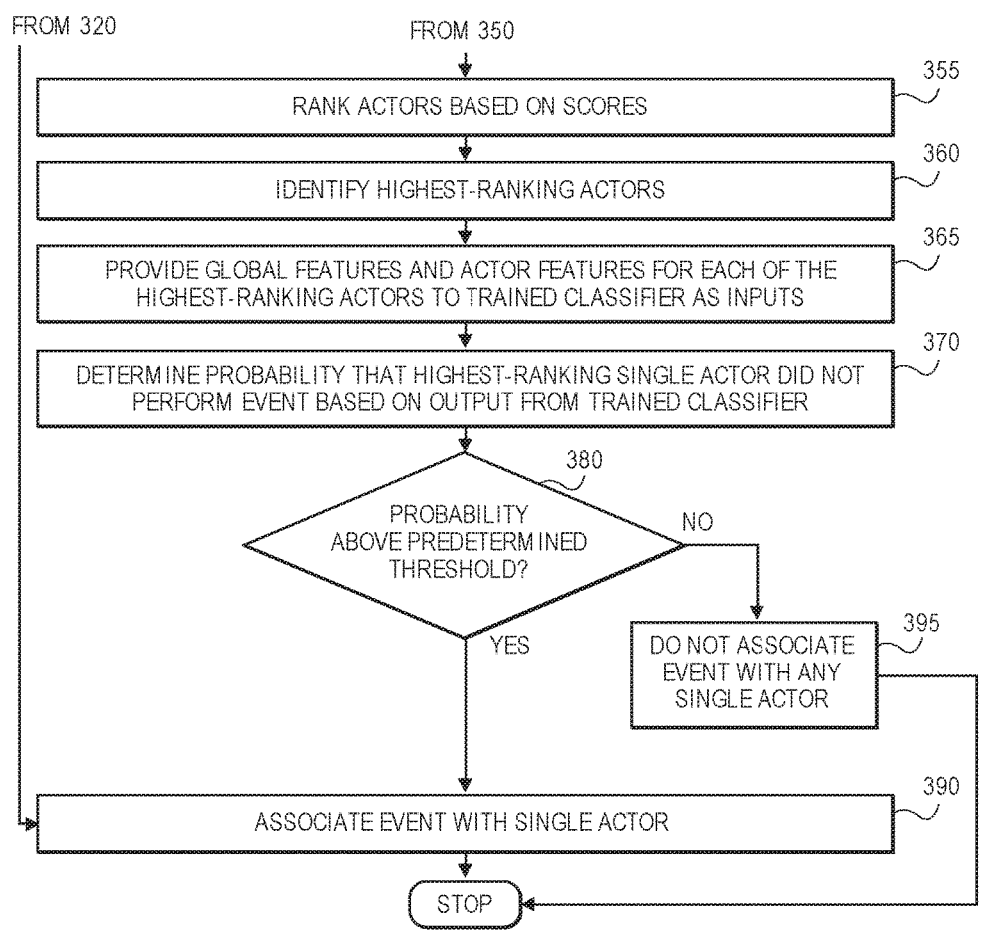

As is discussed above, some of the systems and methods disclosed herein may be used to detect that an event involving an item has occurred, to recognize the presence and locations of actors on the scene, to generate skeletons, articulated models or other virtual representations of such actors, and to determine which of the actors is associated with the event based on the motion, the locations and/or the orientations of each of the actors, as expressed by the respective skeletons. Referring to FIGS. 3A and 3B, a flow chart of one process for associating events with actors based on digital imagery in accordance with implementations of the present disclosure is shown. At box 310, a picking or stowing event involving an item is detected at a storage unit of a materials handling facility having one or more cameras mounted therein. For example, the event may involve a picking of an item, such the removal of the item 185-3 from the storage unit 170 as shown in FIG. 1C, or a stowing of an item, e.g., such as a placement of an item at the storage facility 170, or any other events associated with an item. Alternatively, an event may involve both a picking of an item and a stowing of an item, such as when an item is retrieved for an evaluation by a customer, and when the item is returned following the evaluation. The storage unit may be one of a plurality of shelves, or any other type or form of storage unit, e.g., one or more bins, racks, tiers, bars, hooks, cubbies or other like storage means. Additionally, the cameras may be mounted in any orientation or configuration with respect to the storage unit, such that fields of view of the cameras overlap at least in part.

The event may be detected at box 310 by any number of sensors, components or systems provided at the materials handling facility. For example, a shelf or other storage area may be equipped with a scale or other apparatus (e.g., one or more load sensors) for determining masses of one or more items, e.g., a mass of an individual item on the shelf, or a mass of all of the items present on the shelf. When an actor is determined to have accessed the shelf to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor. For example, when one or more load sensors detects a change in mass of approximately 3.08 pounds on one or more shelves or storage areas, an item having a mass of 3.08 pounds may be presumed to have been picked from or stowed on the one or more shelves or storage areas.

In some other implementations, an event may be detected (or a location of the event may be determined) based on imaging data captured by one or more imaging devices, which may depict aspects of any number of events therein, and the imaging data may be continuously or regularly monitored in order to determine whether an event has occurred. For example, an event may be determined to have occurred where contents of the materials handling facility are determined to have changed in any pair of images (e.g., a before-and-after comparison of images depicting aspects of the materials handling facility, at different times). In some other implementations, an event may be determined to have occurred where one or more body parts (e.g., a hand of an actor) are detected within a predetermined range or distance of one or more storage units and/or items in one or more images. In some implementations, imaging data may be continuously or regularly evaluated to determine whether an event has occurred. In such implementations, imaging data may be processed according to one or more of the systems or methods disclosed herein if an event is determined to have occurred, to a predetermined level of confidence or accuracy, or discarded when it is determined that no event has occurred.

Similarly, imaging data may be captured in a vicinity of a specific location at a time when an actor is determined to have retrieved an item from a rack or other storage area, and a color, a shape or other attribute of the item may be determined from the imaging data. The color, the shape or the other attribute may be correlated with one or more a plurality of items in the vicinity of the specific location at the time when the actor retrieved the item, and may be used to identify the item on that basis. A storage area may also include one or more scanners or readers for recognizing a bar code or other visible marking on an item, e.g., one or more bar codes or sets of alphanumeric characters provided thereon, as well as radio frequency identification ("RFID") transmitters or receivers for acknowledging the arrival, presence or departure of an item. Moreover, an event may be determined to have occurred based on information or data obtained by a combination of sensors, including load sensors, imaging devices, RFID sensors, LIDAR sensors, or any other type or form of sensors.

At box 315, a number and positions of actors within the material handling facility are identified based on imaging data captured by a plurality of cameras. For example, one or more outlines, faces or other attributes of actors (e.g., customers, workers or other humans) may be detected in images captured by any of the cameras within the materials handling facility and recognized as corresponding to one or more actors, or possibly corresponding to one or more actors. The cameras by which the number and/or positions of actors are determined need not be located in close proximity to the event, nor have captured images at or near a time of the event. For example, one or more cameras may be provided at or near an entrance and/or exit of a materials handling facility, and may capture images regarding actors who entered or exited the materials handling facility. A record of the number of actors within the materials handling facility, or the identities of the actors, may be determined based on images captured by such cameras (e.g., according to one or more other facial recognition and/or other object recognition techniques). Alternatively, a number and/or a position of one or more actors within the materials handling facility may be determined based on information or data gathered by one or more sensors other than a camera. For example, a materials handling facility may include a scanner, a reader or other device configured to identify actors who enter or exit the materials handling facility, e.g., based on information or data provided by an application operating on a mobile device carried by such actors, or in any other manner. In some implementations, the cameras that are used to determine the number and/or the position of the actors within the materials handling facility may be one or more of the same sensors that detected the event. In some implementations, the cameras need not be the same sensors that detected the event.

At box 320, whether the event may be associated with a single actor based on the number and positions of the actors is determined. For example, if the materials handling facility includes only one actor at a time of the event, or if only one actor is within a finite range of the event at the time of the event, then the event may be readily associated with that single actor. In some implementations, an initial (e.g., first-level) classification of actors within a materials handling facility may merely consider positions of the actors, or generic actor features calculated for such actors, and determine that one or more of the actors must have been, or could not have been, associated with the event based on such positions or actor features. If the event may be associated with the single actor, then the process advances to box 390, where the event is associated with the single actor, and the process ends.

If the event may not be associated with the single actor based on the number and/or positions of actors on the materials handling facility, then the process advances to box 325, where a subset of the cameras is selected based on a location of the event, a time of the event and/or a duration of the event. For example, upon detecting the event at box 310, a location of the event may be determined, and the location of the event may be compared to the orientations and fields of view of one or more cameras in order to identify a diverse and/or robust representative set of the cameras that may have captured images of the event from different perspectives, thereby increasing a likelihood that the event was recorded to a maximum extent, yet reducing a number of images and/or volume of data that must be considered or a number of processing operations that must be executed. In some implementations, the cameras may be selected such that axes of orientation of the cameras are most closely orthogonal (or perpendicular) to one another, and are least occluded by actors or other aspects (e.g., structural features such as columns, walls, countertops or other elements) of a materials handling facility. The cameras may also be selected to avoid duplicative or unnecessary evaluations of imaging data captured from various fields of view.

At box 330, imaging data captured by the cameras of the subset prior to, during and after the time of the event are identified and searched for body parts (e.g., joints) of actors. For example, in some implementations, portions of each image frame corresponding to each of a predetermined number of body parts may be identified, e.g., by providing each of the images captured by the cameras selected at box 330 to a classifier, an algorithm or another technique for detecting one or more body parts within image frames. The images may be processed by a deep neural network, a convolutional neural network, a support vector machine, or any other type or form of classifier that is trained to recognize any number of discrete body parts such as a head, a neck, a left shoulder, a right shoulder, a left elbow, a right elbow, a left wrist, a right wrist, a left hand, a right hand, a left hip, a right hip, a left knee, a right knee, a left ankle or a right ankle. Portions of such images that are determined to correspond to specific body parts may be identified as such. Alternatively, or additionally, the imaging data that is searched for body parts of actors may be simultaneously or separately evaluated to determine whether any events have also occurred, e.g., other than the event that was detected at box 310.

At box 335, skeletons are generated for a plurality of actors based at least in part on the body parts identified at box 330. The skeletons may be generated based on a complete set of body parts of an actor or, alternatively, a subset of the body parts of the actor. For example, once a plurality of body parts has been identified within the respective images, the body parts may be assigned to a common actor and a skeleton may be generated by establishing nodes corresponding to each of the detected body parts and generating edges between pairs of the nodes. In some implementations, the nodes may be represented in space by a set of Cartesian coordinates, or coordinates according to any other system, and edges extending between a pair of nodes may be established by reference to each of the nodes of a pair, as well as a linear formula, a linear equation or other representation of points extending between the respective nodes of the pair. Additionally, edges between pairs of body part detections may be assigned a probability that two body part detections of a pair each correspond to the same actor, and each of the edges between such nodes may be contracted probabilistically based on pairwise information regarding the nodes in a pair that are connected by an edge. Positions of body parts that are not visible within image frames may be predicted by generating and extending a field of vectors from a location of a specific body part to locations where other body parts would likely be located if the location of the peak values did, in fact, correspond to a location of the specific body part. The vectors for one body part may be represented with bearings and ranges to another body part, and may, alternatively or additionally, include tolerances for each of the bearings and ranges. The reliability and accuracy of the vectors will vary based on the degrees of separation between the body parts.

In some implementations, an uncertainty surface (or an uncertainty shape or uncertainty volume) may be generated around one or more of the body parts detected at box 330, e.g., hands of each of the actors for which a skeleton was generated at box 335. For example, because the vast majority of interactions with items involve at least one hand of an actor, determining positions of each of the hands of the skeletons generated at box 335 is of critical importance to associating a task with a given actor therein. Thus, a surface, a shape or a volume indicative of a level of uncertainty associated with a predicted or detected position of a hand or another body part may be generated based on any measures of confidence, tolerance and/or uncertainty regarding a predicted position. In some implementations, an uncertainty surface may be defined as a virtual ellipsoid having axes of symmetry that intersect at a center corresponding to a palm of an actor's hand. The lengths of the respective axes may be determined based on uncertainties associated with one or more sensors (e.g., imaging devices) that captured the information or data (e.g., imaging data) from which the positions were determined, an environment from which the information or data was captured (e.g., occlusions, lighting conditions, other actors or obstructions within a scene), as well as any other factors. In some other implementations, an uncertainty surface may be defined as a virtual sphere, a virtual cone, a virtual pyramid, a virtual rectangular hollow, or any other virtual three-dimensional shape.

A skeleton may be defined as a record and/or vector representative of a set of positions or trajectories of body parts as determined prior to, during and after a time of an event. A trajectory, or "tracklet," representative of motion of a body part within image frames may be defined based on the presence of the body part within image frames captured by a single imaging device, e.g., from a common field of view, or from multiple imaging devices having multiple fields of view. Such trajectories or "tracklets" may be defined as sets of positions of each of the body parts of the respective skeletons over extended series of frames (e.g., tens of frames or more), subject to any compatibility or incompatibility parameters or constraints. Detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple image frames. In some implementations, the trajectories may be defined by minimizing differences between ray projections extending from optical elements of imaging devices to pixels depicting specific body parts detected within image frames captured by such imaging devices and splines or other curves defined from such frames, e.g., according to a least squares problem. Any method or technique for defining a three-dimensional track or trajectory of a body part from two-dimensional observations of the body part in image frames may be utilized in accordance with the present disclosure.

At box 340, values of actor features and global features are calculated based on the location, time and duration of the event, as well as the trajectories of the skeletons prior to, during and after the time of the event. Global features may relate to a status of a location of an event, e.g., densities of tracklets or trajectories of skeletons at the materials handling facility, measures of a level of confidence in a determination of the location $(x, y, z)_{EVENT}$, measures of confidence or accuracy in a match between a skeleton and a given tracklet, or any other features affecting a likelihood that one of the skeletons may be identified as associated with the event based on imaging data. Actor features may relate to any aspect of the motion, the location and/or the orientation of the respective skeletons prior to, during or after the time $t_0$ of the event, e.g., measures of extensions of arms during the event, measures of confidence in a detection of a position of a hand, scores associated with connectivity between a given hand and a given head, i.e., a measure of reliability that the given hand is associated with the given head, measures of distances between hands and locations of events, measures of velocities of hands, positions of hands with respect to components of the materials handling facility, measures of directions in which forearms are oriented, measures of orientations of necks with respect to a location of an event, or any other features regarding the respective actors at the materials handling facility. The types of actor features that may be determined regarding the motion, the location and/or the orientation of an actor on a scene, or used to determine which, if any, of the actors is to be associated with an event are not limited. The types of actor features, or global features, that may be calculated are not limited.

At box 345, the actor features calculated at box 340 and trajectories and properties of the skeletons generated at box 335 are provided to a trained classifier as inputs. The classifier may be any type of algorithm or technique, e.g., a machine learning classifier such as a support vector machine, that is trained to determine whether one of the skeletons may be associated with the event to a sufficiently high level of confidence. In some implementations, each of the skeletons and their respective trajectories and actor features may be provided to the classifier as inputs. In some other implementations, the skeletons may be ranked based on their respective proximity to the location of the event, e.g., a distance between a location of a nearest hand and a location of an event, or other attributes relating to the event. In other implementations, skeletons that are within a predetermined range of the location of the event, such as one to one-and-one-quarter meters, may be provided to the trained classifier as inputs, and skeletons beyond this predetermined range may be disregarded as unlikely to be associated with the event.

At box 350, a score indicative of a probability that a given skeleton was associated with the event is determined for each of the actors based on outputs of the classifier. At box 355, the actors are ranked based on their respective scores. Alternatively, distances between locations of nearest hands of each of a plurality of actors and a location of an event may be determined, and the actors may be ranked based on such distances. At box 360, the two-highest ranking actors are identified based on the rankings.

At box 365, the global features calculated at box 340 and the actor features for each of the two highest-ranking skeletons identified at box 360 are provided to a trained classifier as inputs. At box 370, a probability that the highest-ranking actor did not perform the event is determined based on an output received from the trained classifier. For example, the classifier may be trained to determine a probability or other score indicative of confidence in the rankings of the actors, specifically, whether the highest-ranking actor is the actor who is associated with the event.

At box 380, whether the probability exceeds a predetermined threshold is determined. In some implementations, in order to ensure that an event is appropriately associated with a specific actor, the threshold may be particularly high, e.g., greater than ninety-eight or ninety-nine percent. A high threshold may ensure that the event is not associated with an incorrect actor. If the probability determined at box 370 exceeds the predetermined threshold, then the process advances to box 390, where the event is associated with the single actor associated with the skeleton for which the probability exceeds the predetermined threshold, and the process ends. If the probability determined at box 370 does not exceed the predetermined threshold, however, then the process advances to box 395, where the event is not associated with any single actor, and the process ends.

Figure 4A:
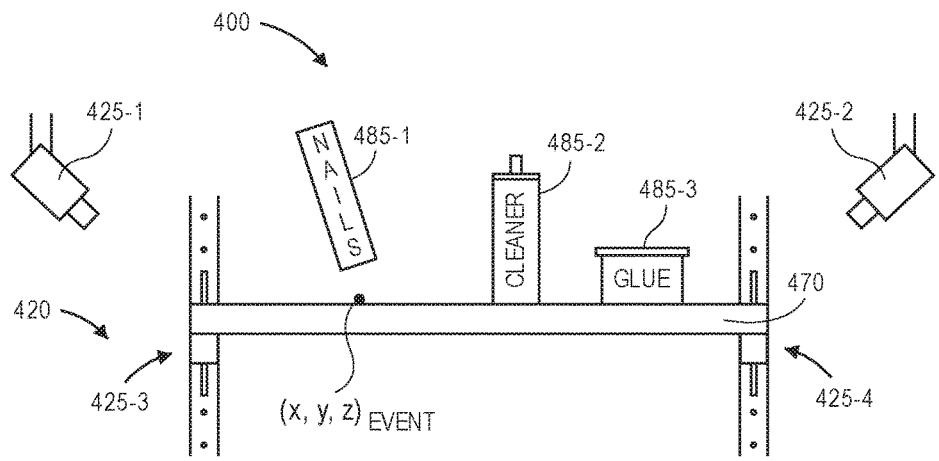
FIGS. 4A and 4B are views of aspects of one system for associating events with actors based on digital imagery in accordance with implementations of the present disclosure.
Figure 4B:
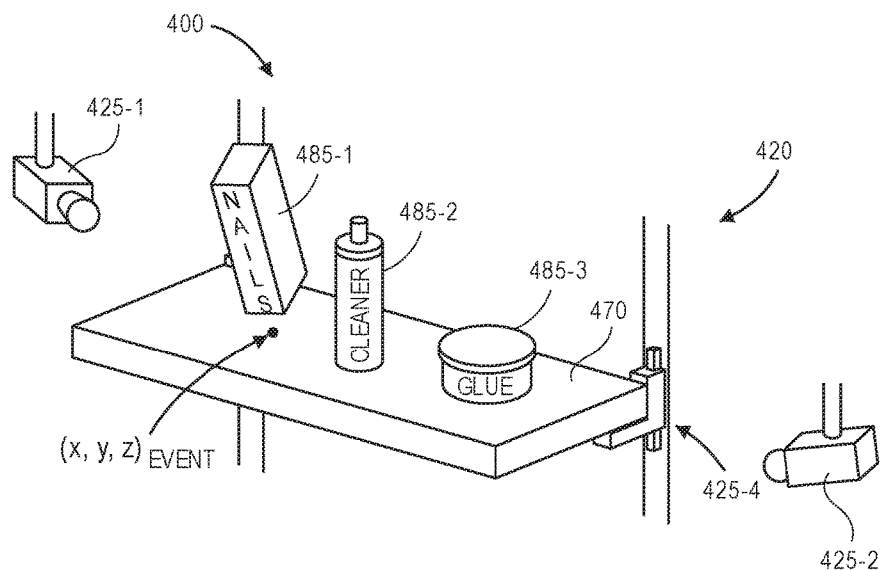

As is discussed above, events may be detected using any type or form of sensor, component or other system provided on a scene. For example, one or more of such sensors, components and/or systems may be provided in association with one or more storage units at a materials handling facility. Information or data captured or determined by such sensors may not only identify an item associated with an event, or a type of the item, but also a location associated with the event. Referring to FIGS. 4A and 4B, views of aspects of one system for associating events with actors based on digital imagery in accordance with implementations of the present disclosure are shown. Except where otherwise noted, reference numerals preceded by the number "4" shown in FIG. 4A or 4B indicate components or features that are similar to components or features having reference numerals preceded by the number "2" shown in FIG. 2A or 2B, or by the number "1" shown in FIGS. 1A through 1N.

As is shown in FIGS. 4A and 4B, a system 400 includes a fulfillment center 420 having a shelf 470 with a plurality of items 485-1, 485-2, 485-3 placed thereon. The fulfillment center 420 further includes a plurality of sensors 425-1, 425-2, 425-3, 425-4. The sensors 425-1, 425-2 are imaging devices (e.g., visual cameras, such as color, grayscale or black-and-white cameras, or depth cameras) aligned to capture imaging data from various fields of view. The sensors 425-3, 425-4 are load sensors provided on wall-based supports for determining changes in loading on the shelf 470, and are separated by predetermined distances. In some implementations, the sensors 425-3, 425-4 may be configured to generate and transfer electrical signals corresponding to forces sensed from dead and live loads associated with the shelf 470, including a weight of the shelf 470 and weights of one or more items placed thereon, including but not limited to the items 485-1, 485-2, 485-3. The sensors 425-1, 425-2, 425-3, 425-4 may be in communication with one or more computer devices (not shown) via wired or wireless means.

As is shown in FIGS. 4A and 4B, the systems and methods of the present disclosure may be utilized to not only determine that an event has occurred but also identify both the item that was removed from shelf, or a type of the item, and a location from which the item was removed, based on information or data captured by one or more of the sensors 425-1, 425-2, 425-3, 425-4. For example, as is shown in FIGS. 4A and 4B, when the item 485-1 is removed from the shelf 470, the sensors 425-1, 425-2 may capture one or more visual and/or depth images from which the item 485-1 may be identified as having removed, e.g., by interpreting one or more markings thereon expressed in such images, or by matching images of the item 485-1 to one or more images (e.g., images of types of items, such as a type of the item 485-1) stored in a database or data store in communication with the sensors 425-1, 425-2, and a location $(x, y, z)_{EVENT}$ on the shelf 470 from which the item 485-1 was removed may be determined. In some other implementations, an event may be detected (or a location of the event may be determined) based on imaging data captured by one or more imaging devices, e.g., the sensors 425-1, 425-2, or others (not shown). For example, in any set of imaging data, aspects of any number of events may be depicted therein, and the imaging data may be continuously or regularly monitored in order to determine whether an event has occurred. In some implementations, an event may be determined to have occurred where contents of the shelf 470 are determined to have changed in any pair of images (e.g., a before-and-after comparison of images depicting aspects of the shelf 470 at different times). In some other implementations, an event may be determined to have occurred where one or more body parts (e.g., a hand of an actor) are detected within a predetermined range or distance of the shelf 470 in one or more images. Imaging data captured by the sensors 425-1, 425-2 may be continuously or regularly evaluated to determine whether an event has occurred and processed according to one or more of the systems or methods disclosed herein if an event is determined to have occurred, to a predetermined level of confidence or accuracy, or discarded when it is determined that no event has occurred.

Additionally, the sensors 425-3, 425-4 may also sense a change in loading on the shelf 470 based on the removal of the item 485-1 therefrom. For example, a sum of the changes in loading sensed by the sensors 425-3, 425-4 will equal a total weight of the item 485-1. Using the weight of the item 485-1, the item 485-1 may be identified, e.g., by resort to an index, record or look-up table stored in a database or other data store in communication with the sensors 425-3, 425-4. Additionally, the differences in the changes in loading sensed by the sensors 425-3, 425-4 may be used to determine a location on the shelf 470 from which the item 485-1 was removed based on the distance between the sensors 425-3, 425-4. For example, where the change in loading sensed by the sensor 425-3 is approximately twice the change in loading sensed by the sensor 425-4, the distance between the location $(x, y, z)_{EVENT}$ on the shelf 470 and the sensor 425-3 will be approximately half the distance between the location $(x, y, z)_{EVENT}$ on the shelf 470 and the sensor 425-4.

Moreover, an event may be determined to have occurred, and a location of the event may be identified, based on information or data obtained by a combination of the sensors 425-1, 425-2, 425-3, 425-4. For example, imaging data captured by the sensors 425-1, 425-2, changes in loading sensed by the sensors 425-3, 425-4, or information or data captured by any other sensors (e.g., any RFID sensors, LIDAR sensors, or any other type or form of sensors) may be independently or collectively evaluated in order to determine a measure of a probability or likelihood that an event has occurred at the shelf 470, and processed or discarded based on whether an event has occurred or not.

After the item 485-1, or a type of the item 485-1, has been identified, a record of the inventory on the shelf 470 and/or at the materials handling facility 420 may be updated to reflect the removal of one of the item 485-1 accordingly. Subsequently, imaging data captured by the sensors 425-1, 425-2 may be processed to detect and recognize one or more actors therein, and to determine which of such actors removed the item 485-1 from the shelf 470 based on such imaging data.

Those of ordinary skill in the pertinent arts will recognize that any type or form of sensor may be used to determine information regarding an event, e.g., to determine a location of the event, an item or a type of item involved in the event, or to detect, recognize and/or identify one or more actors who may have been associated with the event. For example, in addition to imaging devices and/or load or weight sensors, a scene (e.g., a materials handling facility) may be further equipped with one or more RFID components (e.g., antennas or tags), LIDAR sensors, or any other systems or components by which information regarding events, items and/or actors may be gathered. Moreover, although the sensors 425-1, 425-2 shown in FIGS. 4A and 4B are aligned substantially parallel to a front face of the shelf 470, and although the sensors 425-3, 425-4 shown in FIGS. 4A and 4B are installed beneath the shelf 470, sensors may be provided in any location with respect to a scene or one or more components (e.g., storage units, such as shelves). For example, referring again to FIGS. 4A and 4B, one or more of the sensors 425-1, 425-2 may be mounted within or behind the shelf 470, e.g., along a wall to which the shelf 470 is mounted, and may capture information or data regarding items being placed upon or removed from the shelf 470, locations at which such items are placed or from which such items are removed, or actors associated with the placement or removal of such items.

Figure 5A:
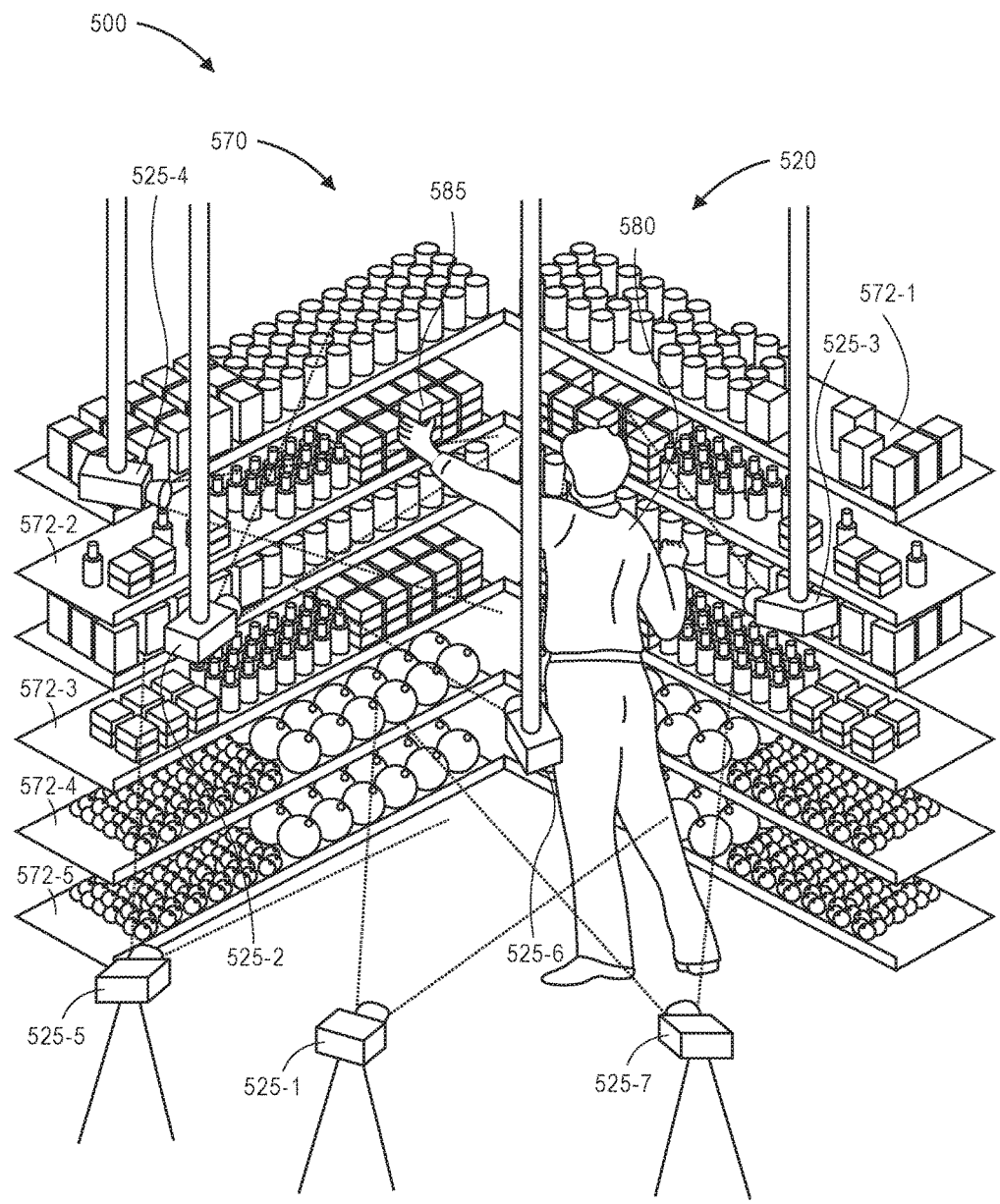
FIGS. 5A through 5C are views of aspects of one system for associating events with actors based on digital imagery in accordance with implementations of the present disclosure.
Figure 5B:
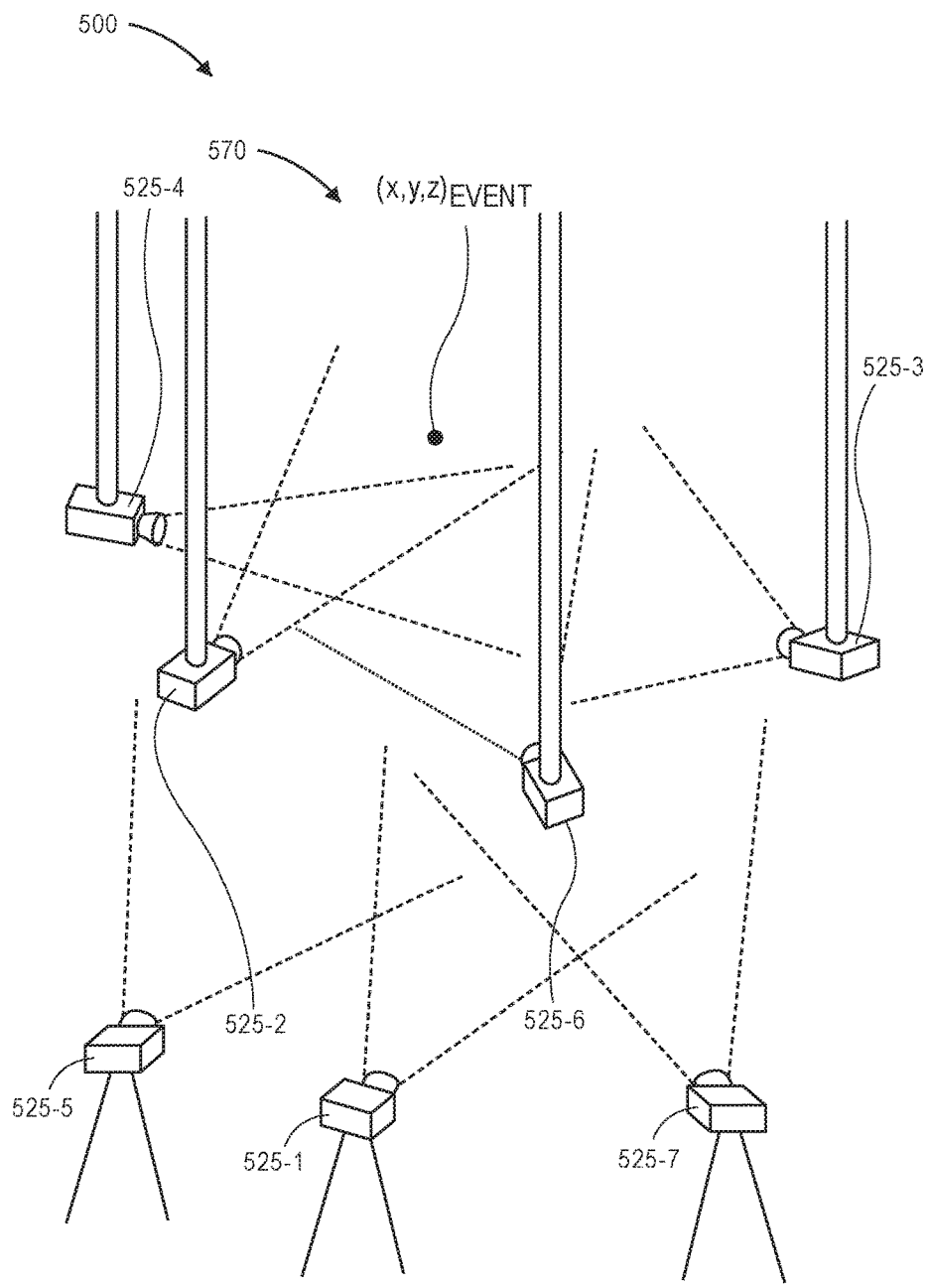
Figure 5C:
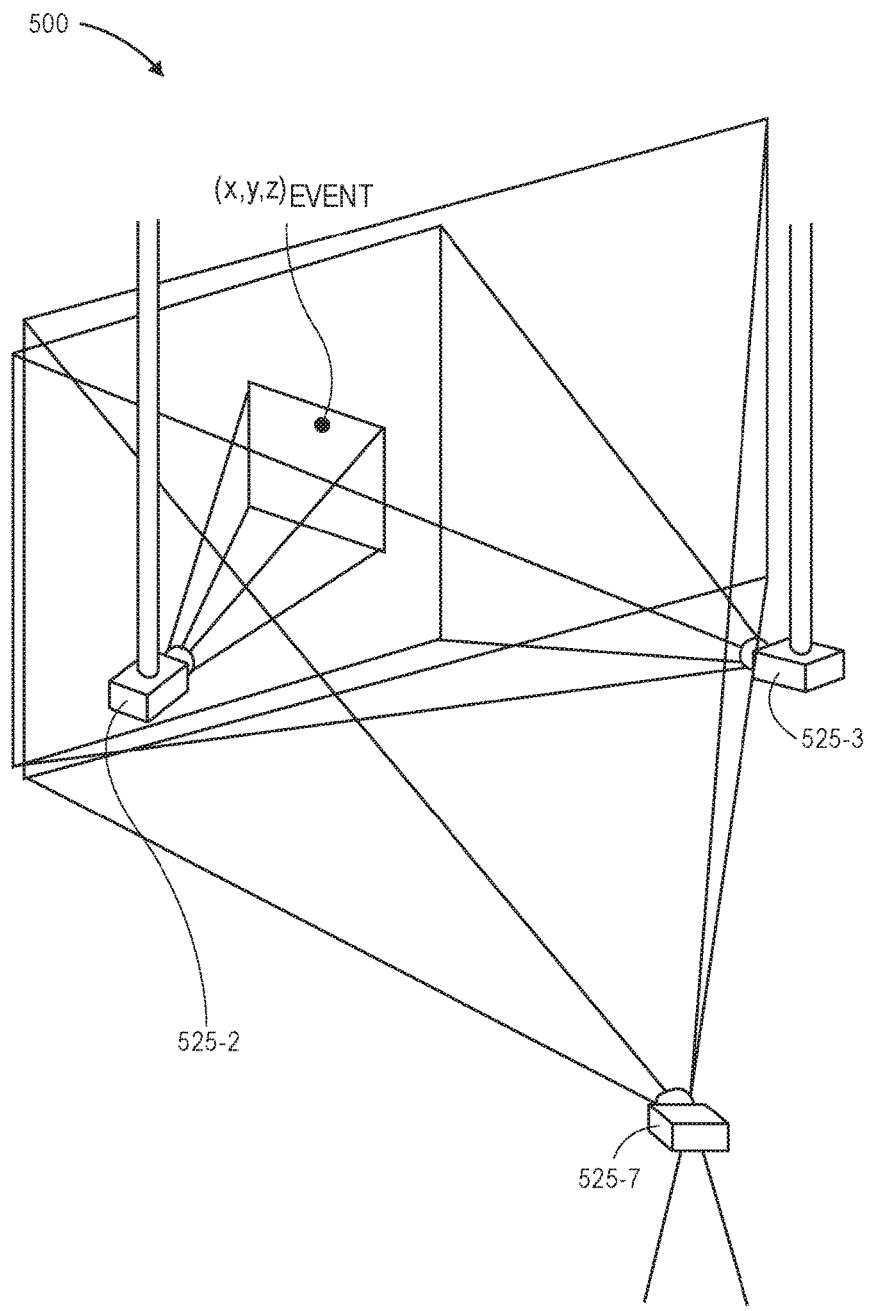

As is discussed above, a scene (e.g., a materials handling facility) may be equipped with any number of sensors (e.g., imaging devices such as digital cameras) that are aligned in different orientations. For example, a materials handling facility may be equipped with at least two imaging devices having overlapping fields of view. When an event is detected, a diverse subset of the imaging devices may be selected, and images captured by such imaging devices may be processed to recognize one or more actors therein. Referring to FIGS. 5A through 5C, views of aspects of one system for associating events with actors based on digital imagery in accordance with implementations of the present disclosure are shown. Except where otherwise noted, reference numerals preceded by the number "5" shown in FIG. 5A, 5B or 5C indicate components or features that are similar to components or features having reference numerals preceded by the number "4" shown in FIG. 4A or 4B, by the number "2" shown in FIG. 2A or 2B, or by the number "1" shown in FIGS. 1A through 1N.

As is shown in FIG. 5A, the system 500 includes a materials handling facility 520 having a shelving unit 570 with a plurality of shelves 572-1, 572-2, 572-3, 572-4, 572-5 with items stored thereon, and with a plurality of imaging devices 525-1, 525-2, 525-3, 525-4, 525-5, 525-6, 525-7 mounted in various orientations with respect to the shelves 572-1, 572-2, 572-3, 572-4, 572-5 of the shelving unit 570. As is also shown in FIG. 5A, an actor 580 extends his or her hand toward the shelf 572-2 and retrieves an item 585 therefrom. The item 585 or a type of the item 585 may be identified, and a location on the shelf 572-2 from which the item 585 was retrieved may be determined, based on any available information or data, including but not limited to changes in loading sensed by one or more sensors associated with the shelving unit 570 generally, or with the shelf 572-2 in particular, as well as one or more visual or depth images captured by one or more of the imaging devices 525-1, 525-2, 525-3, 525-4, 525-5, 525-6, 525-7.

As is discussed above, after an event such as a retrieval of the item 585 shown in FIG. 5A has been detected, a subset including two or more imaging devices having a location at which the event occurred, e.g., the location from which the item 585 was retrieved, within their respective fields of view may be selected. The imaging devices may be selected based on an extent to which such fields of view overlap and/or based on their respective axes of orientation, in order to ensure that the location of the event is well represented in imaging data captured thereby.

As is shown in FIGS. 5B and 5C, the imaging devices 525-2, 525-3, 525-7 are selected based on their orientation and/or proximity to a location $(x, y, z)_{EVENT}$ associated with the event, e.g., the location from which the item 585 was retrieved. For example, the imaging device 525-2 is positioned above the location $(x, y, z)_{EVENT}$ and includes a left side of the location $(x, y, z)_{EVENT}$ within its field of view. Likewise, the imaging device 525-3 is also positioned above the location $(x, y, z)_{EVENT}$, but includes a right side of the location $(x, y, z)_{EVENT}$ within its field of view. The imaging device 525-7 is positioned below the location $(x, y, z)_{EVENT}$, and includes the location $(x, y, z)_{EVENT}$ centrally aligned within its field of view, i.e., along an axis of orientation of the imaging device 525-7. Thus, the imaging devices 525-2, 525-3, 525-7 may each capture imaging data from above, below, to the left of and to the right of the location $(x, y, z)_{EVENT}$. Moreover, as is shown in FIG. 5A, the axes of orientation of the respective imaging devices 525-2, 525-3 are nearly perpendicular to one another, i.e., separated by approximately ninety degrees. In some implementations, the axes of orientation of imaging devices are separated by at least forty-five degrees.

Accordingly, the imaging devices 525-2, 525-3, 525-7 provide diverse views of the location $(x, y, z)_{EVENT}$ at the time of the event, and images captured by such imaging devices prior to, during or after the event may be processed to recognize and track motion, locations and/or orientations of various actors at the materials handling facility 520 at the time of the event, including but not limited to the actor 580, in order to determine which of such actors is associated with the event. Images captured by the imaging devices 525-1, 525-4, 525-5, 525-6 need not be considered and/or may be disregarded as duplicative, or in order to conserve computing resources.

As is discussed above, images captured by two or more imaging devices that include an event within their respective fields of view may be processed to detect and recognize one or more actors depicted therein. The images may be captured prior to, during or after an event. For example, after a time at which an event occurred is determined, a predetermined number of images captured by each of such imaging devices prior to the time, or after the time, may be identified and processed accordingly.

Figure 6A:
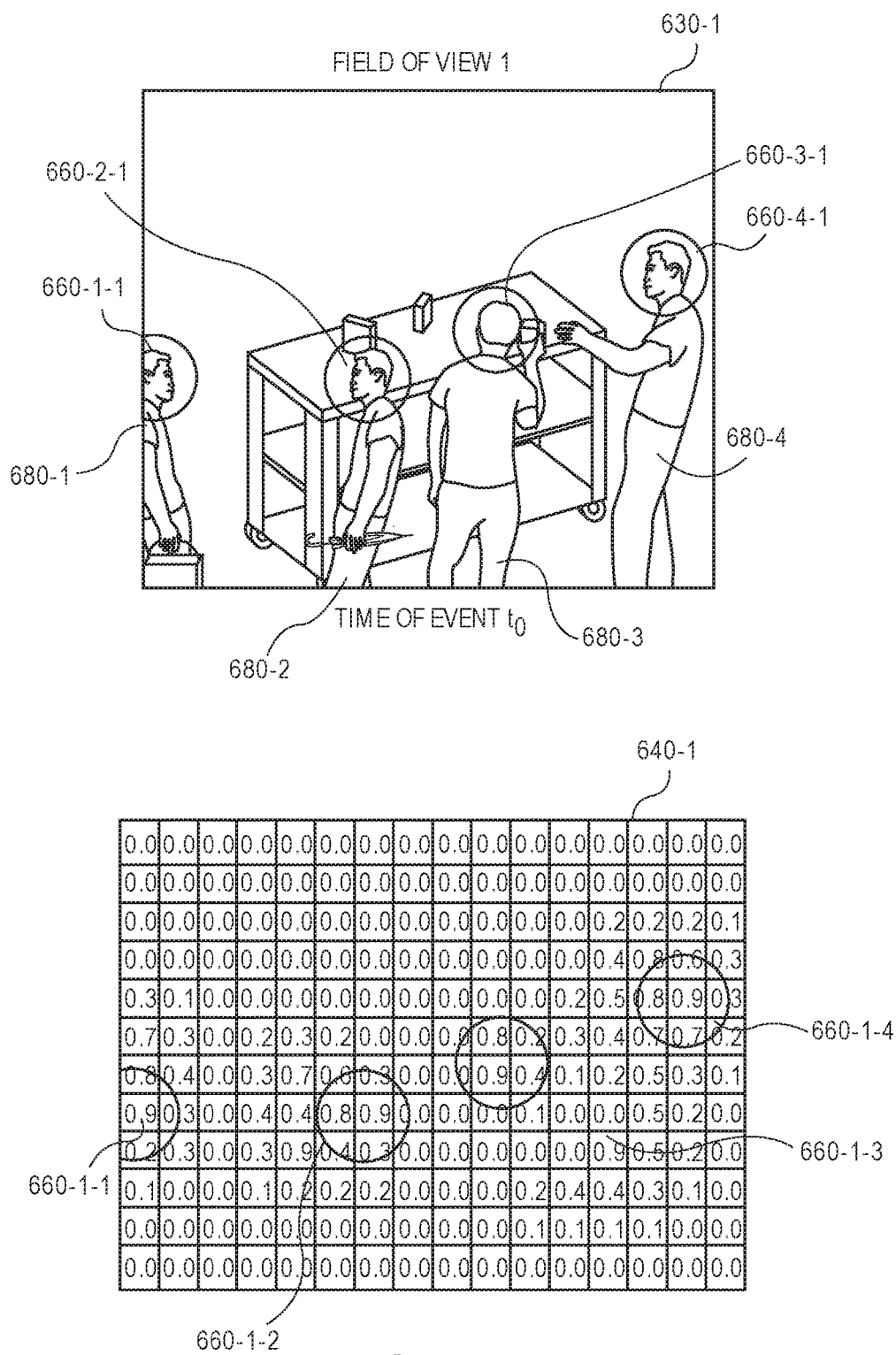
Figure 6B:
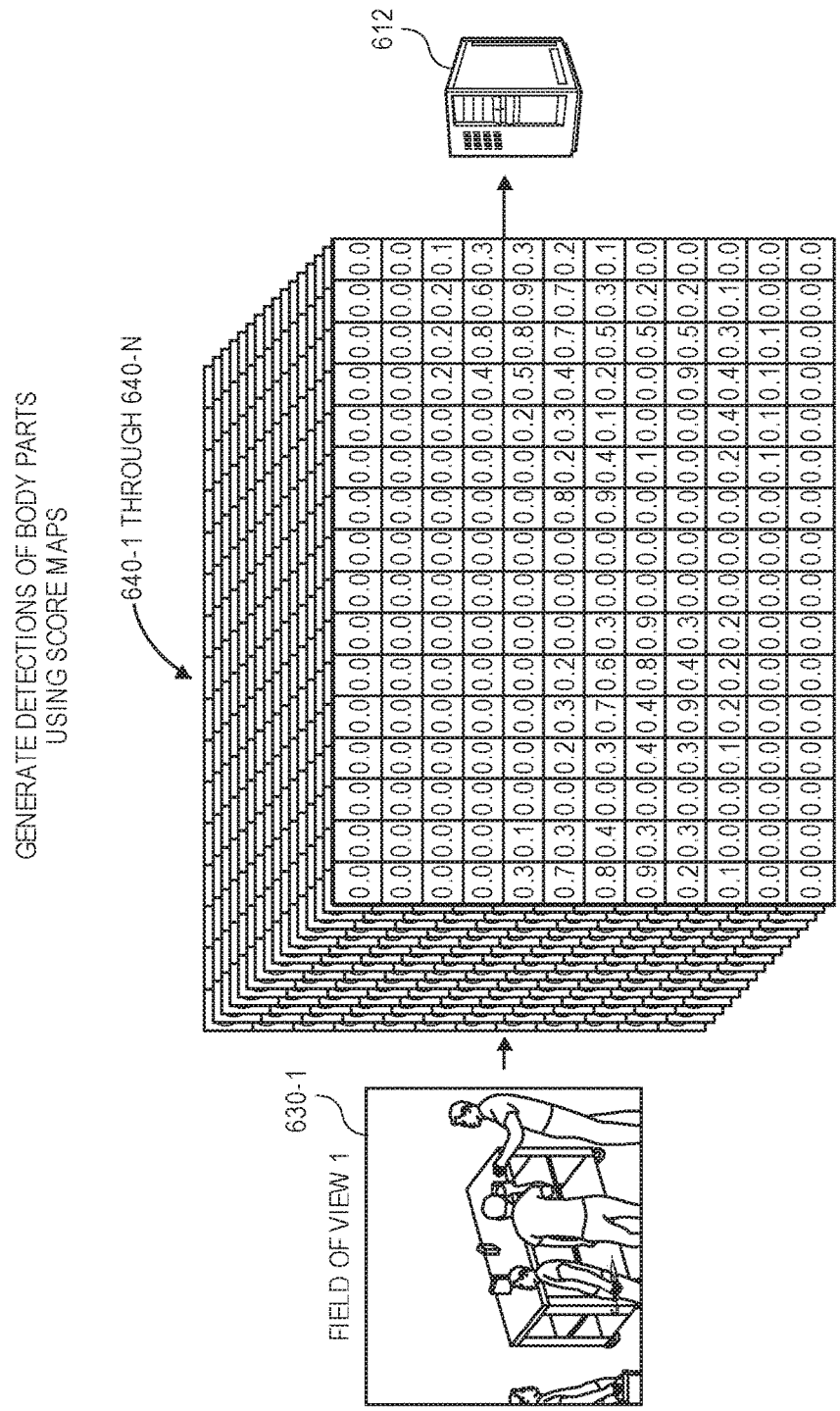

Referring to FIGS. 6A through 6C, views of aspects of one system for associating events with actors based on digital imagery in accordance with implementations of the present disclosure is shown. Except where otherwise noted, reference numerals preceded by the number "6" shown in FIGS. 6A through 6C indicate components or features that are similar to components or features having reference numerals preceded by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

Referring to FIG. 6A, an image 630-1 captured from a first field of view at a time $t_0$ of an event, and a score map 640-1 generated based on the image 630-1 are shown. The image 630-1 depicts portions of four actors 680-1, 680-2, 680-3, 680-4, including heads 660-1-1, 660-1-2, 660-1-3, 660-1-4 of each of such actors. The score map 640-1 includes a table of probabilities that pixels representing heads are included in the image 630-1 that was also captured at the time $t_0$, and identifies the regions of peak values that most likely correspond to the heads 660-1-1, 660-1-2, 660-1-3, 660-1-4 of the actors 680-1, 680-2, 680-3, 680-4 depicted in the image 630-1.

Score maps that are generated for image frames, such as the score map 640-1 shown in FIG. 6A, may be used to detect and locate a plurality of candidates of body parts based on peak values within such maps. For example, a trained classifier may be utilized to detect and locate a plurality of candidates of body parts based on peak values within score maps calculated for each of a plurality of body parts, and based on each of the images captured by a plurality of imaging devices prior to, during or after an event, e.g., similar to the score map 640-1, which is calculated based on the presence of heads 660-1-1, 660-1-2, 660-1-3, 660-1-4 within the image 630-1. As is shown in FIG. 6B, plurality of score maps 640-1 through 640-n may be generated for each of the images captured by such imaging devices, with each of the score maps corresponding to one of n body parts, e.g., heads, necks, left and right shoulders, left and right elbows, left and right wrists, left and right hands, left and right hips, left and right knees, left and right ankles, or any others. The score maps 640-1 through 640-n may be provided to a server 612 or other computer device, which may be provided in the same physical location as a scene, or in one or more alternate or virtual locations, e.g., in a "cloud"-based environment.

Each of the detections of body parts that are identified based on locations of peak values within score maps generated from image frames using a trained classifier, e.g., the score map 640-1 of FIG. 6A, may be represented as a node in a graph, with the nodes being generated based on the image frames in which such body parts were detected and the views from which such image frames were captured, as well as times at which such image frames were captured. Each of such nodes has sets of coordinates identified with respect to a unique body part (e.g., because each human has only one head, only one neck, only one left shoulder, and so on and so forth, a given node can only be one of a head, a neck, a left shoulder, or any other specific body part), a unique view from which the body part was detected (e.g., one of the imaging devices 525-1, 525-2, 525-3, 525-4, 525-5, 525-6, 525-7, or any other imaging device at the materials handling facility 520 of FIG. 5A, not shown), and an image frame in which the node was detected, i.e., a frame number or other identifier that was assigned to the image frame and/or a time at which the image frame was captured.

Each detection of a body part may include not only a position of the body part within an image frame, e.g., generated based at least in part on a position of a peak value within a score map, but also a set of vectors extending from the position of the body part to possible positions of other body parts within the image frame, subject to known physiological parameters or constraints for a human body, including but not limited to lengths or configurations of such body parts with respect to one another, or body parts to which each of such body parts is connected. Such parameters or constraints, which may include not only bone lengths or configurations but also distance constraints, articulation constraints or deformation constraints, should be both feasible and proportional for humans, and must remain constant over time, given that actors may not typically change dimensions of their limbs or their respective configurations or orientations over time. Subsequently, edges extending between nodes may be generated based on the output of the trained classifier, with such edges being established along three axes, including temporal edges, triangulation edges and regression edges. Temporal edges are edges that extend between pairs of detections of the same body part within image frames captured from the same view, but in different frames. Triangulation edges are edges that extend between pairs of detections of the same body part at the same time within image frames captured from different views. Regression edges are edges that extend between pairs of detections of different body parts within the same image frame.

Each of the edges between each pair of body part detections may be assigned a probability that the two body part detections of the pair each correspond to the same actor. For example, a temporal edge between two detections of the same type of body part within different successive image frames that are captured from the same view may be assigned a probability that the detections correspond to the same body part (e.g., that detections of heads, necks or left shoulders correspond to the same head, the same neck, the same left shoulder, and so on and so forth) within each of the image frames at different times. A triangulation edge between two detections of the same type of body part within synchronized image frames captured from different views may be assigned a probability that the detections correspond to the same body part (e.g., that detections of heads, necks or left shoulders correspond to the same head, the same neck, the same left shoulder, and so on and so forth) within each of the image frames at different times. A regression edge between two detections of different types of body parts within the same image frame may be assigned a probability that the detections correspond to body parts of the same actor. The edges between nodes across image frames captured from the same view or from different views, or of edges within image frames, may be contracted probabilistically based on pairwise information regarding each of the nodes in a pair that are connected by an edge.

As is shown in FIG. 6C, based on detected positions of body parts within the image 630-1 and images captured prior to, at or after the time $t_0$ of the event, as well as predicted positions of other body parts not depicted within the images, and edges extending between nodes within a common image, edges extending between nodes within synchronized images captured by different imaging devices, or edges between nodes within different images captured by the same imaging device, skeletons (e.g., three-dimensional articulated models of partial or complete sets of body parts of actors) 665-1, 665-2, 665-3, 665-4 for the actors 680-1, 680-2, 680-3, 680-4 within the scene at the time $t_0$ of the event may be generated accordingly. The skeletons 665-1, 665-2, 665-3, 665-4 may be generated as vectors or functions over time $M_1(t)$, $M_2(t)$, $M_3(t)$, $M_4(t)$, each representing motion of the body parts embodied by their respective nodes (e.g., trajectories or tracklets), and the edges between such nodes, or in any other manner. For example, in some implementations, nodes corresponding to body parts may be represented in space by a set of Cartesian coordinates, or coordinates according to any other system, and a skeleton in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and a virtual skeleton in the form of a record or a vector may identify edges by reference to their respective nodes, or include one or more of such formulas, equations or other representations for such edges. A trajectory or tracklet representative of the motion of each of the body parts within image frames may be generated accordingly.

As is discussed above, body parts may be detected, and three-dimensional skeletons may be generated, based on imaging data captured from a single imaging device, e.g., based on monocular cues detected from the imaging data. Such monocular cues may relate to any background features or other elements that are visible within the imaging data. Referring to FIGS. 7A through 7D, views of aspects of one system for associating events with actors based on digital imagery in accordance with implementations of the present disclosure is shown. Except where otherwise noted, reference numerals preceded by the number "7" shown in FIGS. 7A through 7D indicate components or features that are similar to components or features having reference numerals preceded by the number "6" shown in FIGS. 6A through 6C, by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

Figure 7A:
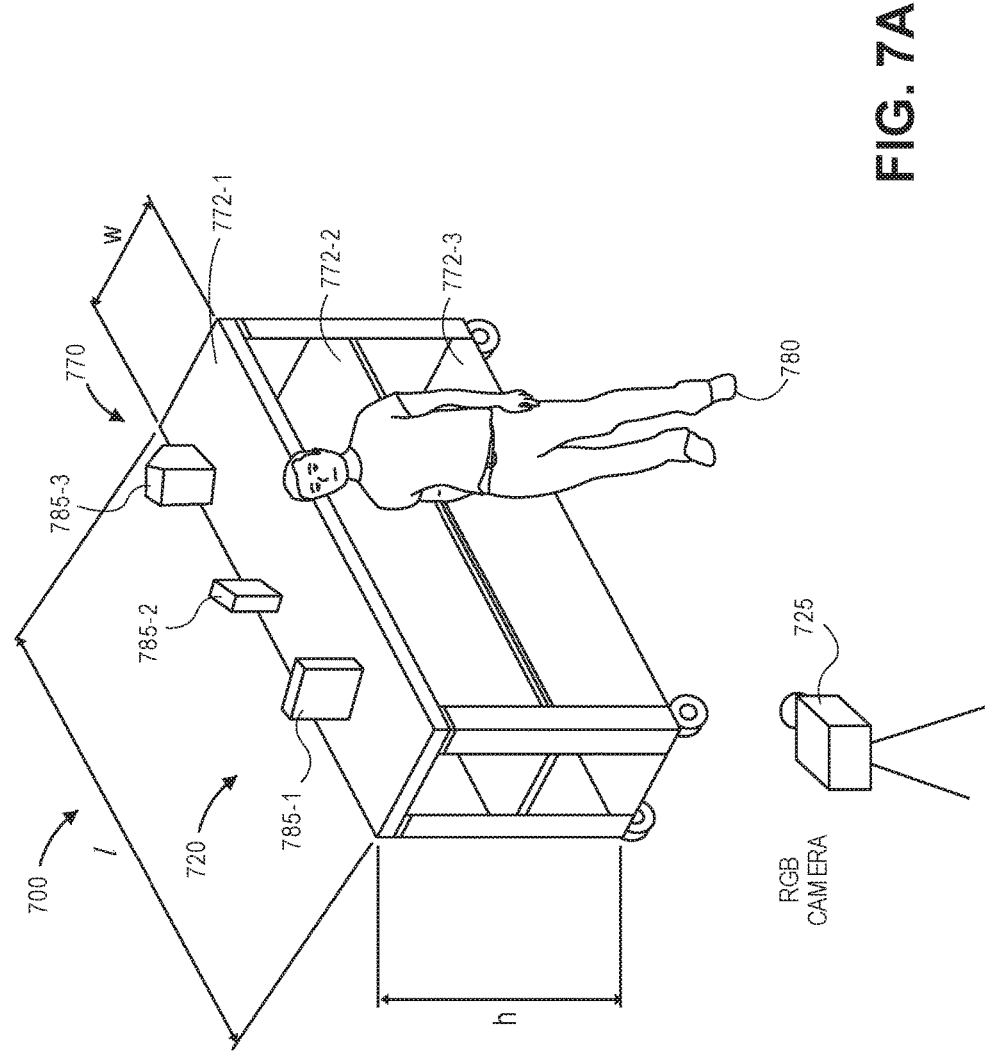
FIGS. 7A through 7D are views of aspects of one system for associating events with actors based on digital imagery in accordance with implementations of the present disclosure.

As is shown in FIG. 7A, a system 700 includes a scene 720 having an imaging device 725 (e.g., a digital camera) and a storage unit 770 (e.g., a set of shelves). The storage unit 770 has a length l, a width w and a height h.

The imaging device 725 may be installed or otherwise operated in an imaging device network (or camera network), and may be in communication with one or more computer devices or systems (not shown). Optionally, the scene 720 may include one or more other sensors. For example, the storage unit 770 may further include one or more load sensors disposed beneath or otherwise in association with one or more shelves of the shelving unit 770. Such load sensors may be load cells or other systems that are configured to generate load signals consistent with levels of loading on one or more of the shelves of the storage unit 770, and such signals may be processed to determine weights of items placed thereon, or changes in such weights. The scene 720 may further include or more RFID components (e.g., antennas or tags), LIDAR sensors, or any other systems or components by which information regarding events, items and/or actors may be gathered. The imaging device 725 and any other sensors may be in communication with one or more computer devices or systems (not shown), which may further include one or more databases or other data stores having information regarding attributes that are, have been or might be stored on one or more of the shelves of the shelving unit 770. Such attributes may include, but are not limited to, one or more dimensions and/or masses of such items, locations on shelves where such items are typically placed, or colors or textures of surface elements (e.g., packaging, wrapping, coverings or the like) of such items, or any other attributes.

Figure 7B:
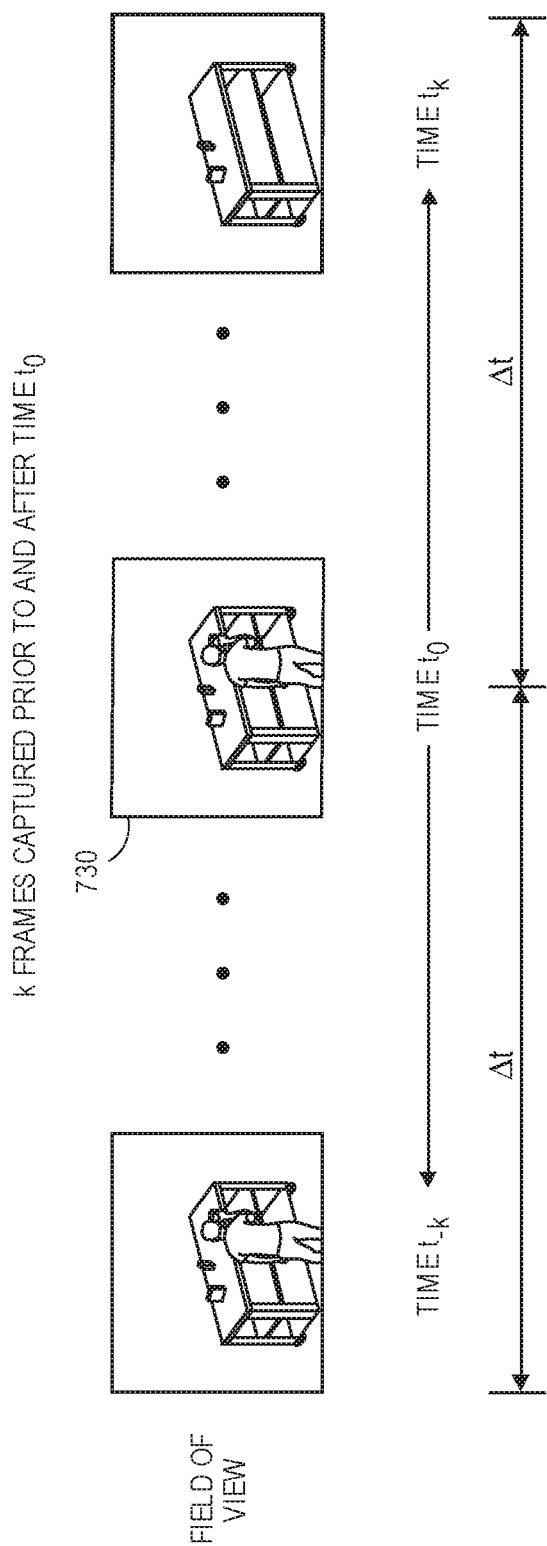

The scene 720 may be any open or enclosed environment or space in which any number of actors (e.g., humans, other animals or machines) may execute one or more poses, gestures or other actions within the fields of view of the imaging device 725, including an actor 780. In some implementations, the scene 720 may be or include at least a portion of a materials handling facility. As is also shown in FIGS. 7A and 7B, the actor 780 may execute one or more poses or gestures in the scene 720.

In some implementations, the systems and methods of the present disclosure may process images captured at a time at which an event is detected, e.g., an image 730 captured at a time $t_0$ of an event, but also images captured immediately prior to or following the time $t_0$ of the event. As is shown in FIG. 7B, a plurality of images captured by the imaging device 725 during predetermined periods of time $\Delta t$ preceding and following the time $t_0$ at which the event was detected are shown. For example, as is shown in FIG. 7B, a plurality of k frames captured during the periods of time $\Delta t$ by the imaging device 725 are identified.

Figure 7C:
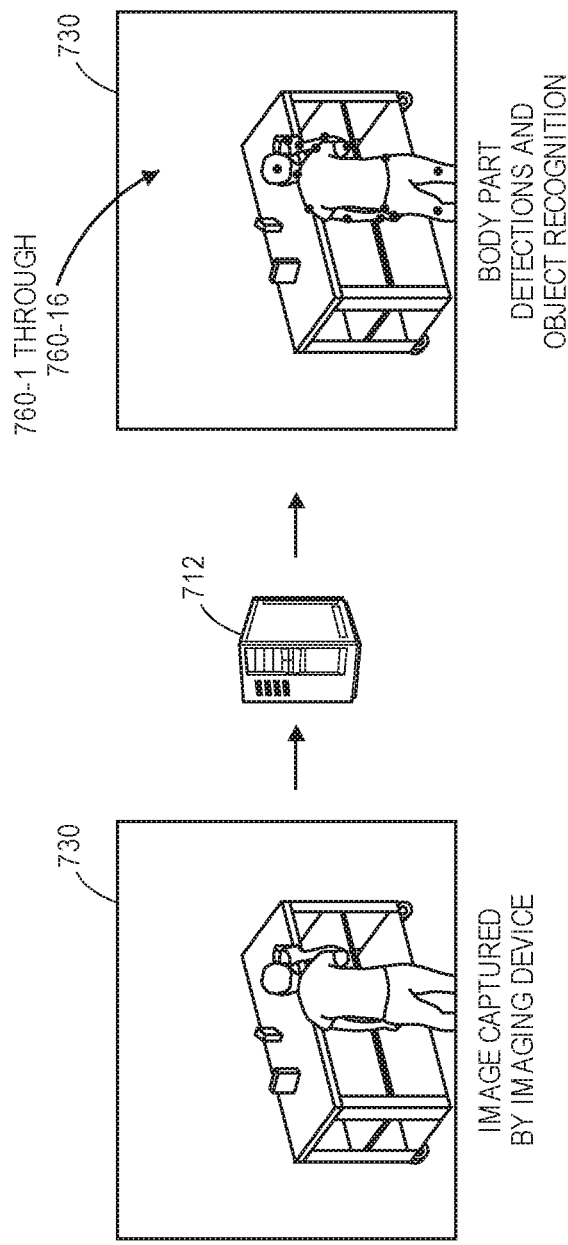

Each of the images captured by the imaging device 725 during the predetermined periods of time $\Delta t$ preceding and following the time $t_0$ may be processed by one or more computer processors operating on the imaging device 725 or on an external computer server (or other device or system) in order to recognize the presence and locations of one or more body parts therein. For example, the imaging device 725 may execute one or more classifiers, algorithms or techniques for detecting not only the body parts of the actor 780 but also one or more monocular cues depicted within the visual images, such as monocular cues relating to the storage unit 770, and use attributes associated with such monocular cues (e.g., the length l, the width w and the height h) to determine positions of the body parts of the actor 780 in three-dimensional space. In some implementations, such classifiers, algorithms or techniques may include, but are not limited to, a Markov Random Field, a Markov network or other like model. As is shown in FIG. 7C, the imaging device 725 may detect one or more body parts of actors within image frames captured thereby and determine their respective positions or extend edges therebetween based on one or more actual and/or predicted physiological parameters or constraints (e.g., known or predicted bone lengths). Where the length l, the width w and the height h are known or may be estimated with a reasonable degree of confidence, the length l, the width w and the height h may be used to estimate lengths, orientations or other attributes of body parts of the actor 780 within the images, and positions of such body parts may be predicted accordingly. The images may be processed by a classifier, an algorithm or another technique for detecting one or more body parts within image frames. In some implementations, the images may be processed by a deep neural network, a convolutional neural network, a support vector machine, or any other type or form of classifier that is trained to recognize any number of discrete body parts within image frames captured from multiple perspectives.

Figure 7D:
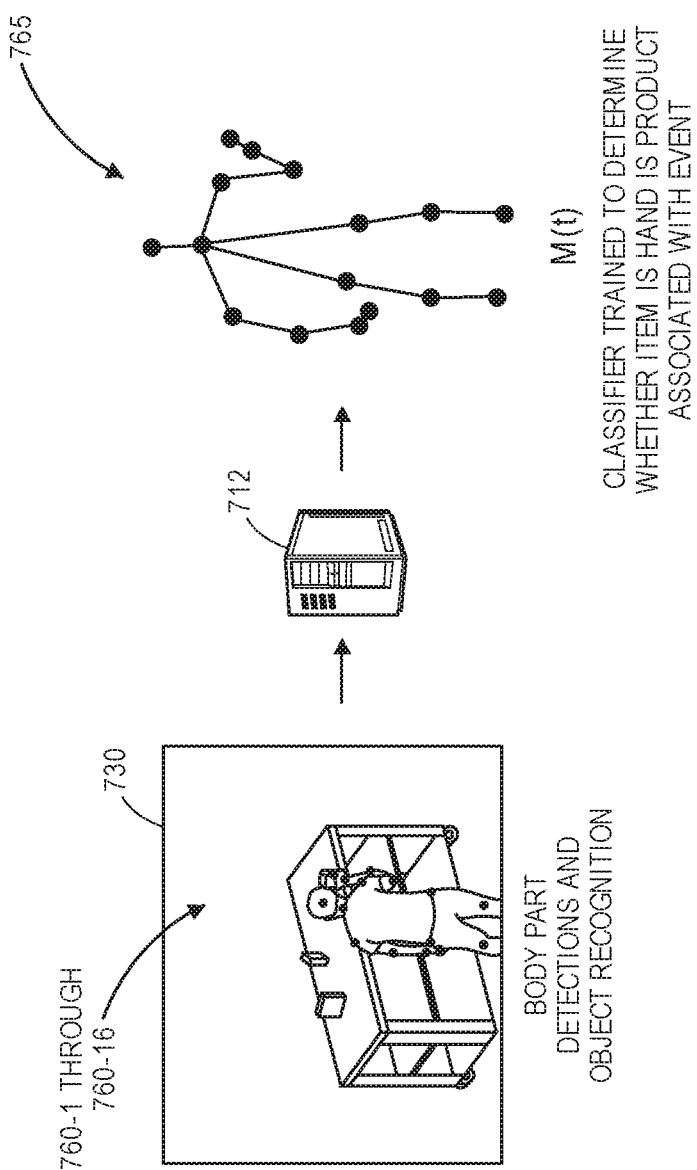

As is shown in FIG. 7D, based on detected positions of body parts and monocular cues within the image 730 and images captured prior to, at or after the time $t_0$ of the event, as well as predicted positions of other body parts not depicted within the images, and edges extending between nodes within a common image, edges extending between nodes within synchronized images captured by different imaging devices, or edges between nodes within different images captured by the same imaging device, a skeleton 765 (e.g., a three-dimensional articulated model of a complete or partial set of body parts) for the actor 780 within the scene at the time $t_0$ of the event may be generated accordingly. The skeleton 765 may be generated as a vector or a function M(t) over time, representing motion of the body parts embodied by their respective nodes, and the edges between such nodes, or in any other manner, e.g., identifying body parts by sets of Cartesian coordinates, or coordinates according to any other system, and identifying edges extending between a pair of nodes by reference to each of the nodes of the pair, as well as a linear formula, a linear equation or other representation of points extending between the respective nodes of the pair. A trajectory or tracklet representative of the motion of each of the body parts within image frames may be generated accordingly.

Figure 8B:
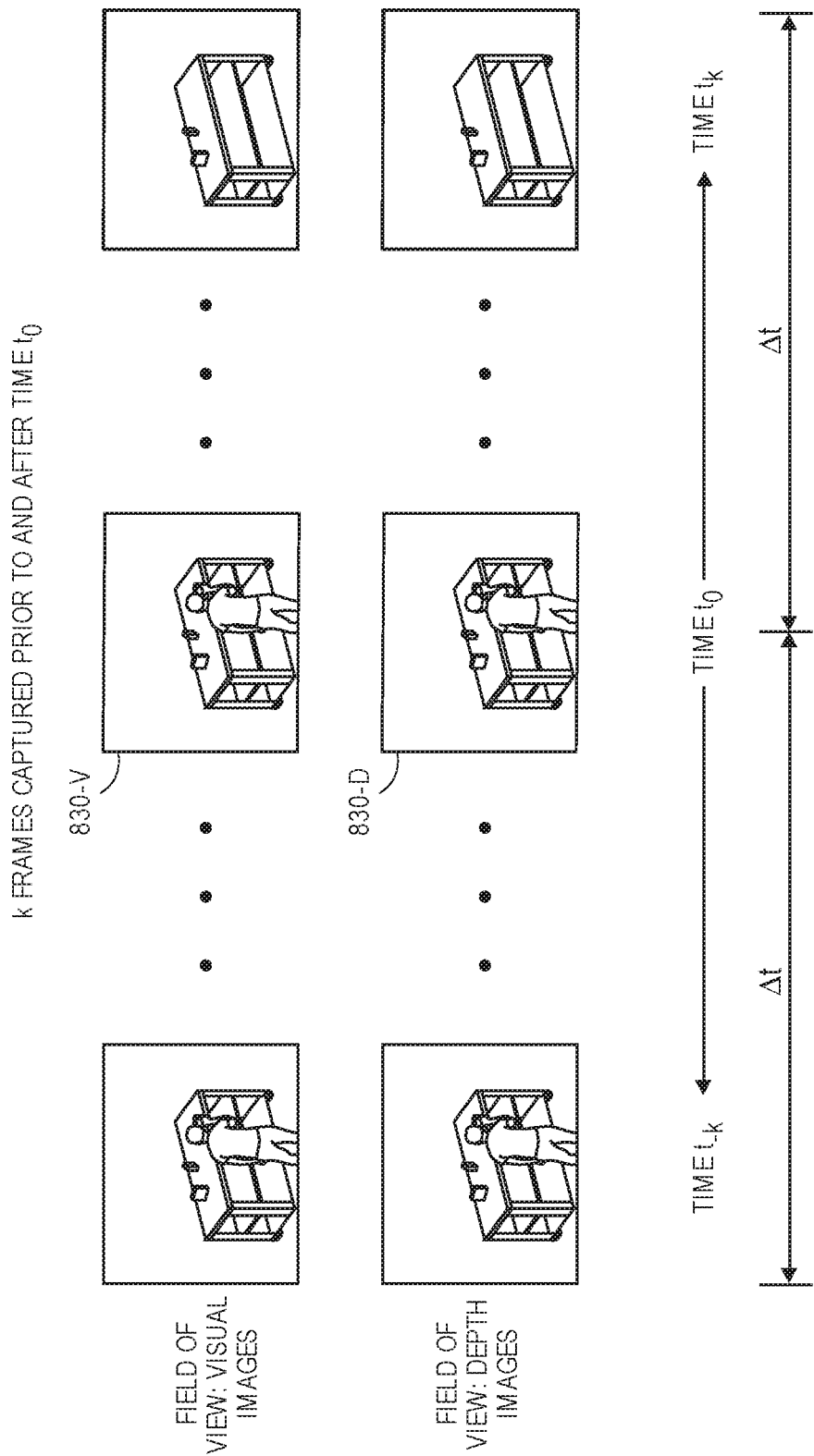

Body parts may also be detected, and three-dimensional skeletons may be generated, based on visual imaging data and depth imaging data captured from a single imaging device, e.g., by an RGBD camera. Referring to FIGS. 8A through 8C, views of aspects of one system for associating events with actors based on digital imagery in accordance with implementations of the present disclosure is shown. Except where otherwise noted, reference numerals preceded by the number "8" shown in FIGS. 8A through 8C indicate components or features that are similar to components or features having reference numerals preceded by the number "7" shown in FIGS. 7A through 7D, by the number "6" shown in FIGS. 6A through 6C, by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

As is shown in FIG. 8A, a system 800 includes a scene 820 having an imaging device 825 (e.g., an RGBD camera configured to capture both visual imaging data and depth imaging data) and a storage unit 870 (e.g., a set of shelves). The imaging device 825 may be installed or otherwise operated in an imaging device network (or camera network), and may be in communication with one or more computer devices or systems (not shown). Optionally, the scene 820 may include one or more other sensors. For example, the storage unit 870 may further include one or more load sensors disposed beneath or otherwise in association with one or more shelves of the shelving unit 870. Such load sensors may be load cells or other systems that are configured to generate load signals consistent with levels of loading on one or more of the shelves of the storage unit 870, and such signals may be processed to determine weights of items placed thereon, or changes in such weights. The scene 820 may further include or more RFID components (e.g., antennas or tags), LIDAR sensors, or any other systems or components by which information regarding events, items and/or actors may be gathered. The imaging device 825 and any other sensors may be in communication with one or more computer devices or systems (not shown), which may further include one or more databases or other data stores having information regarding attributes that are, have been or might be stored on one or more of the shelves of the shelving unit 870. Such attributes may include, but are not limited to, one or more dimensions and/or masses of such items, locations on shelves where such items are typically placed, or colors or textures of surface elements (e.g., packaging, wrapping, coverings or the like) of such items, or any other attributes.

The scene 820 may be any open or enclosed environment or space in which any number of actors (e.g., humans, other animals or machines) may execute one or more poses, gestures or other actions within the fields of view of the imaging device 825, including an actor 880. In some implementations, the scene 820 may be or include at least a portion of a materials handling facility. As is also shown in FIG. 8A, the actor 880 may execute one or more poses or gestures in the scene 820.

In some implementations, the systems and methods of the present disclosure may process visual imaging data and depth imaging data captured at a time at which an event is detected, e.g., a visual image 830-V and a depth image 830-D captured at a time $t_0$ of an event, but also imaging data captured immediately prior to or following the time $t_0$ of the event. As is shown in FIG. 8B, a plurality of visual images and depth images captured by the imaging device 825 during predetermined periods of time Δt preceding and following the time $t_0$ at which the event was detected are shown. For example, as is shown in FIG. 8B, a plurality of k visual image frames and a plurality of k depth image frames captured during the periods of time Δt by the imaging device 825 are identified.

Each of the visual images and depth images captured by the imaging device 825 during the predetermined periods of time Δt preceding and following the time $t_0$ may be processed by one or more computer processors operating on the imaging device 825 or on an external computer server (or other device or system) in order to recognize the presence and locations of one or more body parts therein. For example, the imaging device 825 may interpret one or more of the visual images to recognize a body part such as a hand therein, based on contours, outlines, colors, textures, silhouettes, shapes or other attributes depicted within the visual images, as compared to actual characteristics of hands. Additionally, the imaging device 825 may also interpret one or more of the depth images to recognize a depth map or profile of a body part such as a hand therein, based on ranges or distances to surface features of objects depicted within the depth images, as compared to actual characteristics of hands. Where attributes of a given body part are detected within a visual image and a depth image, and may be correlated with respect to one another, a position of the given body part may be determined in three-dimensional space accordingly. Visual images and depth images may be processed by a classifier, an algorithm or another technique for detecting one or more body parts within image frames. In some implementations, the images may be processed by a deep neural network, a convolutional neural network, a support vector machine, or any other type or form of classifier that is trained to recognize any number of discrete body parts within image frames captured from multiple perspectives.

Figure 9B:
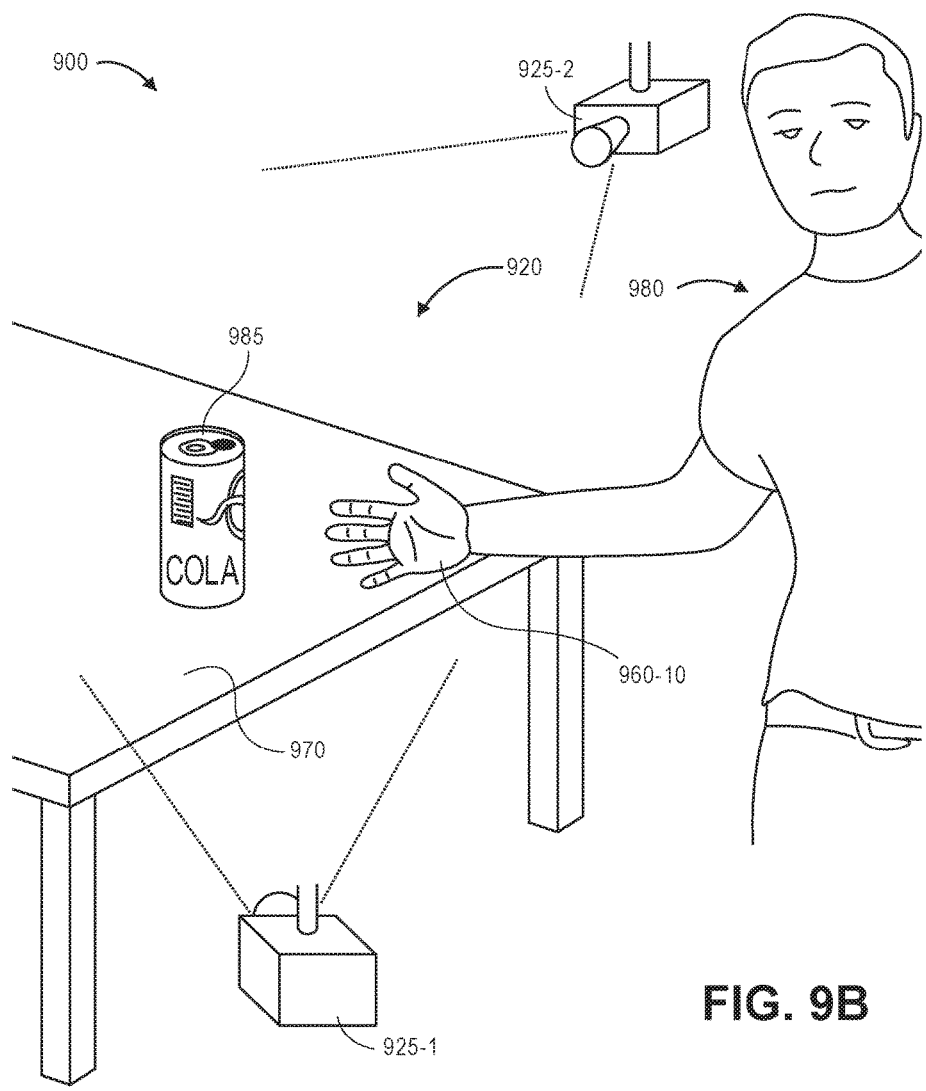
Figure 9C:
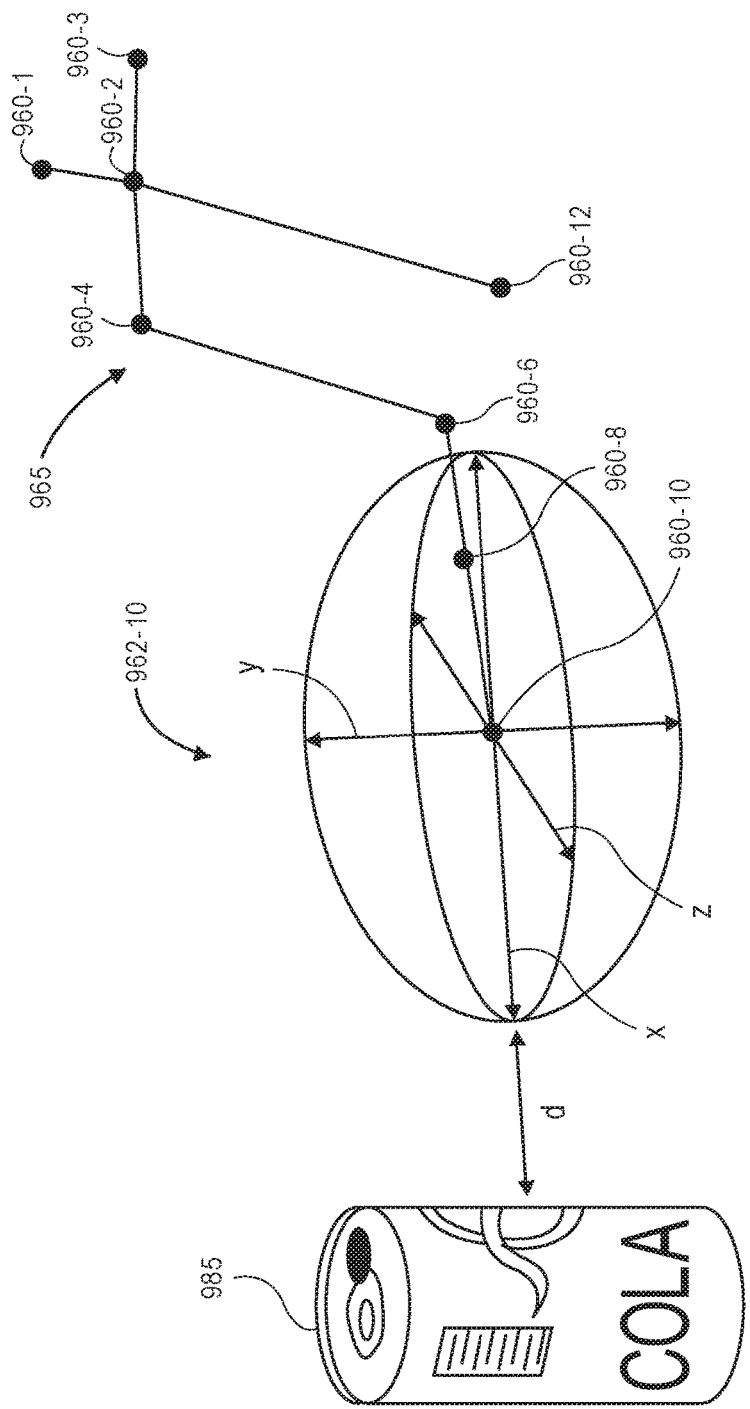

Motion of an actor may be determined based on a complete set of body parts of a skeleton, or a partial skeleton formed by less than a complete set of the body parts, in order to define a set of points provided about a determined position of a body part in three dimensions. Additionally, the body part may be presumed, with a sufficiently high degree of confidence, to be located somewhere within an uncertainty surface that is virtually constructed or defined about any number of hands or other body parts, such as heads or feet. Referring to FIGS. 9A through 9C, views of aspects of one system for associating events with actors based on digital imagery in accordance with implementations of the present disclosure is shown. Except where otherwise noted, reference numerals preceded by the number "9" shown in FIGS. 9A through 9C indicate components or features that are similar to components or features having reference numerals preceded by the number "8" shown in FIGS. 8A through 8C, by the number "7" shown in FIGS. 7A through 7D, by the number "6" shown in FIGS. 6A through 6C, by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

As is shown in FIGS. 9A and 9B, a system 900 includes a materials handling facility 920 having a plurality of imaging devices 925-1, 925-2 (or other sensors) and a shelf 970 having an item 985 (e.g., a beverage container) provided thereon. Alternatively, the materials handling facility 920 may include any number of other storage units, as well as any number of other sensors that may be configured to capture information or data regarding items, events or actors, e.g., other imaging devices (not shown) having all or a portion of the shelf 970 within their respective fields of view.

An actor 980 is shown as attempting to interact with the item 985 on the shelf 970, e.g., by extending a hand 960-10 in a direction of the item 985, within fields of view of each of the imaging devices 925-1, 925-2. As is shown in FIGS. 9A and 9B, the actor 980 walks toward the item 985 on the shelf 970 at times $t_0$, $t_1$, $t_2$, and $t_3$. The event may be detected on any basis, and based on information or data obtained from any source or sensor, including but not limited to imaging data captured by the imaging devices 925-1, 925-2. For example, the event may be detected by comparing pairs of images to determine any change in the contents of the shelf 970 over time, or to identify a location of the event where such contents have changed. Additionally, or alternatively, the event may be determined to have occurred where one or more body parts of the actor, e.g., a hand, passes within a predetermined range or distance of a location of the shelf 970 and/or one or more items thereon.

Once an event involving the item 985 is detected at time $t_2$, imaging data (e.g., visual and/or depth images, as well as associated metadata, including but not limited to any audio signals that may be captured simultaneously with such images) captured by the imaging devices 925-1, 925-2 prior to, during and after time $t_2$ may be analyzed to recognize and locate one or more aspects of the actor 980, including but not limited to the right hand 960-10 of the actor 980. A skeleton or other articulated model of one or more body parts of the actor 980, and any other actors (not shown) at the materials handling facility 920 appearing within the fields of view of the imaging devices 925-1, 925-2, may be generated accordingly. For example, images captured by the imaging devices 925-1, 925-2 prior to, during or after the event, may be provided to a classifier trained to recognize one or more types of body parts, including but not limited to the right hand 960-10 but also a head, a neck, shoulders, elbows, wrists, a left hand, hips, knees, and/or ankles, and recognizing positions of candidate body parts within such images. From such positions, a skeleton or other articulated model of an actor may be generated. Additionally, imaging data that is captured by the imaging devices 925-1, 925-2 in response to determining that an event has occurred, and evaluated to identify an item or a type of item involved in the event or to detect body parts of the actor 980 may be continuously or regularly evaluated to determine whether any other events have occurred, or to determine whether any other actors are present at the materials handling facility 920.

As is discussed above, uncertainty surfaces associated with the positions of one or more body parts, e.g., hands, of a full or partial skeleton may be virtually constructed or defined such that the uncertainty surfaces may be presumed to encompass a location of a body part, to a sufficiently high degree of confidence. The uncertainty surface may take any shape or form, and have any size, based on the confidence in the detected position. In some implementations, an uncertainty surface may be defined as a virtual ellipsoid having axes of symmetry that intersect at a center corresponding to a detected body part, e.g., a palm of an actor's hand. Lengths of the respective axes may be defined based on uncertainties associated with the sensors (e.g., imaging devices) that captured the information or data (e.g., imaging data) from which the positions were determined, an environment from which the information or data was captured (e.g., occlusions, lighting conditions, other actors or obstructions within a scene), as well as any other factors. Where an uncertainty surface surrounding a body part is comparatively small, confidence in a position of a body part associated with the uncertainty surface is high. Where an uncertainty surface surrounding a body part is comparatively large, confidence in a position of the body part associated with the uncertainty surface is low.

As is shown in FIG. 9C, an uncertainty surface 962-10 is constructed around a position of the right hand 960-10 of the actor 980, as represented in a partial skeleton 965 of the actor 980. The partial skeleton 965 includes not only the detected position of the right hand 960-10 but also detected positions of a right wrist 960-8, a right elbow 960-6, a right shoulder 960-4, a neck 960-2, a head 960-1, a left shoulder 960-3 and a right hip 960-12, as determined based on imaging data captured by the imaging devices 925-1, 925-2. The uncertainty surface 962-10 is defined as a set of points in the form of a virtual ellipsoid having the detected position of the right hand 960-10 at the center, and with vertical, horizontal and/or lateral axes (e.g., x-, y- and z-axes) with respect to the detected position of the right hand 960-10. Accordingly, based on the construction of the uncertainty surface 962-10, one or more features regarding the position of the hand 960-10 of the actor 980 may be determined with respect to one or more points on surfaces of the uncertainty surface 962-10. For example, in some implementations, a distance d between a location of an event involving the item 985 and a nearest point on an external surface of the uncertainty surface 962-10 may be determined. Any number of full and/or partial skeletons within a vicinity of a location of the event may be ranked based on their respective distances between the location of the event and nearest points on external surfaces of uncertainty surfaces, e.g., the distance d for the partial skeleton 965, for each of such skeletons. In some implementations, one of the features that is provided to a classifier in order to discern which of two or more actors on a scene is associated with an event may include a distance between a location of an event and one or more nearest points on the uncertainty surface 962-10 at a time of the event, e.g., the distance d for the partial skeleton 965. For example, where a location of an event is determined to be within an uncertainty surface of a hand of a given actor (e.g., the uncertainty surface 962-10 of FIG. 9C), or within a close proximity of the hand of the given actor, and sufficiently distant from the hands of other actors, the event may be presumed to be associated with that given actor.

The shape of the uncertainty surface 962-10 of FIG. 9C may be contracted over time as information or data regarding the position of the hand 960-10 is subsequently obtained. For example, the lengths of one or more of the respective axes of the ellipsoid of the uncertainty surface 962-10 may be reduced, thereby shrinking the uncertainty surface 962-10, and increasing determinations of confidence in the detected position 960-10, as well as determinations of probability that the actor 980 was, or was not, associated with an event. Moreover, the uncertainty surface 962-10 may be constructed based on any factor regarding the detected position 960-10, including confidence in the detected position 960-10 itself, or confidence in one or more sources of information or data from which the detected position 960-10 was determined. For example, one or more dimensions of the uncertainty surface 962-10 may be determined based on confidence in a position of an imaging device or other sensor from which the information or data by which the detected position 960-10 was determined, or based on any other attribute of the imaging device or other sensor. Furthermore, the axes of the ellipsoid may be defined with respect to axes in Cartesian space, e.g., vertical, horizontal and/or lateral axes, or sets of axes that are locally defined with respect to one or more attributes of the actor 980. For example, one of the axes of the ellipsoid may be defined with respect to an axis of a forearm or other aspect of the body of the actor 980, and other axes may be defined with respect to other aspects of the body of the actor 980, e.g., dorsal (back) or palmar (palm) portions of the hand 960-10, or with respect to such axes, i.e., orthogonal to an axis of the forearm.

In some implementations, uncertainty surfaces may be constructed or defined with respect to positions of other body parts, e.g., alternatively or in addition to hands. In some other implementations, the uncertainty surface may be defined as a virtual sphere, a virtual cone, a virtual pyramid, a virtual rectangular hollow, or any other virtual three-dimensional shape.

As is discussed above, whether a given actor is associated with an event that occurs on a scene may be determined based on a variety of features regarding the scene (e.g., global features) as well as a variety of features regarding the respective actors on the scene (e.g., actor features). Imaging data captured prior to, during or after the event may be processed to calculate such features based on body parts recognized at the scene, positions of such body parts, edges connecting nodes corresponding to such parts, or skeletons or other articulated models defined based on such edges and nodes.

Figure 10A:
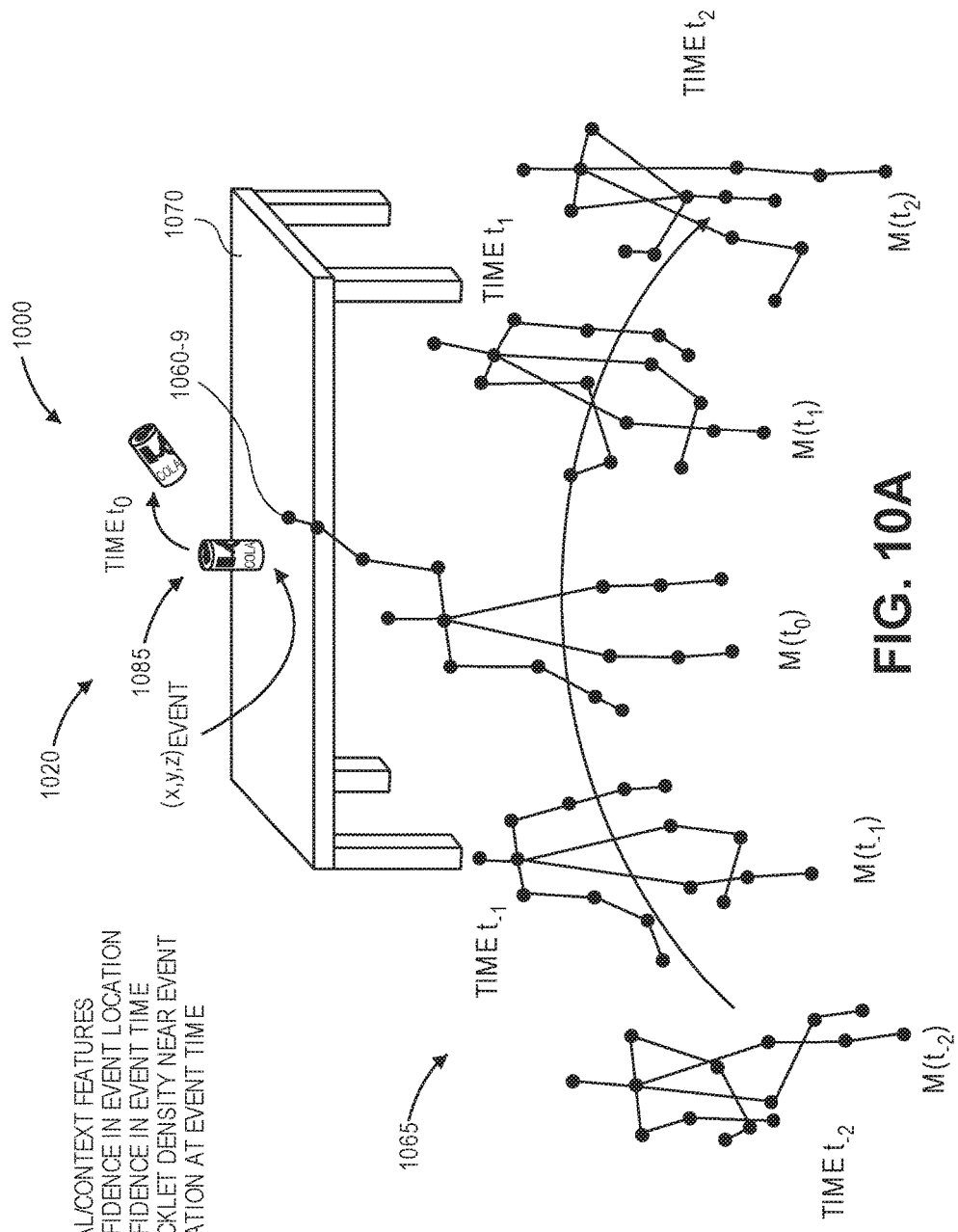
FIGS. 10A and 10B are views of aspects of one system for associating events with actors based on digital imagery in accordance with implementations of the present disclosure.
Figure 10B:
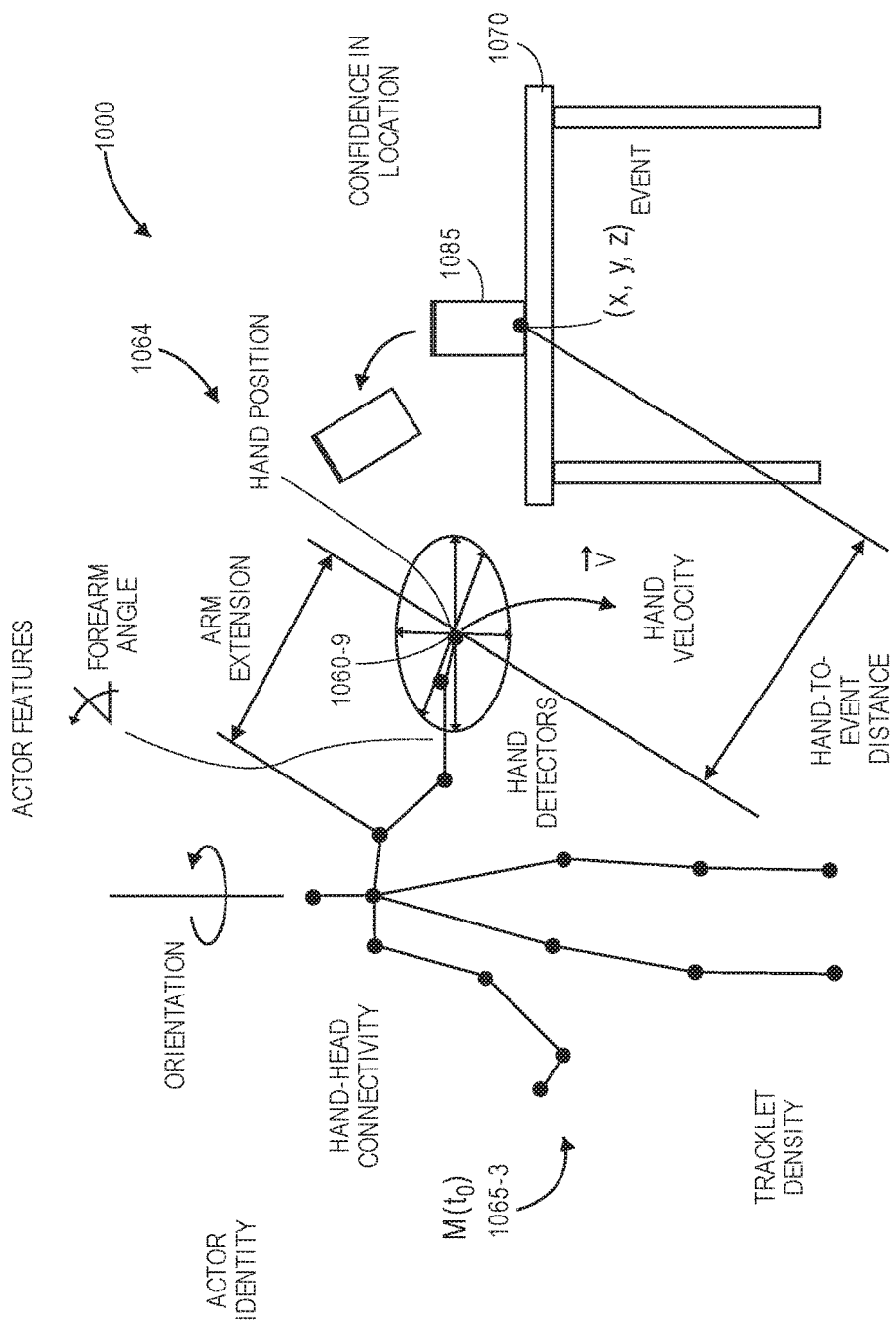

Referring to FIGS. 10A and 10B, views of aspects of one system for associating events with actors based on digital imagery in accordance with implementations of the present disclosure is shown. Except where otherwise noted, reference numerals preceded by the number "10" shown in FIGS. 10A and 10B indicate components or features that are similar to components or features having reference numerals preceded by the number "9" shown in FIGS. 9A through 9C, by the number "8" shown in FIGS. 8A through 8C, by the number "7" shown in FIGS. 7A through 7D, by the number "6" shown in FIGS. 6A through 6C, by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

As is shown in FIG. 10A, a system 1000 includes a materials handling facility 1020 having a storage unit 1070 (e.g., a table) with an item 1085 thereon. A skeleton 1065 in the form of a record, a vector or other function as a model M(t) of the motion, the locations and/or the orientations at a time $t_0$ of an event, e.g., the removal of the item 1085 from a location $(x, y, z)_{EVENT}$ at the storage unit 1070 at the time $t_0$, and at a plurality of times $t_{-2}$, $t_{-1}$ preceding the time to of the event, and at a plurality of times $t_{+1}$, $t_{+2}$ following the event is shown with respect to the storage unit 1070 and the item 1085. The motion, the locations and/or the orientations of the model $M(t_{-2})$, $M(t_{-1})$, $M(t_0)$, $M(t_{+1})$, $M(t_{+2})$ at the times $t_{-2}$, $t_{-1}$, $t_0$, $t_{+1}$, $t_{+2}$ are shown. In some implementations, nodes corresponding to body parts of an actor may be represented in space by a set of Cartesian coordinates, or coordinates according to any other system, and the skeleton 1065 may include one or more of such sets of coordinates. In some implementations, edges extending between a pair of nodes may be established by reference to each of the nodes of the pair, as well as a linear formula, a linear equation or other representation of points extending between the respective nodes of the pair, and the skeleton 1065 may identify edges by reference to their respective nodes, or include one or more of such formulas, equations or other representations for such edges. Although the skeleton 1065 is shown with a single trajectory or tracklet corresponding to its collective motion at the times $t_{-2}, t_{-1}, t_0, t_{+1}, t_{+2}$, the skeleton 1065 may be represented by trajectories or tracklets corresponding to motion of each of the respective body parts at the times $t_{-2}, t_{-1}, t_0, t_{+1}, t_{+2}$, any of which may be tracked over periods of time preceding and following the event. Any number of skeletons, e.g., partial skeletons or full skeletons, may be generated based on detections of body parts of any number of actors at the materials handling facility 1020 at the times $t_{-2}, t_{-1}, t_0, t_{+1}, t_{+2}$.

Any number of features regarding the material handling facility 1020 (e.g., global features) and the various actors therein (e.g., actor features) may be calculated and used to determine whether one of the actors may be associated with the event, to a sufficiently high degree of confidence. For example, global features such as a measure of confidence in the location $(x, y, z)_{EVENT}$ of the event may be determined based on any factors associated with the accuracy or precision of one or more sensors that determined that the event occurred at the time $t_0$, and at the location $(x, y, z)_{EVENT}$, and considered in determining whether the actor for whom the skeleton 1065 was generated was associated with the event. Likewise, a measure of a density of trajectories or tracklets of skeletons (including the skeleton 1065 and any others, not shown) within a vicinity of the location $(x, y, z)_{EVENT}$ at the time $t_0$ may also be determined, thereby expressly indicating a number of actors in the vicinity of the item 1085, and implying the presence or absence of any obstructions, at the time $t_0$ may also be considered in determining whether the specific skeleton 1065 is associated with the event.

Additionally, as is shown in FIG. 10B, a number of actor features may be calculated regarding the skeleton 1065 or any other skeletons at the materials handling facility 1020 (not shown), and considered in determining whether the actor for whom the skeleton 1065 was generated, or any other actors (not shown), was associated with the event. In some implementations, distances between positions of hands of skeletons (such as hands of the skeleton 1065) at the time $t_0$ and the location $(x, y, z)_{EVENT}$ may be the predominant factor, or a primary factor, considered in determining probabilities that skeletons of actors are associated with the event. In some implementations, distances between positions of hands of actors at the time $t_0$, and the location $(x, y, z)_{EVENT}$ may be used to rank skeletons and/or to identify two or more skeletons as most likely associated with the event, while excluding other skeletons as less likely or not likely associated with the event. The distances may be determined based on detected positions of such hands, or with respect to uncertainty surfaces associated with such detected positions, or on any other basis.

Additionally, an identity of the actor for whom the skeleton 1065 was generated may be considered in determining a likelihood that the actor is interested in the item 1085, or a type of the item, e.g., based on a prior history of browsing for and/or purchasing one or more items. An orientation of the skeleton 1065 at the time $t_0$ may be considered in determining a likelihood that the actor was facing the item 1085 at the time $t_0$, which may indicate whether the actor was or was not interested in the item 1085 at the time $t_0$. An angle of an arm (or portions thereof, e.g., a forearm) of the skeleton 1065, an extension of the arm of the skeleton 1065, or a velocity of a hand of the skeleton 1065, may be considered in determining whether the hand was directed toward the item 1085 at the time $t_0$, or whether the hand could have paused for a sufficient period of time at the time $t_0$ to retrieve the item 1085 from the storage unit 1070. A probability that the hand of the skeleton 1065 is associated with the head of the skeleton 1065 may also be considered in determining whether the specific skeleton 1065 is associated with the event. Finally, an uncertainty surface associated with a position of the hand at time $t_0$, e.g., an uncertainty surface constructed or defined for the hand, may also be considered in determining whether the hand may be associated with the event.

Any other features regarding the motion, the locations and/or the orientations of any number of actors on a scene such as the materials handling facility 1020 of FIG. 10A, as expressed by skeletons or other articulated models, including but not limited to the global features shown in FIG. 10A or the actor features shown in FIG. 10B, may be considered in determining a probability that any given skeleton, generated for any given actor, is associated with any given event at a scene in accordance with the present disclosure.

Once skeletons have been defined and global features and actor features have been calculated, a ranking of a probability or likelihood that each of the skeletons or actors on a scene was associated with an event may be determined based on trajectories or tracklets of such skeletons, as well as the global and/or actor features. The trajectories or tracklets of skeletons and the global features or actor features associated with a scene or their motion, locations and/or orientations may be provided as inputs to a classifier. Scores representative of probabilities or likelihoods that each of such skeletons may be associated with a given event involving an item of a type may be determined based on outputs received from the classifier. In some implementations, if one of the probabilities is sufficiently high, the actor for which the skeleton having the highest probability was generated may be determined to be associated with the event and/or the item. In some implementations, the score or probability may be used to rank each of the skeletons, and two or more of the highest-ranking skeletons may be selected accordingly.

Figure 11B:
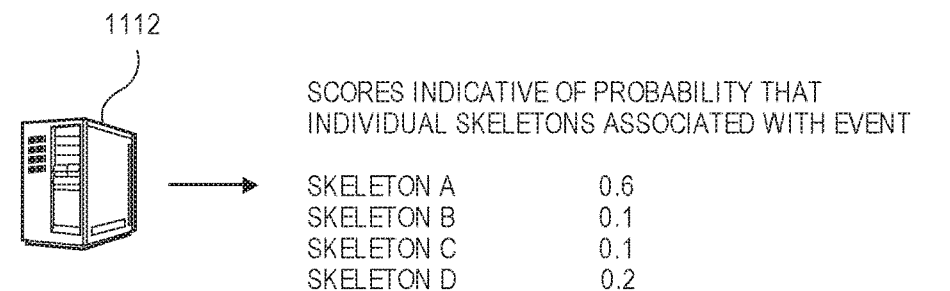
Figure 11B:
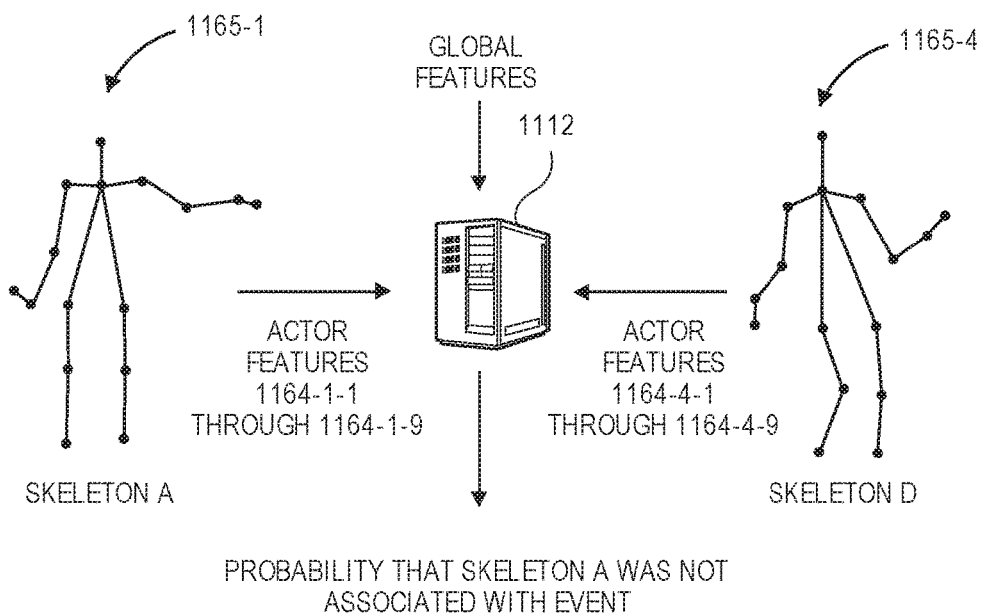

Referring to FIGS. 11A and 11B, a view of aspects of one system for associating events with actors based on digital imagery in accordance with implementations of the present disclosure is shown. Except where otherwise noted, reference numerals preceded by the number "11" shown in FIGS. 11A and 11B indicate components or features that are similar to components or features having reference numerals preceded by the number "10" shown in FIGS. 10A and 10B, by the number "9" shown in FIGS. 9A through 9C, by the number "8" shown in FIGS. 8A through 8C, by the number "7" shown in FIGS. 7A through 7D, by the number "6" shown in FIGS. 6A through 6C, by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

As is shown in FIG. 11A, four discrete skeletons 1165-1, 1165-2, 1165-3, 1165-4 and four corresponding sets of actor features 1164-1-1 through 1164-1-9, 1164-2-1 through 1164-2-9, 1164-3-1 through 1164-3-9, 1164-4-1 through 1164-4-9 are shown. Each of the skeletons 1165-1, 1165-2, 1165-3, 1165-4 and the sets of actor features 1164-1-1 through 1164-1-9, 1164-2-1 through 1164-2-9, 1164-3-1 through 1164-3-9, 1164-4-1 through 1164-4-9 are calculated based on detections of one or more body parts of a specific actor within imaging data captured from a scene, e.g., a materials handling facility, by one or more imaging devices.

The skeletons 1165-1, 1165-2, 1165-3, 1165-4 and the sets of features 1164-1-1 through 1164-1-9, 1164-2-1 through 1164-2-9, 1164-3-1 through 1164-3-9, 1164-4-1 through 1164-4-9 may be provided along with a location (x, y, z)$_{EVENT}$ and a time $t_0$ of an event as inputs to a classifier operating on a server 1112. The classifier may be trained to determine whether one of the skeletons 1165-1, 1165-2, 1165-3, 1165-4 may be associated with an event occurring at the location (x, y, z)$_{EVENT}$ and the time $t_0$, based on the respective classifiers. For example, the classifier may be a support vector machine or other classifier configured to generate an output, in the form of a probability measure (e.g., a value between 0 and 1), indicative as to whether one of the skeletons 1165-1, 1165-2 is associated with the event that occurred at the location (x, y, z)$_{EVENT}$ and the time $t_0$.

In some implementations, the skeletons 1165-1, 1165-2 may be generated based on each of the actors (i.e., two in number) that are located on the scene of the event, and at the time $t_0$. In some implementations, skeletons and/or actors may be ranked based on the probability or likelihood that each of such skeletons or each of such actors is associated with a given event, such as based on a distance between hands or other body parts of such skeletons and the location (x, y, z)$_{EVENT}$ at the time $t_0$. For example, a predetermined number of the skeletons that are identified as being located within a predetermined range of the location (x, y, z)$_{EVENT}$, e.g., a range of approximately one to one-and-one-quarter meters from the location (x, y, z)$_{EVENT}$, and features may be calculated for each of such skeletons with respect to the location (x, y, z)$_{EVENT}$. Skeletons and features may be provided to the server 1112 for each of the skeletons that are within the predetermined range. Alternatively, two or more of the skeletons that are identified as having been nearest the location (x, y, z)$_{EVENT}$ at the time t0 may be identified, and features may be calculated for each of such skeletons with respect to the location (x, y, z)$_{EVENT}$. Skeletons and features may be provided to the server 1112 for each of the highest-ranking skeletons.

As is shown in FIG. 11A, the features 1164-1-1 through 1164-1-9 may include an identity of an actor corresponding to the skeleton 1165-1 (viz., IDENTITY$_A$); an orientation of the actor corresponding to the skeleton 1165-1 with respect to the location (x, y, z)$_{EVENT}$ at the time $t_0$ (viz., ORIENTATION$_A$); an angle at which a forearm of the actor corresponding to the skeleton 1165-1 is aligned with respect to the location (x, y, z)$_{EVENT}$ at the time $t_0$ (viz., FOREARM$_A$); a measure of an association between a hand of the actor corresponding to the skeleton 1165-1 and one or more other body parts of the actor, such as a head of the actor, at the time $t_0$ (viz., HAND-ACTOR$_A$); a measure of an extension of an arm of the actor corresponding to the skeleton 1165-1 with respect to the location (x, y, z)$_{EVENT}$ at the time $t_0$ (viz., ARM EXTENSION$_A$); a measure of confidence in a position of the hand of the actor corresponding to the skeleton 1165-1, e.g., an uncertainty surface associated with the position, at the time $t_0$ (viz., HAND POSITION$_A$); a measure of confidence in a detection of the hand of the actor corresponding to the skeleton 1165-1, e.g., whether the detection is a hand, and whether the hand is associated with the actor corresponding to the skeleton 1165-1, at the time $t_0$ (viz., HAND DETECTION$_A$); a measure of a velocity of the hand of the actor corresponding to the skeleton 1165-1 at the time $t_0$ (viz., HAND VELOCITY$_A$); and a measure of confidence that the hand of the actor corresponding to the skeleton 1165-1 may be associated with the event at the time $t_0$ (viz., HAND-EVENT$_A$).

Similarly, as is also shown in FIG. 11A, the features 1164-2-1 through 1164-2-9 may include values or variables corresponding to those noted above with regard to the features 1164-1-1 through 1164-1-9, but for the skeleton 1165-2, viz., IDENTITY$_B$, ORIENTATION$_B$, FOREARM$_B$, HAND-ACTOR$_B$; ARM EXTENSION$_B$, HAND POSITION$_B$, HAND DETECTION$_B$; HAND VELOCITY$_B$, and HAND-EVENT$_B$. The features 1164-3-1 through 1164-3-9 and the features 1164-4-1 through 1164-4-9 also include values or variables corresponding to those noted above with regard to the features 1164-1-1 through 1164-1-9 or the features 1164-2-1 through 1164-2-9, but for the skeleton 1165-3, viz., IDENTITY$_C$; ORIENTATION$_C$, FOREARM$_C$, HAND-ACTOR$_C$, ARM EXTENSION$_C$, HAND POSITION$_C$, HAND DETECTION$_C$; HAND VELOCITY$_C$; and HAND-EVENT$_C$, and for the skeleton 1165-4, viz., IDENTITY$_D$; ORIENTATION$_D$; FOREARM$_D$; HAND-ACTOR$_D$; ARM EXTENSION$_D$; HAND POSITION$_D$; HAND DETECTION$_D$; HAND VELOCITY$_D$; and HAND-EVENT$_D$, respectively.

As is shown in FIG. 11B, the skeletons 1165-1, 1165-2, 1165-3, 1165-4, the sets of features 1164-1-1 through 1164-1-9, 1164-2-1 through 1164-2-9, 1164-3-1 through 1164-3-9, 1164-4-1 through 1164-4-9, the location (x, y, z)$_{EVENT}$ and the time $t_0$ may be provided as inputs to the classifier operating on the server 1112, and a score indicative of a probability or likelihood that any of the skeletons 1165-1, 1165-2, 1165-3, 1165-4 may be most likely associated with the event may be determined based on an output received from the classifier. Where a score exceeds a predetermined threshold or is otherwise sufficiently high, such that the event may be associated with one of the skeletons 1165-1, 1165-2, 1165-3, 1165-4 to a sufficiently high degree of confidence, an inference that an actor corresponding to the one of the skeletons was associated with the event, or with an item corresponding to the event, may be properly drawn. Where two or more of such scores exceed a predetermined threshold or are otherwise sufficiently high, the skeletons 1165-1, 1165-2, 1165-3, 1165-4 may be ranked based on such scores, and two or more of the skeletons 1165-1, 1165-2, 1165-3, 1165-4 having the highest rankings may be identified from the ranking.

For example, as is shown in FIG. 11B, a score of 0.6 indicative of a probability or likelihood that the skeleton 1165-1 is associated with the event may be calculated based on an output received from the classifier operating on the server 1112. Likewise, scores of 0.1, 0.1 and 0.2 indicative of probabilities or likelihoods that the skeletons 1165-2, 1165-3, 1165-4, respectively, are associated with the event may also be calculated based on outputs received from the classifier operating on the server 1112. Accordingly, the skeletons 1165-1, 1165-4 are identified as the highest-ranking skeletons based on such scores.

Subsequently, the skeletons 1165-1, 1165-4 may be provided as inputs to another classifier operating on the server 1112 or another computer device or system (not shown), along with the actor features 1164-1-1 through 1164-1-9 for the skeleton 1165-1, the actor features 1164-4-1 through 1164-4-9 for the skeleton 1165-4, and global features calculated based on the scene. Based on outputs received from the classifier, a probability that the highest-ranking skeleton was not associated with the event, i.e., that the identification of the skeleton 1165-1 as most likely associated with the event was incorrect, may be determined. Alternatively, the classifier operating on the server 1112 may determine a probability that the highest-ranking skeleton was associated with the event, i.e., that the identification of the skeleton 1165-1 as most likely associated with the event was correct. Although only two of the highest-ranking skeletons 1165-1, 1165-4 are shown in FIG. 11B as having been identified based on their scores, any number of highest-ranking skeletons may be considered.

The scores generated by the server 1112 may have any relative or absolute value. For example, the scores may have values between zero and one, such as is shown in FIG. 11B, or any other value. Additionally, in some implementations, determining whether the ranking of the skeletons was correct is optional and may be bypassed. For example, where one of the skeletons has a score with a sufficiently high value, or where the highest-scoring skeleton has a score that is sufficiently above the score of the second-highest-scoring skeleton, the ranking of the skeletons may be presumed to be correct. The event may be associated with the skeleton having the highest score, and no further analysis is required.

In some implementations, an inference that an actor on a scene was associated with an event may be drawn based on an analysis of digital imagery regarding contents of various actors' hands at a time of the event. For example, where an event is presumed to involve an item, images of each of the hands on a scene at the time of an event may be identified, cropped (or cut, trimmed or otherwise partitioned) and otherwise analyzed to recognize which of such hands likely do not hold any items, and which of such hands possibly or likely hold one or more items. Where each of a plurality of hands is identified as possibly or likely holding one or more items, images of such hands may be further cropped and/or otherwise analyzed to determine which of such hands is holding the item associated with the event. If only a single actor on a scene is identified as holding one of the item, then the actor may be identified as having been associated with the event or the item.

Figure 12A:
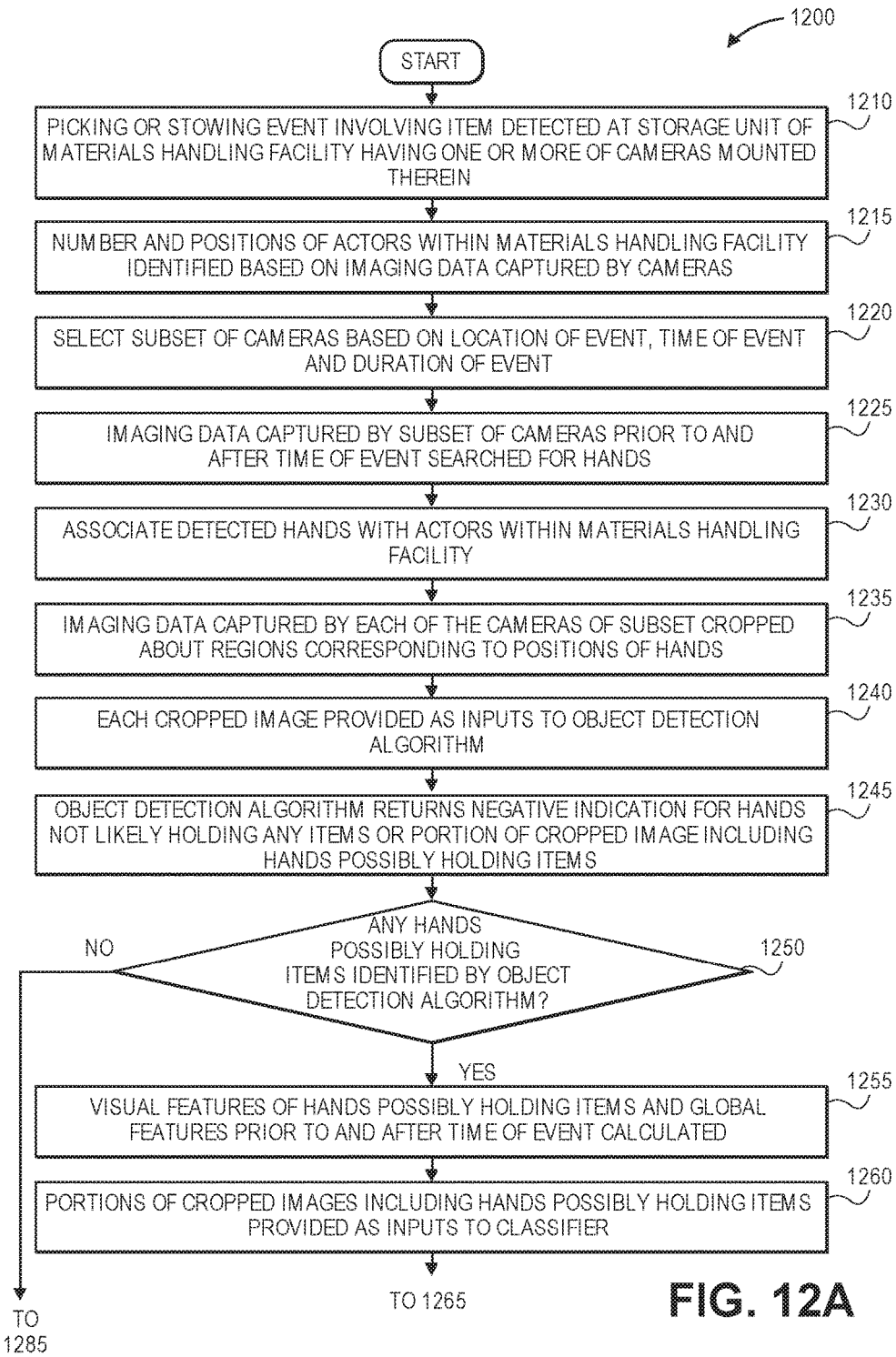
FIGS. 12A and 12B are a flow chart of one process for associating events with actors based on digital imagery in accordance with implementations of the present disclosure.
Figure 12B:
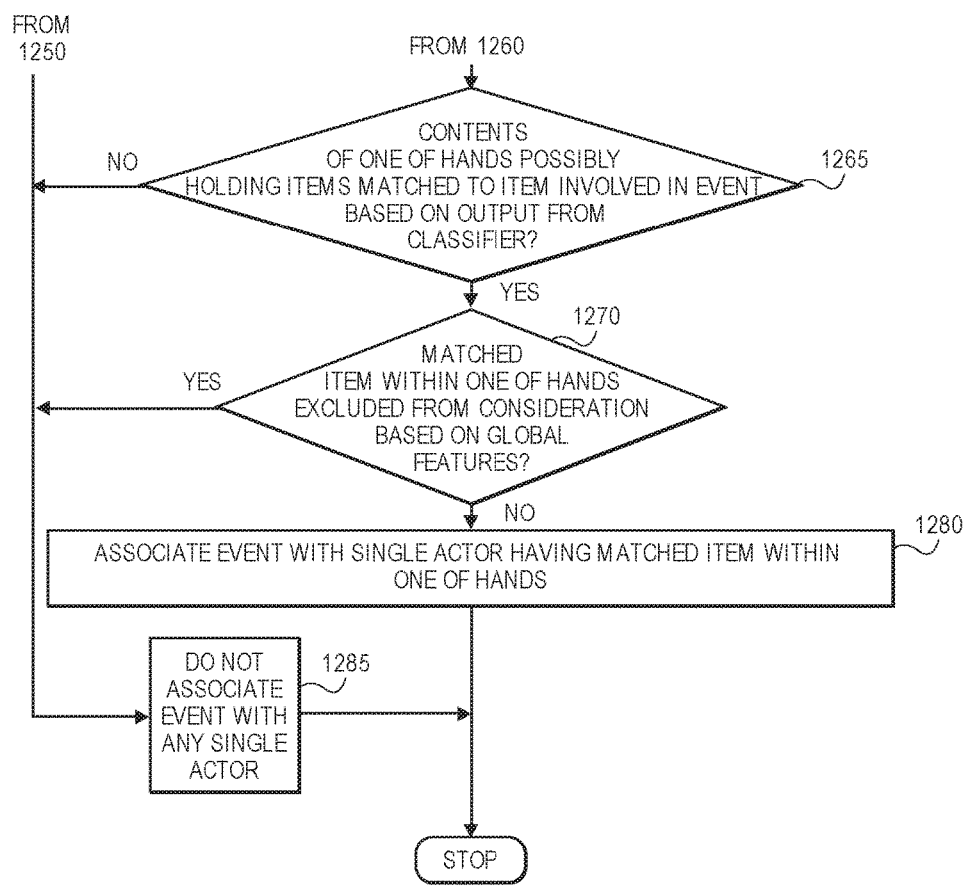

Referring to FIGS. 12A and 12B, a flow chart of one process for associating events with actors based on digital imagery in accordance with implementations of the present disclosure is shown. At box 1210, a picking or stowing event involving an item is detected at a storage unit of a materials handling facility having one or more cameras mounted therein. For example, the event may involve a picking of one of a type of item, a stowing of one of the type of item, or both a picking of one of a type of item and a stowing of another of a type of item, e.g., an item of the same type that was picked, such as the same item, or an item of a different type. The storage unit may be a shelf, a bin, a rack, a tier, a bar, a hook, a cubby or any other form of storage unit or means. The cameras may be mounted in any orientation or configuration with respect to the storage unit, such that fields of view of the cameras overlap at least in part. Additionally, the event may be detected by any number of sensors, components or systems, e.g., load or weight sensors, imaging devices, scanners, readers or the like.

At box 1215, a number and positions of actors within the material handling facility are identified based on imaging data captured by a plurality of cameras. Such actors may be identified based on outlines, faces or other attributes of actors recognized in images captured by any of the cameras within the materials handling facility and recognized as corresponding to one or more actors, or possibly corresponding to one or more actors. Alternatively, a number and/or a position of one or more actors within the materials handling facility may be determined based on information or data gathered by one or more sensors, other than a camera.

In some implementations, whether the event may be associated with a single actor based on the number and positions of the actors may be determined, such as where the materials handling facility includes only one actor at a time of the event, or where only one actor is within a finite range of the event at the time of the event. If the event may be associated with the single actor, then the event is so associated, and the process ends.

At box 1220, a subset of the cameras is selected based on a location of the event, a time of the event and/or a duration of the event. For example, upon detecting the event at box 1210, a location of the event may be determined, and the location of the event may be compared to the orientations and fields of view of one or more cameras in order to identify a diverse and/or robust representative set of the cameras that may have captured images of the event from different perspectives.

At box 1225, imaging data captured by the cameras of the subset prior to, during and after the time of the event are identified and searched for hands (or other body parts) of actors. The imaging data may be searched for one or more body parts according to any method or technique in accordance with the present disclosure. For example, in some implementations, each of the images may be provided to a trained classifier (e.g., a deep neural network, a convolutional neural network, a support vector machine, or any other type or form of classifier) which may then generate score maps identifying portions of each image frame corresponding to detections of each of the hands detected therein, as well as any of a predetermined number of other body parts. Locations of local or absolute peak values within the respective score maps may be determined to correspond to specific body parts and identified as such. Alternatively, detections of body parts within imaging data may be determined based on monocular cues detected therein, based on visual images and depth images, or in any other manner.

At box 1230, the hands detected at box 1225 are associated with actors within the materials handling facility. For example, where a plurality of body parts are identified within the imaging data captured at box 1225, the body parts may be assigned to a common actor and a partial or full skeleton may be defined by establishing nodes corresponding to each of the detected body parts and generating edges between pairs of the nodes. Edges between pairs of body part detections may be assigned a probability that two body part detections of a pair each correspond to the same actor, and each of the edges between such nodes may be contracted probabilistically based on pairwise information regarding the nodes in a pair that are connected by an edge. Positions of body parts that are not visible within two or more synchronized frames may be predicted by generating and extending a field of vectors from a location of a specific body part to locations where other body parts would likely be located if the location of the peak values did, in fact, correspond to a location of the specific body part. The vectors for one body part may be represented with bearings and ranges to another body part, and may, alternatively or additionally, include tolerances for each of the bearings and ranges. The reliability and accuracy of the vectors will vary based on the degrees of separation between the body parts. Once a partial or full skeleton is defined for a set of body parts, the skeleton may be associated with an actor within the materials handling facility on any basis.

Additionally, a partial or full skeleton may be assigned to an identity of an actor, which may be determined on any basis. For example, a number and positions of actors within the material handling facility are identified based on imaging data captured by a plurality of cameras, which may recognize one or more outlines, faces or other attributes of actors (e.g., customers, workers or other humans) in images captured by any of the cameras within the materials handling facility and recognized as corresponding to one or more actors, or possibly corresponding to one or more actors. The cameras by which the number and/or positions of actors are determined need not be located in close proximity to the event, nor have captured images at or near a time of the event. A record of the number of actors within the materials handling facility, or the identities of the actors, may be determined based on images captured by such cameras (e.g., according to one or more other facial recognition and/or other object recognition techniques). Alternatively, a number and/or a position of one or more actors within the materials handling facility may be determined based on information or data gathered by one or more sensors other than a camera, such as scanners, readers or other devices that are configured to identify actors who enter or exit the materials handling facility, e.g., based on information or data provided by an application operating on a mobile device carried by such actors, or in any other manner. Once an actor has been identified as being present within the materials handling facility, by any means, the actor may be associated with a skeleton accordingly.

At box 1235, imaging data captured by each of the cameras of the subset is cropped (or cut, trimmed or otherwise partitioned) about regions corresponding to candidate positions of the hands at the time of the event or, alternatively or additionally, prior to or after the event. For example, the imaging data may be cropped to identify or isolate only the portions of the imaging data where the candidate positions of hands are located, with an additional buffer in one or two dimensions in each of the images. The buffer may be identified as a two-dimensional representation of uncertainty of the positions of the hands, or on any other basis, such as the presence or absence of one or more other actors or occlusions, the lighting conditions within the materials handling facility, or any other factors.

At box 1240, each of the cropped images is provided as inputs to an object detection algorithm. For example, each of the cropped images may be processed according to one or more algorithms that interpret any information regarding the motion of the respective actors at the time of the event, or prior to or after the event, as well as differences in gradients in the respective images, to identify portions of the cropped images that include hands and to determine the contents of such hands. Alternatively, the cropped images may be analyzed according to any other method or technique.

At box 1245, the object detection algorithm returns a negative indication for each of the hands that is determined to be not likely holding any items, or a positive indication for each of the hands that is determined to be possibly holding the item involved in the event. For example, outputs from an object detection algorithm may indicate whether the hand does not likely hold any items, or whether the hand is at least partially filled (e.g., likely holds one or more objects). In some implementations, a classifier such as a neural network may be trained to determine where an object is located within a hand. For example, in some implementations, the neural network may be an end-to-end deep convolutional network, such as a network based on a regional convolutional neural network, or a fast regional convolutional neural network. Such networks may include any number of layers, such as fifteen or more convolutional layers, and, optionally, a softmax output layer. Outputs from such a classifier may include, for example, a confidence score (e.g., a probability measure that the hand includes an object) and a bounding box or other representation of a location within an image (e.g., a collection of points where the object might be located). For example, the classifier may be trained with a training set including several cropped images having boxes or other descriptors defining locations of hands with products therein within the cropped images. The classifier may be trained to locate the objects within the hands based on such inputs, and to return outputs defining boxes or other descriptors indicative of locations of objects within such hands. Therefore, a positive indication that a hand is likely holds one or more objects may take the form of a portion of a cropped image of the hand that includes the one or more objects therein.

At box 1250, whether any hands possibly holding the item involved in the event are identified by the object detection algorithm is determined. If each of the hands is identified as not possibly holding the item involved in the event, i.e., if none of the hands is identified as holding any objects therein, then the process advances to box 1285, where the event is not associated with any single actor, and the process ends. If one or more hands are identified as possibly holding the item involved in the event is identified at box 1250, however, then the process advances to box 1255, where global features and visual features of the hands that are identified as possibly holding the event prior to, during and after the time of the event are calculated. For example, as is discussed above, such features may relate to any aspect of the position, the location and/or the orientation of actors having the respective hands that are identified as possibly holding the item involved in the event. In some implementations, the global features may include any values or variables regarding a status of the materials handling facility at a time of an event, such as measures of a level of confidence in a determination of a location of an event, which may be defined by levels of accuracy or precision of the components (e.g., load sensors, imaging devices) or methods by which the location was determined; measures of a density of tracklets or trajectories of one or more of the hands at the materials handling facility, such as a level of confidence or accuracy in a match between a hand and a tracklet, or any other factors. In some implementations, the visual features may relate to any aspect of the motion, the location and/or the orientation of the respective hands prior to, during or after the time $t_0$ of the event, or any other features regarding the respective actors at the materials handling facility. The types of visual features that may be determined regarding the motion, the location and/or the orientation of an actor on a scene, or used to determine which, if any, of the actors is carrying an item, or to identify an item carried by such actors, are not limited.

At box 1260, the portions of the cropped images that include objects and the visual features of the hands that are identified as possibly holding the item involved in the event are provided as inputs to a classifier, e.g., a deep learning object recognition algorithm. The classifier may be trained to recognize one or more objects within images provided thereto as inputs, and to return an identifier of an object to which such images correspond as an output. For example, the classifier may be trained by providing a training set including a plurality of images of items that are or may be present within the materials handling facility to the classifier as training inputs, and a candidate set of product identifiers to the classifier as training outputs. The images may be captured from a plurality of perspectives, e.g., within an imaging studio or other location having a plurality of cameras configured about a position where an item may be placed within fields of view of two or more of the cameras.

The images may be captured from various angles and subject to different lighting conditions or other environmental factors, in order to ensure that the classifier is trained to distinguish and recognize products among textures or patterns of clothing worn by actors; arms, hands or other body parts of the actors; shelves, floors, ceilings, walls or other aspects of a materials handling facility; other products; blurring or other distortions; variations in exposure; or variations in color. In some implementations, one or more cropped images of contents of hands that are determined to be possibly holding the item involved in the event may be excluded from consideration based on any number of factors.

At box 1265, whether the contents of one of the hands identified as possibly holding the item involved in the event is matched to the item involved in the event is determined based on an output from the classifier to which the cropped images and the features were provided at box 1260. As is discussed above, where a type of the item involved in the event is known, the classifier may determine whether an item appearing in an image of a hand is one of the type of item involved in the event, or is not one of the type of item involved in the event. For example, where an actor enters a materials handling facility while carrying a mobile device (e.g., a smartphone or tablet computer) or another object that is not available for purchase, rent, lease or borrowing within the materials handling facility, an image of the actor's hand may identify an object as being present within the hand of the actor, but that object may be identified as not associated with an event. If the contents of a hand are not matched to the type of item involved in the event, then the process advances to box 1285, where the event is not associated with any single actor, and the process ends.

At box 1270, whether the item involved in the event may be excluded from consideration based on one or more global features is determined. For example, where an event involves a retrieval of an item of a given type from a location within a materials handling facility, one or more of the hands that possibly holds an item of the given type may be excluded from consideration if the hand included an item of the type involved in the event prior to the time of the event, thereby implying that an actor having the hand came into possession of the one of the type of item prior to the time of the event, and was, therefore, not associated with the event. Similarly, where a hand was located at a sufficiently great distance from a location of an event at a time of the event, e.g., where the hand is located farther than a wingspan or reach of an average human at the time of the event, there is no need to evaluate the contents of the hand, or to determine whether the hand was associated with the event, even if the hand holds an item of a type that was involved in the event. If the item may be excluded from consideration based on the global features, then the process advances to box 1285, where the event is not associated with any single actor, and the process ends.

If the item corresponds to the item associated with the event as detected at box 1210, and is not excluded from consideration based on global features, then the process advances to box 1280, where the event is associated with the single actor having a hand with contents matched to an item of the type involved in the event, as identified at box 1265, and the process ends.

Those of ordinary skill in the pertinent arts will recognize that one or more of the steps or features of the process shown in the flow chart 1200 of FIGS. 12A and 12B may be executed for each of the hands that are identified in the imaging data captured by the subset of the cameras at box 1225, or associated with actors within the materials handling facility at box 1230.

Figure 13A:
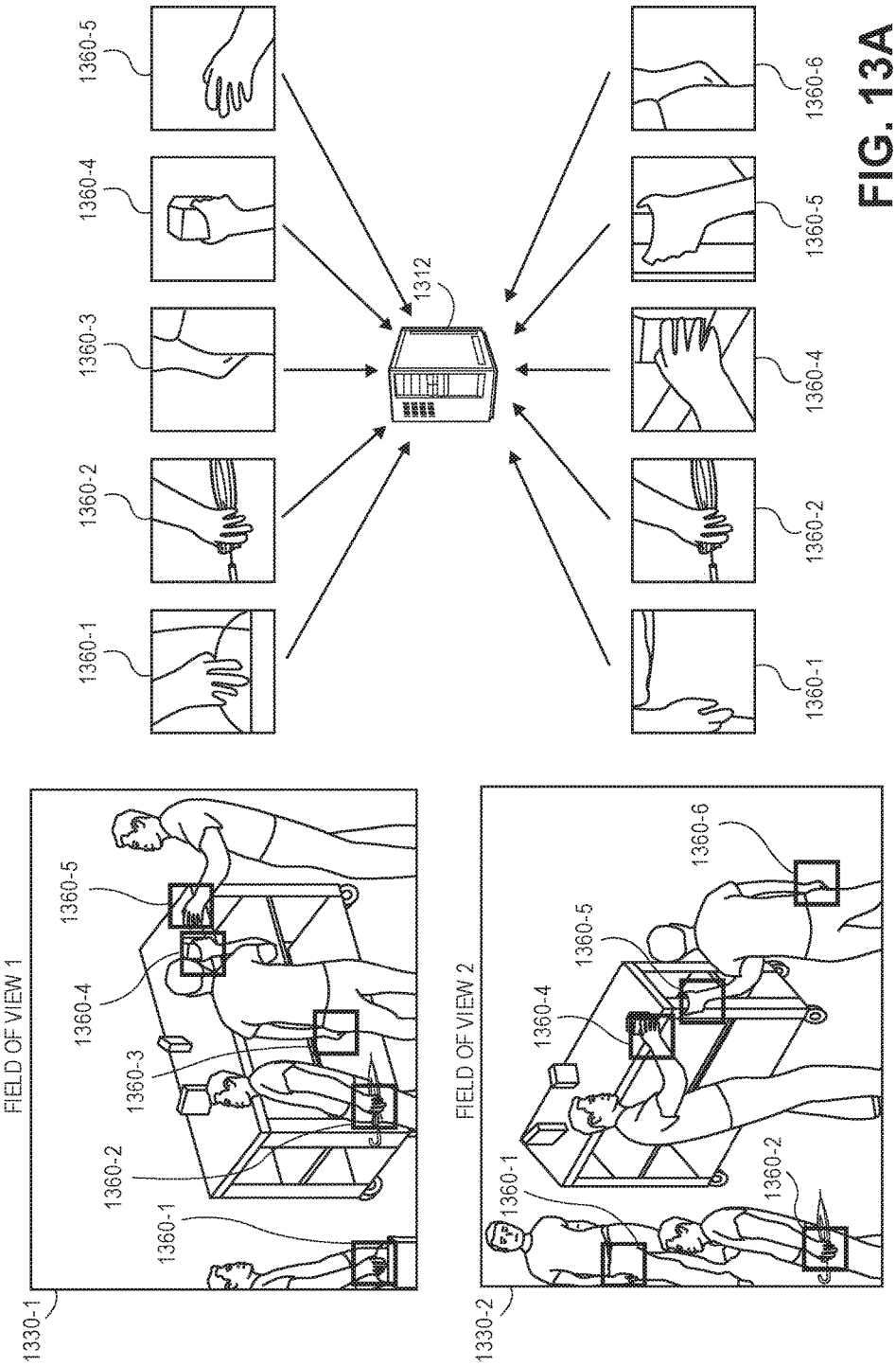
Figure 13B:
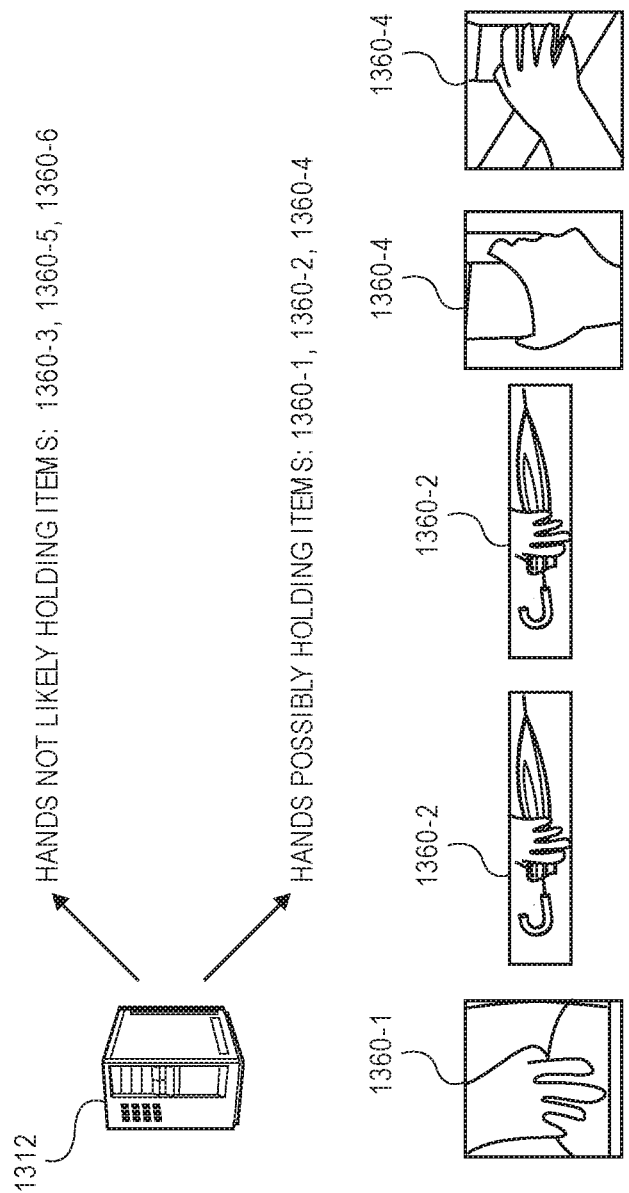

Referring to FIGS. 13A through 13C, a view of aspects of one system for associating events with actors based on digital imagery in accordance with implementations of the present disclosure is shown. Except where otherwise noted, reference numerals preceded by the number "13" shown in FIGS. 13A through 13C indicate components or features that are similar to components or features having reference numerals preceded by the number "11" shown in FIGS. 11A and 11B, by the number "10" shown in FIGS. 10A and 10B, by the number "9" shown in FIGS. 9A through 9C, by the number "8" shown in FIGS. 8A through 8C, by the number "7" shown in FIGS. 7A through 7D, by the number "6" shown in FIGS. 6A through 6C, by the number "5" shown in FIG. 5A, 5B or 5C, by the number "4" shown in FIG. 4A or 4B, by the number "2" shown in FIG. 2A or 2B, or by the number "1" shown in FIGS. 1A through 1N.

As is shown in FIG. 13A, a pair of images 1330-1, 1330-2 captured from different fields of view at a time of an event may be cropped (or cut, trimmed or partitioned) or otherwise processed by a server 1312 to identify portions of such images that depict hands. For example, the image 1330-1 captured from a first field of view at a time of an event is processed to identify portions of the image 1330-1 that includes the hands 1360-1, 1360-2, 1360-3, 1360-4, 1360-5 of the various actors shown in the image 1330-1. Likewise, the image 1330-2 captured from a second field of view at the time of the event is processed to identify portions of the image 1330-2 that includes the hands 1360-1, 1360-2, 1360-4, 1360-5, 1360-6. The images 1330-1, 1330-2 may be processed and cropped (or cut, trimmed or otherwise partitioned) on any basis and according to any technique. For example, each of the images 1330-1, 1330-2 may be independently provided to a classifier that is trained to detect body parts in general, or hands in particular, and the images 1330-1, 1330-2 may be cropped after positions of the hands depicted therein have been detected. Alternatively, where one or more skeletons or other articulated models have already been generated based on one or both of the images 1330-1, 1330-2, or on any other basis, positions of hands depicted therein may be determined based on such skeletons.

As is shown in FIG. 13B, the cropped images may be provided to an object detection algorithm (or other classifier, algorithm or technique) operating on the server 1312, which may determine that the hands 1360-3, 1360-5, 1360-6 likely hold one or more items, and that the hands 1360-1, 1360-2, 1360-4 are likely holding one or more items. For example, the server 1312 may return a negative indication for each of the images of the hands 1360-3, 1360-5, 1360-6, and a positive indication for each of the hands 1360-1, 1360-2, 1360-4. In some implementations, the positive indication returned by the server 132 as an output of the object detection algorithm may include a further cropped portions of the images 1330-1, 1330-2 that feature the hands that are determined to likely hold one or more items.

Figure 14:
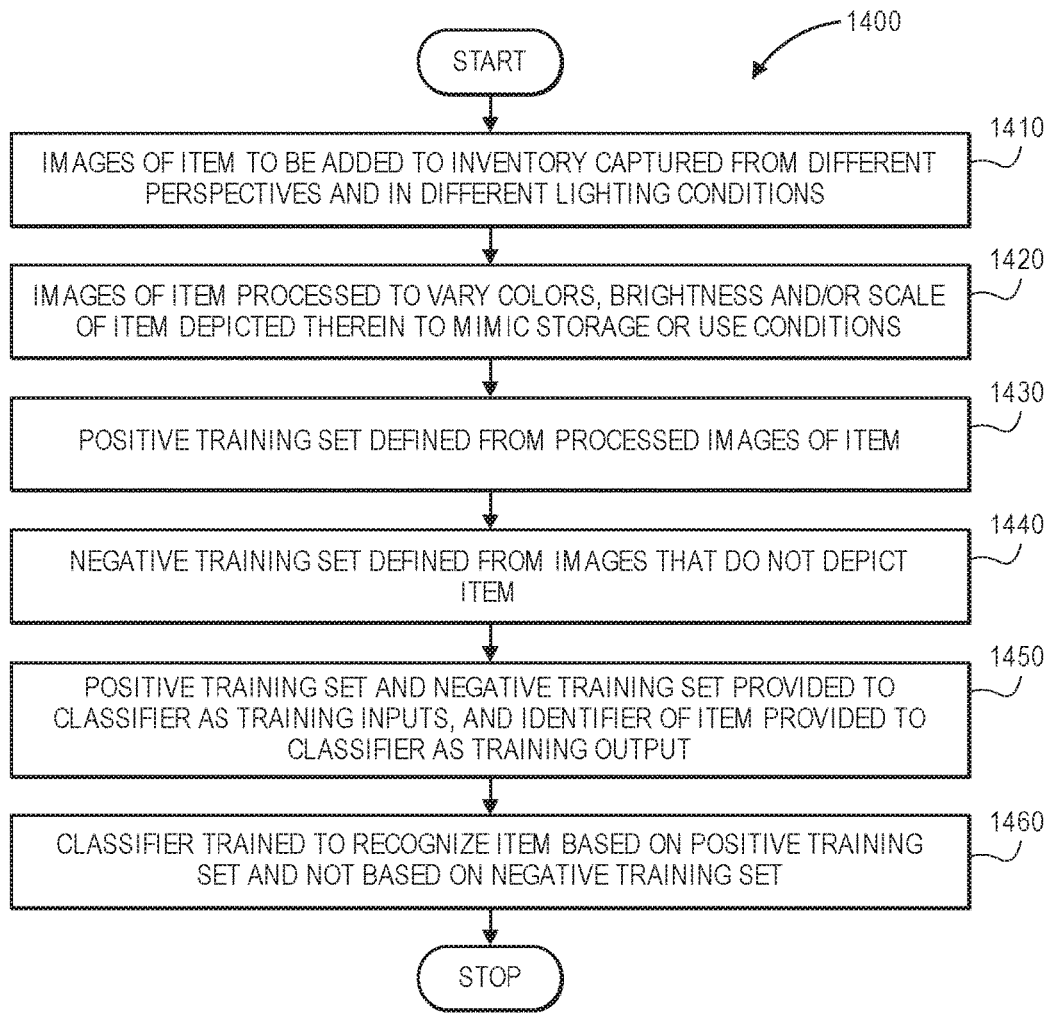
FIG. 14 is a flow chart of one process for associating events with actors based on digital imagery in accordance with implementations of the present disclosure.

As is shown in FIG. 13C, the further cropped images of the hands 1360-1, 1360-2, 1360-4 may be provided as inputs to a classifier that is trained to determine whether an image that occurred at a location depicts a specific item, or one item of a specific type. For example, where an event involving an item is detected, the item or a type of the item may be identified, e.g., based on a change in loading on a load sensor, or on any other basis. An image captured from the location at a time of the even, or after the event, may be provided to a classifier that has been trained with a set of images of each of a plurality of items, or images of items of a plurality of types, e.g., with the images of the items being colored, randomly cropped, or adjusted for brightness or scale in order to mimic conditions within the materials handling facility, and also with a set of images that do not depict the item, or an item of the same type. As a result, the classifier may be trained to return an indication that the one or more images depict the item involved in an event, e.g., an item of the specific type, to a sufficient degree of accuracy, or do not depict the item, or an item of the specific type, that was involved in the event.

Where a materials handling facility includes, or might include, a plurality of items of a variety of types, images of the items in various conditions may be captured and processed in order to mimic the conditions that may exist within the materials handling facility when one or more events may occur. The images may then be used to train a classifier that an image identified within a hand of one of the actors is an item of a type involved in an event. Referring to FIG. 14, a flow chart 1400 of one process for associating events with actors based on digital imagery in accordance with implementations of the present disclosure is shown. At box 1410, images of an item that is to be added to inventory are captured from different perspectives and in different lighting conditions. For example, the item may be placed on a podium, a pedestal or other surface and subjected to imaging by one or more cameras.

At box 1420, the images captured of the item may be processed to vary the colors, brightness and/or scale of the item depicted therein, in order to mimic conditions of storage and/or use within a materials handling facility. The images may be cropped, brightened, rotated, resized, smoothed or otherwise processed to simulate various effects that may be observed in a variety of conditions within a materials handling facility. For example, because an actor's hands may conceal one or more portions of an item from view, an image of an item may be copied, cropped, adjusted or otherwise altered to simulate the item being held at various locations within a hand of a user. At box 1430, a positive training set is defined from the processed images of the item.

At box 1440, a negative training set is defined from images that do not depict the item. For example, the negative training set may include images of items that are not available at the materials handling facility, images of features of the materials handling facility that are preferably distinguished from items that are available at the materials handling facility, or any other arbitrary images that do not depict the item.

At box 1450 the positive training set and the negative training set are provided to a classifier as training inputs, and an identifier of the item (e.g., an identifier of a type of the item) is provided to the classifier as a training output. At box 1460, the classifier is trained to recognize the item (viz., the identifier of the item, or a type of the item) based on the positive training set, and not based on the negative training set, and the process ends. For example, a classifier or other statistical algorithm may be trained to recognize associations between images and the identifier of the item, such as by providing the training sets to the classifier as inputs and the identifier as a training output, either in series or in parallel. Additionally, the classifier's capacity to recognize such associations may be validated by providing a second group or set of images that depict the item and images that do not depict the item (e.g., a test set) to the classifier, and determining the accuracy with which the classifier identifies the images as associated with the identifier of the item. After the classifier has been trained to recognize associations between images and the identifier of the item, a plurality of the items may be placed into inventory.

Figure 15:
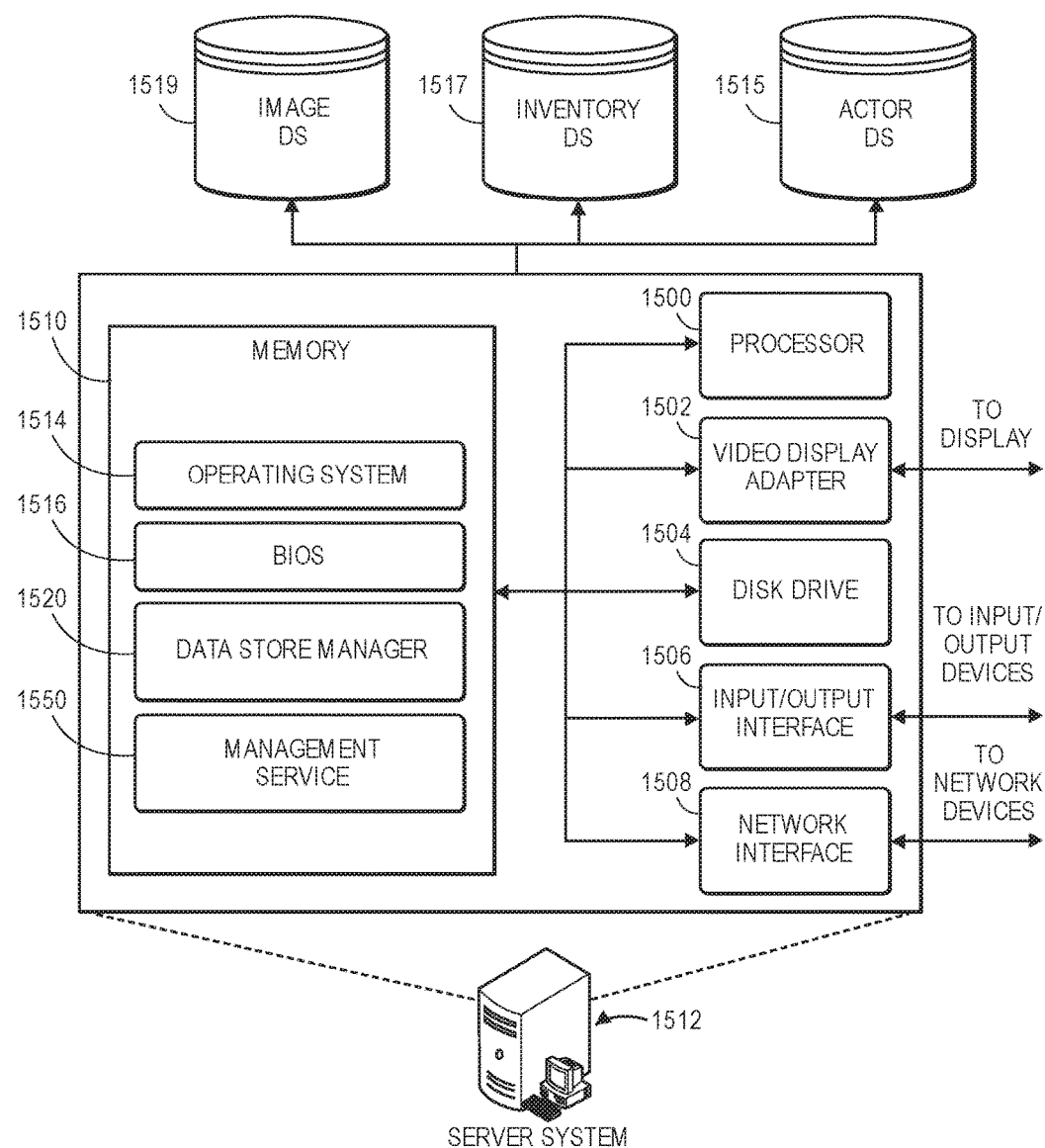
FIG. 15 is a block diagram of components of one system for associating events with actors based on digital imagery in accordance with implementations of the present disclosure.

Referring to FIG. 15, a block diagram of components of one system 1512 for associating events with actors based on digital imagery in accordance with implementations of the present disclosure is shown. The system 1512 is a server or other computer device configured for executing one or more of the functions or applications described herein, e.g., the server 112 shown in FIGS. 1K through 1N, the server 212 shown in FIG. 2A, the server 612 shown in FIG. 6A, the server 1112 shown in FIGS. 11A and 11B, the server 1312 shown in FIGS. 13A and 13B, or any of the other servers or other computer devices shown or described herein.

The server system 1512 may include a processor 1500, such as one or more redundant processors, a video display adapter 1502, a disk drive 1504, an input/output interface 1506, a network interface 1508, and a memory 1510. The processor 1500, the video display adapter 1502, the disk drive 1504, the input/output interface 1506, the network interface 1508, and the memory 1510 may be communicatively coupled to each other by a communication bus.

The video display adapter 1502 provides display signals to a local display permitting an operator of the server system 1512 to monitor and configure operation of the server system 1512. The input/output interface 1506 likewise communicates with external input/output devices, such as a mouse, keyboard, scanner, or other input and output devices that can be operated by an operator of the server system 1512. The network interface 1508 includes hardware, software, or any combination thereof, to communicate with other computing devices. For example, the network interface 1508 may be configured to provide communications between the server system 1512 and other computing devices via a network, such as the network shown in FIG. 15.

The memory 1510 generally comprises random access memory (RAM), read-only memory (ROM), flash memory, and/or other volatile or permanent memory. The memory 1510 is shown storing an operating system 1514 for controlling the operation of the server system 1512. A binary input/output system (BIOS) 1516 for controlling the low-level operation of the server system 1512 is also stored in the memory 1510.

The memory 1510 additionally stores program code and data for providing network services. The data store manager application 1520 facilitates data exchange between an actor data store 1515, an inventory data store 1517, and/or an image data store 1519. The actor data store 1515 may include any information or data regarding one or more actors within a materials handling facility, including but not limited to identities, images or avatars, prior browsing or purchasing histories, known or predicted personal preferences, family members, billing and/or shipping addresses, payment instrument information (e.g., credit card data), or the like. The inventory data store 1517 may include any type or form of information regarding inventory maintained at a materials handling facility, including numbers, types, categories, prices or sizes of items or types of items, locations at which such items or types are stored within the materials handling facility, points of origin for the items or types, or the like. The image data store 1519 may include any number of images of items or types of items that are maintained in inventory at the materials handling facility, including images that are cropped or otherwise adjusted, or varied in brightness or scale, as well as images of objects that are not maintained at the materials handling facility.

As used herein, the term "data store" may refer to any device or combination of devices capable of storing, accessing and retrieving data which may include any combination and number of data servers, databases, data storage devices and data storage media in any standard, distributed or clustered environment. The server system 1512 can include any appropriate hardware and software for integrating with the actor data store 1515, the inventory data store 1517 and/or the image data store 1519, as needed to execute one or more functions or aspects of the present disclosure.

The data stores 1515, 1517, and 1519 can include several separate data tables, databases or other data storage mechanisms and media for storing data relating to a particular aspect. For example, the data stores 1515, 1517, and 1519 illustrated include mechanisms for maintaining actor information, inventory information (e.g., locations of items of a given type, images of items when properly positioned, depth map information for an item located on an inventory shelf, item features), image information, and the like.

It should be understood that there can be many other aspects that may be stored in the data stores 1515, 1517, and 1519. The data stores 1515, 1517, and 1519 are operable, through logic associated therewith, to receive instructions from the server system 1512 and obtain, update or otherwise process data in response thereto.

It will be appreciated by those of ordinary skill in the art that any number of servers or other computer systems could operate equally well with fewer components than are shown in FIG. 15, or a greater number of components than are shown in FIG. 15. Thus, the block diagram shown in FIG. 15 should be taken as being illustrative in nature and not limiting to the scope of the disclosure.

Although some of the implementations disclosed herein reference the detection and tracking of body parts of human actors with respect to locations of events or items associated with such events, the systems and methods of the present disclosure are not so limited. For example, the systems and methods disclosed herein may be used to detect and track body parts of any non-human animals, as well as candidate parts of any number of machines or robots, and associating such non-human animals, machines or robots with events or items of one or more types. The systems and methods disclosed herein are not limited to detecting and tracking humans, or to associating humans with events or items of one or more types. Furthermore, although some of the implementations disclosed herein reference detecting and tracking interactions with specific items or items of a specific type in a commercial setting, e.g., within a materials handling facility such as a fulfillment center, the systems and methods of the present disclosure are likewise not so limited. Rather, the systems and methods disclosed herein may be utilized to detect and track actors within any type of commercial or non-commercial settings, such as the live filming of performances in a stadium or theater, where one or more of the implementations disclosed herein may be used to determine whether an athlete's poses or gestures are associated with a foul ball, a slam dunk, a completed pass, or any other event associated with one or more sports or other activities.

For example, although some of the implementations disclosed herein describe events involving the retrieval (e.g., picking) of items of one or more types from a storage unit or other location at a materials handling facility, the systems and methods disclosed herein are not so limited, and may be utilized to associate events involving the depositing (e.g., stowing) of items of one or more types at a storage unit or other location in accordance with the present disclosure. For example, where an event is identified as having occurred at a location, imaging data captured by one or more cameras prior to, during and after the event may be identified and processed to recognize information or data regarding actors at or near the location at a time of the event, and skeletons or other articulated models of such actors may be generated based on such imaging data. Trajectories or tracklets of such skeletons, or images of the hands of such actors, captured prior to, during and after the event may be evaluated to determine which of such actors may have deposited an item of a given type at the location, in a manner that is similar but reciprocal to one or more of the processes discussed above.

Additionally, although some of the implementations described herein refer to the detection and tracking of body parts such as joints, the terms "body part" and "joint" may be deemed interchangeable as used herein. For example, although some of the implementations refer to heads or other body parts that are not commonly referred to as "joints," the systems and methods for recognizing, detecting and tracking "joints" may be equally applicable to the recognition, detection and tracking of heads, or any other body parts. Moreover, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3, 12A and 12B, and 14, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
    detecting, by at least one load sensor provided in association with a storage unit at a materials handling facility, an event based on a change in loading at a location on the storage unit at a time;
    identifying an item associated with the event based on the change in loading, wherein the item is one of a type;
    identifying a plurality of images captured by a digital camera including the location within a field of view, wherein each of the plurality of images was captured prior to the time of the event, at the time of the event, or following the time of event;
    detecting a first plurality of body parts corresponding to a first actor at the materials handling facility, wherein each of the first plurality of body parts is represented within at least one of the plurality of images, and wherein the first plurality of body parts includes a first hand of the first actor;
    detecting a second plurality of body parts corresponding to a second actor at the materials handling facility, wherein each of the second plurality of body parts is represented within at least one of the plurality of images, and wherein the second plurality of body parts includes a second hand of the second actor;
    determining a first trajectory of motion of at least the first hand prior to the time of the event, at the time of the event or after the time of the event;
    determining a second trajectory of motion of at least the second hand prior to the time of the event, at the time of the event or after the time of the event;
    determining at least a first feature for at least the first hand based at least in part on the location of the event, the time of the event and the first trajectory, wherein the first feature relates to at least one of the motion of the first hand or a position of the first hand prior to the time of the event, at the time of the event or after the time of the event;
    determining at least a second feature for at least the second hand based at least in part on the location of the event, the time of the event and the second trajectory, wherein the second feature relates to at least one of the motion of the second hand or a position of the second hand prior to the time of the event, at the time of the event or after the time of the event; and
    determining that the first actor is associated with the event based at least in part on the first feature, the second feature, the first trajectory and the second trajectory.

2. The method of claim 1, further comprising:
    detecting pluralities of body parts represented within at least one of the plurality of images, wherein each of the pluralities of body parts corresponds to one of a plurality of actors at the materials handling facility, wherein each of the pluralities of body parts includes at least one hand of one of the plurality of actors, and wherein the pluralities of body parts include the first plurality of body parts and the second plurality of body parts;
    determining trajectories of motion of at least some of the hands prior to the time of the event, at the time of the event or after the time of the event, wherein the trajectories comprise the first trajectory and the second trajectory; and
    determining features for the hands based at least in part on the location of the event, the time of the event and the trajectories, wherein each of the features relates to at least one of motion of a hand or a location of a hand prior to the time of the event, at the time of the event or after the time of the event, and wherein the features comprise the first feature and the second feature,
    wherein determining that the first actor is associated with the event comprises:

calculating a score for each of the plurality of actors based at least in part on the features, wherein each of the scores indicates a probability that one of the plurality of actors is associated with the event;

ranking the actors based at least in part on the scores;

determining that a first score calculated for the first actor ranks first;

determining that a second score calculated for the second actor ranks second;

calculating at least a third feature for the materials handling facility, wherein the third feature is associated with at least one of a measure of confidence in the location or a density of actors within a vicinity of the location at the time of the event; and determining, based at least in part on the first feature, the second feature and the third feature, that the first actor is associated with the event.

3. The method of claim 1, wherein the first feature is at least one of:

an identity of the first actor;

an orientation of a first neck of the first actor at the time of the event with respect to a first head of the first actor at the time of the first event;

an orientation of the first hand at the time of the event with respect to an elbow of the first actor at the time of the first event;

a distance between a first shoulder of the first actor and the first hand at the time of the first event;

a measure of confidence in an association between the first head of the first actor and a first hand of the first actor;

a measure of confidence in a position of the first hand of the first actor at the time of the first event; or a velocity of the first hand of the first actor at the time of the first event.

4. A method comprising:

identifying a first plurality of images, wherein each of the first plurality of images was captured prior to a time of an event, at the time of the event or after the time of the event;

determining, using at least one of the first plurality of images, a first position of a first body part of a first actor and a first position of a second body part of the first actor, wherein the first actor is represented within the at least one of the first plurality of images;

determining, using the at least one of the first plurality of images, a first position of a first body part of a second actor and a first position of a second body part of the second actor, wherein the second actor is represented within the at least one of the first plurality of images;

generating a first record corresponding to the first actor based at least in part on the first position of the first body part of the first actor and the first position of the second body part of the first actor, wherein the first record comprises a first trajectory of the first body part of the first actor and a second trajectory corresponding to the second body part of the first actor;

generating a second record corresponding to the second actor based at least in part on the first position of the first body part of the second actor and the second position of the second body part of the second actor, wherein the second record comprises a first trajectory of the first body part of the second actor and a second trajectory of the second body part of the second actor;

determining at least a first feature for the first actor based at least in part on the at least one of the first plurality of images, wherein the first feature is a measure of at least one of a position, motion or an orientation of at least the first body part of the first actor prior to the time of the event, at the time of the event or after the time of the event;

determining at least a second feature for the second actor based at least in part on the at least one of the first plurality of images, wherein the second feature is a measure of at least one of a position, motion or an orientation of at least the first body part of the second actor prior to the time of the event, at the time of the event or after the time of the event;

calculating, based at least in part on at least one of the first record or the first feature, a first score indicative of a probability that the first actor is associated with the event;

calculating, based at least in part on at least one of the second record or the second feature, a second score indicative of a probability that the second actor is associated with the event, wherein the first score is greater than the second score; and determining, based at least in part on at least one of the first score or the second score, that the first actor is associated with the event.

5. The method of claim 4, wherein calculating the first score comprises:

providing first inputs to at least a first classifier, wherein the first inputs comprise the first record and the first feature, and wherein the first classifier is a linear support vector machine trained to determine a probability that an actor is associated with an event based at least in part on a trajectory of a body part and at least one measure of at least one of a position, motion or an orientation of the body part; and receiving at least a first output from the first classifier in response to the first inputs, wherein the first score is the first output.

6. The method of claim 4, wherein determining at least the first feature for the first actor comprises at least one of:

determining an identity of the first actor;

determining an orientation of a first edge extending between the first position of the first body part of the first actor and the second position of the second body part of the first actor at a time of the event;

determining a distance between the first position of the first body part of the first actor and the second position of the second body part of the first actor at the time of the event;

calculating a measure of confidence in an association between the first body part of the first actor and the second body part of the first actor;

calculating a measure of confidence in a position of the first node of the first record at the time of the event; and determining a velocity of the first body part of the first actor at the time of the event.

7. The method of claim 4, further comprising:

determining, using the at least one of the first plurality of images, positions of body parts of at least a subset of a plurality of actors, wherein each of the subset of the plurality of actors is represented within the at least one of the first plurality of images, and wherein the subset of the plurality of actors includes the first actor and the second actor;

generating a plurality of records, wherein each of the records corresponds to one of the subset of the plurality of actors, and wherein each of the records is generated based at least in part on at least one position of at least one body part of the one of the subset of the plurality of actors, and wherein each of the records comprises a trajectory of the at least one body part of the one of the subset of the plurality of actors;

determining at least one feature for each of the subset of the plurality of actors based at least in part on the at least one of the first plurality of images, wherein the at least one feature is a measure of at least one of a position, motion or an orientation of one of the subset of the plurality of actors during the period of time; and calculating a plurality of scores, wherein each of the scores is indicative of a probability that one of the subset of the plurality of actors is associated with the event, and wherein each of the scores is calculated based at least in part on at least one of the record corresponding to the one of the subset of the plurality of actors and the at least one feature for the one of the subset of the plurality of actors.

8. The method of claim 7, wherein determining that the first actor is associated with the event comprises:

determining a ranking of the subset of the plurality of actors based at least in part on the plurality of scores; and determining that the first actor is first in the ranking.

9. The method of claim 8, further comprising:

determining that the second actor is second in the ranking;

determining a third feature associated with a location of the event, wherein the third feature is at least one of a measure of confidence in the location of the event or a density of actors within a vicinity of the location of the event at the time of the event;

providing first inputs to a first classifier, wherein the first inputs comprise the first record, the first feature, the second record, the second feature and the third feature, wherein the first classifier is a support vector machine trained to determine at least one of:

a first probability that the first actor is associated with the event; or a second probability that the first actor is not associated with the event;

receiving a first output from the first classifier; and determining, based at least in part on the first output, that the first actor is associated with the event.

10. The method of claim 7, wherein the first feature is a first distance between the first body part of the first actor and the location of the event, wherein the second feature is a second distance between the first body part of the second actor and the location of the event, and wherein the at least one feature for each of the subset of the plurality of actors is a distance between the first node of one of the records and the location of the event.

11. The method of claim 4, further comprising:

providing at least a first image to a first classifier as a first input, wherein the first classifier is trained to detect at least one body part represented within an image, and wherein the first image is one of the first plurality of images; and receiving a first output from the first classifier, wherein the first output comprises at least one score map representing probabilities that one or more pixels of the first image represents one body part type of a plurality of body part types, and wherein the first body part of the first actor and the first body part of the second actor are of the body part type.

12. The method of claim 11, wherein the first classifier is one or more of a deep neural network, a convolutional neural network, or a support vector machine.

13. The method of claim 4, wherein each of the first plurality of images was captured by a first imaging device that includes a location of the event within a first field of view at the time of the event, and wherein the method further comprises:

identifying a second plurality of images, wherein each of the second plurality of images captured by a second imaging device prior to the time of the event, at the time of the event or after the time of the event, wherein the second imaging device includes the location of the event within a second field of view at the time of the event, and wherein the second field of view overlaps the first field of view at least in part;

determining, using at least one of the second plurality of images, a second position of the first body part of the first actor and a second position of the second body part of the first actor, wherein the first actor is represented within the at least one of the second plurality of images;

determining, using the at least one of the second plurality of images, a second position of the first body part of the second actor and a second position of the second body part of the second actor, wherein the second actor is represented within the at least one of the second plurality of images, wherein the first record is generated based at least in part on the second position of the first body part of the first actor and the second position of the second body part of the first actor, and wherein the second record is generated based at least in part on the second position of the first body part of the second actor and the second position of the second body part of the second actor.

14. The method of claim 4, wherein a location of the event is a portion of a materials handling facility having a plurality of imaging devices, wherein at least some of the plurality of imaging devices include the location of the event within a field of view at the time of the event, and wherein the method further comprises:

selecting the first imaging device based at least in part on a first axis of orientation of the first imaging device, wherein the first imaging device is one of the at least some of the plurality of imaging devices.

15. The method of claim 4, wherein the first body part of the first actor is a first hand of the first actor, and wherein the method further comprises:

determining, by the at least one computer processor, a first level of confidence in at least the first position of the first body part; and calculating, by the at least one computer processor, a virtual surface about the first position of the first hand, wherein the virtual surface comprises a plurality of points in three-dimensional space defined with respect to the first position of the first hand of the first actor and at least one axis, and wherein the virtual surface is defined based at least in part on the first level of confidence in at least the first position of the first body part.

16. The method of claim 15, wherein the first feature is a minimum distance between the location and at least one point of the virtual surface.

17. The method of claim 4, further comprising determining that an event involving an item has occurred at a location and at a time based at least in part on information captured by at least one sensor, wherein the information captured by the at least one sensor comprises at least one of:

a load signal generated by the at least one sensor in response to a change in load on at least one storage unit at the time of the event;

at least one image captured by the at least one sensor at approximately the time of the event;

an RFID signal received by the at least one sensor at approximately the time of the event; or a light signal received by the at least one sensor at approximately the time of the event.

18. The method of claim 4, wherein the first body part of the first actor is a first hand, and wherein determining that the first actor is associated with the event comprises:

determining that at least a portion of at least a first image depicts the first hand of the first actor based at least in part on the first record, wherein the first image is one of the first plurality of images;

generating a second image based at least in part on the first image, wherein the second image comprises at least the portion of the first image depicting the first hand;

determining that at least a portion of the second image depicts at least a portion of an object within the first hand;

providing at least a portion of the second image to a classifier as a first input, determining that at least the portion of the second image depicts at least a portion of an object within the first hand;

in response to determining that at least the portion of the second image depicts at least the portion of the object within the first hand, generating a third image based at least in part on the second image, wherein the third image comprises at least the portion of the second image depicting the object;

calculating a third feature for at least the first hand based at least in part on the location of the event, the time of the event and the first trajectory, wherein the third feature relates to at least one of the motion of the first hand or a location of the first hand during at least the first predetermined period of time, the time of the event or the second predetermined period of time;

providing at least a portion of the third image and the third feature to a classifier as inputs, wherein the classifier is trained to identify an object represented within an image;

receiving an output from the classifier;

identifying the object within the first hand of the first actor based at least in part on the output; and determining that the object is the item, wherein that the first actor is associated with the event is determined in response to determining that the object is the item.

19. A system comprising:

a plurality of digital cameras; and at least one processor in communication with each of the digital cameras, wherein the at least one processor is configured to at least:

determine that an event has occurred at a location and at a time, wherein the event involves at least one item of a type, and wherein each of the digital cameras has the location within a field of view;

identify a first plurality of images captured by a first digital camera prior to and after the time of the event, wherein the first digital camera is one of the plurality of digital cameras, and wherein the first digital camera includes the location within a first field of view;

provide at least some of the first plurality of images as inputs to a first classifier, wherein the first classifier is trained to recognize a plurality of body parts in an image;

receive outputs from the first classifier, wherein the outputs comprise portions of the at least some of the first plurality of images depicting one of more body parts;

generate a skeleton of an actor based at least in part on the first outputs, wherein the skeleton comprises a plurality of nodes corresponding to at least some of the portions of the at least some of the first plurality of images;

determine a trajectory of a first node of the skeleton prior to and after the time of the event, wherein the first node corresponds to a left hand or a right hand of the actor;

determine at least one feature of the skeleton, wherein the at least one feature of the skeleton comprises at least one of:

an orientation of at least one edge of the skeleton extending between the first node and a second node of the skeleton with respect to the location of the event at the time of the event;

a length of the at least one edge of the skeleton at the time of the event;

a measure of confidence in a position of the at least one node at the time of the event;

a velocity of the at least one node at the time of the event; or a distance between the at least one node and the location of the event at the time of the event;

provide the trajectory and the at least one feature as inputs to a second classifier, wherein the second classifier is trained to determine a probability that a skeleton is associated with an event;

receive an output from the second classifier, wherein the third output comprises a probability that the skeleton is associated with the event;

determine that the probability does not exceed a predetermined threshold;

in response to determining that the probability does not exceed the predetermined threshold, generate a second plurality of images based at least in part on the first plurality of images, wherein each of the second plurality of images comprises a portion of one of the first plurality of images corresponding to the at least one node of the skeleton;

provide at least some of the second plurality of images as inputs to a third classifier, wherein the third classifier is trained to determine whether an image of a hand depicts an object in the hand;

receive outputs from the third classifier;

determine that one of the left hand or the right hand of the actor includes an object therein based at least in part on the outputs; and in response to determining that the one of the left hand or the right hand of the actor includes the object therein, associate the actor with the event.

20. The system of claim 19, where the at least one processor is further configured to at least:

in response to determining that the one of the left hand or the right hand of the actor includes the object therein, generate a third plurality of images based at least in part on the second plurality of images, wherein each of the third plurality of images comprises a portion of one of the second plurality of images corresponding to the object;

provide the at least some of the portions of the third plurality of images as inputs to a fourth classifier, wherein the fourth classifier is trained to identify an object depicted in an image;

receive an output from the fourth classifier; and determine that the object in the one of the left hand or the right hand is an item of the type based at least in part on the output, wherein the actor is associated with the event in response to determining that the object is the item of the type.

21. The system of claim 19, wherein the event is one of:

a placement of the at least one item at the location of the storage unit; or a retrieval of the at least one item from the location of the storage unit.

22. The system of claim 19, wherein the at least one processor is further configured to at least:

capture information by at least one sensor in communication with the processor, wherein that the event has occurred at the location and at the time is determined based at least in part on the information, and wherein the information comprises at least one of:

a load signal generated in response to a change in a load at the location; or at least one of the plurality of images captured by the first imaging device.

23. The system of claim 19, wherein the third classifier is an end-to-end deep convolutional network having one or more convolutional layers and a softmax output layer, wherein the third classifier is configured to receive an image depicting a hand as an input and to generate an output comprising a bounding box around an object in the hand and a confidence score for the bounding box.

* * * * *